(12) United States Patent
Arnott et al.

(10) Patent No.: US 8,374,951 B2
(45) Date of Patent: *Feb. 12, 2013

(54) SYSTEM, METHOD, AND COMPUTER PROGRAM PRODUCT FOR MANAGING A VIRTUAL PORTFOLIO OF FINANCIAL OBJECTS

(75) Inventors: Robert D. Arnott, Newport Beach, CA (US); Paul C. Wood, Waltham (GB)

(73) Assignee: Research Affiliates, LLC, Newport Beach, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 12/554,961

(22) Filed: Sep. 7, 2009

(65) Prior Publication Data

US 2010/0063942 A1 Mar. 11, 2010

Related U.S. Application Data

(63) Continuation-in-part of application No. 11/931,913, filed on Oct. 31, 2007, now Pat. No. 8,005,740, and a continuation-in-part of application No. 11/509,003, filed on Aug. 24, 2006, now Pat. No. 7,587,352, which
(Continued)

(51) Int. Cl.
*G06Q 40/00* (2012.01)
(52) U.S. Cl. .............................. 705/37; 705/35; 705/36 R
(58) Field of Classification Search .................... 705/37, 705/35, 36 R
See application file for complete search history.

(56) References Cited

U.S. PATENT DOCUMENTS

| 4,334,270 | A | 6/1982 | Towers |
| 4,871,177 | A | 10/1989 | Mock |
| 4,933,842 | A | 6/1990 | Durbin et al. |
| 4,974,983 | A | 12/1990 | Givati et al. |
| 5,101,353 | A | 3/1992 | Lupien et al. |
| 5,126,936 | A | 6/1992 | Champion et al. |
| 5,132,899 | A | 7/1992 | Fox |

(Continued)

FOREIGN PATENT DOCUMENTS

| EP | 1351179 A1 | 10/2003 |
| GB | 2393532 | 3/2004 |

(Continued)

OTHER PUBLICATIONS

Advisory Action dated Feb. 25, 2009 issued in related U.S. Appl. No. 11/196,509.

(Continued)

*Primary Examiner* — Gregory Johnson
(74) *Attorney, Agent, or Firm* — ATFirm; Ralph P. Albrecht

(57) ABSTRACT

A system, method and/or computer program product for managing an index or portfolio of one or more financial object is disclosed. An index (or portfolio) may be created, including selecting object based on accounting data or weighting the object based on accounting data. Investment managers may manage accounts for investors. The investors may directly hold assets in the accounts so the investors may take advantage of any benefits generated by transactions using the assets in the accounts. Investor(s) may have account(s) and manager(s). A manager may have one or more investors and account(s) to manage. Virtual mutual fund manager may use a holdings matrix and lot matrix to track asset lots in the accounts. When a manager wishes to make a trade affecting an investor, virtual mutual fund manager may determine which asset lots held by the investor should be used to execute the trade.

10 Claims, 24 Drawing Sheets

Related U.S. Application Data is a continuation of application No. 10/252,761, filed on Sep. 23, 2002, now Pat. No. 7,117,175, application No. 12/554,961, which is a continuation-in-part of application No. 11/509,002, filed on Aug. 24, 2006, now Pat. No. 7,747,502, which is a continuation-in-part of application No. 11/196,509, filed on Aug. 4, 2005, now Pat. No. 7,620,577, which is a continuation-in-part of application No. 10/159,610, filed on Jun. 3, 2002, now abandoned, and a continuation-in-part of application No. 10/961,404, filed on Oct. 12, 2004, now Pat. No. 7,792,719.

(60) Provisional application No. 60/896,867, filed on Mar. 23, 2007, provisional application No. 60/371,662, filed on Apr. 10, 2002, provisional application No. 60/751,212, filed on Dec. 19, 2005, provisional application No. 60/541,733, filed on Feb. 4, 2004.

(56) References Cited

U.S. PATENT DOCUMENTS

| | | | |
|---|---|---|---|
| 5,193,056 | A | 3/1993 | Boes |
| 5,220,500 | A | 6/1993 | Baird et al. |
| 5,414,838 | A | 5/1995 | Kolton et al. |
| 5,590,325 | A | 12/1996 | Kolton et al. |
| 5,592,379 | A | 1/1997 | Finfrock et al. |
| 5,644,727 | A | 7/1997 | Atkins |
| 5,745,706 | A | 4/1998 | Wolfberg et al. |
| 5,761,442 | A | 6/1998 | Barr et al. |
| 5,778,357 | A | 7/1998 | Kolton et al. |
| 5,806,048 | A | 9/1998 | Kiron |
| 5,812,987 | A * | 9/1998 | Luskin et al. ............... 705/36 R |
| 5,812,988 | A | 9/1998 | Sandretto |
| 5,819,238 | A * | 10/1998 | Fernholz .................... 705/36 R |
| 5,819,263 | A | 10/1998 | Bromley et al. |
| 5,875,437 | A | 2/1999 | Atkins |
| 5,878,405 | A | 3/1999 | Grant et al. |
| 5,911,135 | A | 6/1999 | Atkins |
| 5,918,217 | A | 6/1999 | Maggioncalda et al. |
| 5,926,792 | A | 7/1999 | Koppes et al. |
| 5,930,774 | A | 7/1999 | Chennault |
| 5,946,666 | A | 8/1999 | Nevo et al. |
| 5,946,667 | A | 8/1999 | Tull, Jr. et al. |
| 5,978,778 | A | 11/1999 | O'Shaughnessy |
| 5,987,433 | A | 11/1999 | Crapo |
| 6,003,018 | A | 12/1999 | Michaud et al. |
| 6,012,043 | A | 1/2000 | Albright et al. |
| 6,012,044 | A | 1/2000 | Maggioncalda et al. |
| 6,018,722 | A | 1/2000 | Ray et al. |
| 6,021,397 | A | 2/2000 | Jones et al. |
| 6,049,772 | A | 4/2000 | Payne et al. |
| 6,052,673 | A | 4/2000 | Leon et al. |
| 6,061,663 | A | 5/2000 | Bloom et al. |
| 6,064,985 | A | 5/2000 | Anderson |
| 6,073,116 | A | 6/2000 | Boyle |
| 6,078,904 | A | 6/2000 | Rebane |
| 6,088,685 | A | 7/2000 | Kiron et al. |
| 6,092,056 | A | 7/2000 | Tull, Jr. et al. |
| 6,115,697 | A | 9/2000 | Gottstein |
| 6,134,535 | A | 10/2000 | Belzberg et al. |
| 6,154,732 | A | 11/2000 | Tarbox |
| 6,161,098 | A * | 12/2000 | Wallman .................... 705/36 T |
| 6,175,824 | B1 | 1/2001 | Breitzman et al. |
| 6,233,566 | B1 | 5/2001 | Levine et al. |
| 6,240,399 | B1 | 5/2001 | Frank et al. |
| 6,247,001 | B1 | 6/2001 | Tresp et al. |
| 6,272,474 | B1 | 8/2001 | Garcia |
| 6,292,787 | B1 | 9/2001 | Scott et al. |
| 6,317,700 | B1 | 11/2001 | Bagne |
| 6,317,726 | B1 | 11/2001 | O'Shaughnessy |
| 6,317,728 | B1 | 11/2001 | Kane |
| 6,336,103 | B1 | 1/2002 | Baker |
| 6,338,047 | B1 | 1/2002 | Wallman |
| 6,338,067 | B1 | 1/2002 | Baker et al. |
| 6,377,963 | B1 | 4/2002 | Walker et al. |
| 6,393,409 | B2 * | 5/2002 | Young et al. ................... 705/37 |
| 6,405,204 | B1 | 6/2002 | Baker et al. |
| 6,456,982 | B1 | 9/2002 | Pilipovic |
| 6,484,151 | B1 | 11/2002 | O'Shaughnessy |
| 6,484,152 | B1 | 11/2002 | Robinson |
| 6,516,303 | B1 * | 2/2003 | Wallman ..................... 705/36 T |
| 6,598,028 | B1 | 7/2003 | Sullivan et al. |
| 6,601,044 | B1 | 7/2003 | Wallman |
| 6,622,129 | B1 | 9/2003 | Whitworth |
| 6,687,681 | B1 * | 2/2004 | Schulz et al. ................ 705/36 T |
| 6,839,685 | B1 | 1/2005 | Leistensnider et al. |
| 6,859,785 | B2 | 2/2005 | Case |
| 6,876,981 | B1 | 4/2005 | Berckmans |
| 6,879,964 | B2 | 4/2005 | Sauter et al. |
| 6,901,383 | B1 | 5/2005 | Ricketts et al. |
| 6,920,432 | B1 | 7/2005 | Carey |
| 6,928,418 | B2 | 8/2005 | Michaud et al. |
| 6,938,009 | B1 | 8/2005 | Herbst et al. |
| 6,941,280 | B1 | 9/2005 | Gastineau et al. |
| 6,947,901 | B1 | 9/2005 | McCabe et al. |
| 6,985,880 | B1 | 1/2006 | Hodgdon et al. |
| 7,016,873 | B1 | 3/2006 | Peterson et al. |
| 7,024,388 | B2 | 4/2006 | Stefek et al. |
| 7,031,937 | B2 | 4/2006 | Brown et al. |
| 7,035,820 | B2 | 4/2006 | Goodwin et al. |
| 7,047,217 | B1 | 5/2006 | Gottstein |
| 7,050,998 | B1 | 5/2006 | Kale et al. |
| 7,076,461 | B2 | 7/2006 | Balabon |
| 7,085,738 | B2 | 8/2006 | Tarrant |
| 7,089,191 | B2 | 8/2006 | Baron et al. |
| 7,089,202 | B1 | 8/2006 | McNamar et al. |
| 7,089,205 | B1 | 8/2006 | Abernethy |
| 7,092,857 | B1 | 8/2006 | Steiner et al. |
| 7,099,838 | B1 | 8/2006 | Gastineau et al. |
| 7,107,229 | B1 | 9/2006 | Sullivan |
| 7,117,175 | B2 | 10/2006 | Arnott |
| 7,127,423 | B2 | 10/2006 | Dunning et al. |
| 7,155,468 | B2 | 12/2006 | Weiss |
| 7,177,831 | B1 * | 2/2007 | O'Shaughnessy et al. .. 705/36 R |
| 7,194,468 | B1 | 3/2007 | Bacila et al. |
| 7,206,760 | B1 | 4/2007 | Carey et al. |
| 7,222,095 | B2 | 5/2007 | Squyres |
| 7,249,080 | B1 * | 7/2007 | Hoffman et al. ............. 705/36 R |
| 7,249,086 | B2 | 7/2007 | Bloom et al. |
| 7,251,627 | B1 | 7/2007 | Vass |
| 7,272,578 | B1 | 9/2007 | Leistensnider et al. |
| 7,295,987 | B2 | 11/2007 | Graff |
| 7,299,205 | B2 | 11/2007 | Weinberger |
| 7,305,362 | B2 | 12/2007 | Weber et al. |
| 7,330,831 | B2 * | 2/2008 | Biondi et al. ................ 705/36 T |
| 7,353,115 | B2 | 4/2008 | Bertogg |
| 7,353,198 | B2 | 4/2008 | Rios |
| 7,366,692 | B2 | 4/2008 | Alcaly et al. |
| 7,395,236 | B2 | 7/2008 | Degraaf et al. |
| 7,412,414 | B2 | 8/2008 | Michaud et al. |
| 7,418,419 | B2 | 8/2008 | Squyres |
| 7,421,405 | B2 | 9/2008 | Little |
| 7,444,300 | B1 | 10/2008 | Broms et al. |
| 7,496,531 | B1 | 2/2009 | Gastineau et al. |
| 7,509,274 | B2 * | 3/2009 | Kam et al. .................... 705/35 |
| 7,509,278 | B2 | 3/2009 | Jones |
| 7,571,130 | B2 | 8/2009 | Weber |
| 7,571,134 | B1 | 8/2009 | Burns |
| 7,587,352 | B2 | 9/2009 | Arnott |
| 7,590,584 | B1 * | 9/2009 | Stokes et al. ................... 705/37 |
| 7,620,577 | B2 | 11/2009 | Arnott et al. |
| 7,664,694 | B2 | 2/2010 | Brandhorst |
| 7,668,773 | B1 * | 2/2010 | Pruitt ......................... 705/36 T |
| 7,685,069 | B1 | 3/2010 | Subramanian |
| 7,698,192 | B2 | 4/2010 | Kiron |
| 7,742,969 | B2 | 6/2010 | Teague et al. |
| 7,747,502 | B2 | 6/2010 | Arnott |
| 7,792,719 | B2 | 9/2010 | Arnott |
| 7,885,885 | B1 | 2/2011 | Strongin, II et al. |
| 7,958,038 | B2 | 6/2011 | Choueifaty |
| 8,024,217 | B2 | 9/2011 | Sadre |
| 8,024,258 | B2 | 9/2011 | Gastineau et al. |

| | | |
|---|---|---|
| 8,131,620 B1 | 3/2012 | Steinberg et al. |
| 8,306,892 B1 | 11/2012 | Gross et al. |
| 2001/0025266 A1 | 9/2001 | Gastineau et al. |
| 2001/0037212 A1 | 11/2001 | Motosuna et al. |
| 2001/0039526 A1 | 11/2001 | Pittenger |
| 2001/0046846 A1 | 11/2001 | Tsumura |
| 2001/0049651 A1* | 12/2001 | Selleck ............................ 705/37 |
| 2002/0003729 A1 | 1/2002 | Uchihashi |
| 2002/0007329 A1 | 1/2002 | Alcaly et al. |
| 2002/0007332 A1 | 1/2002 | Johnson et al. |
| 2002/0013755 A1 | 1/2002 | Kiron |
| 2002/0023035 A1 | 2/2002 | Kiron |
| 2002/0032629 A1 | 3/2002 | Siegel et al. |
| 2002/0038271 A1 | 3/2002 | Friend et al. |
| 2002/0046038 A1 | 4/2002 | Prokoski |
| 2002/0052820 A1 | 5/2002 | Gatto |
| 2002/0059126 A1 | 5/2002 | Ricciardi |
| 2002/0059127 A1* | 5/2002 | Brown et al. ................... 705/36 |
| 2002/0062272 A1 | 5/2002 | Kim et al. |
| 2002/0111891 A1* | 8/2002 | Hoffman et al. ................ 705/36 |
| 2002/0116211 A1 | 8/2002 | Hatakeyama |
| 2002/0116310 A1 | 8/2002 | Cohen et al. |
| 2002/0116311 A1 | 8/2002 | Chalke et al. |
| 2002/0120541 A1* | 8/2002 | D'Ambrosio et al. ......... 705/36 |
| 2002/0120570 A1 | 8/2002 | Loy |
| 2002/0123952 A1 | 9/2002 | Lipper |
| 2002/0128947 A1 | 9/2002 | Sauter et al. |
| 2002/0128951 A1 | 9/2002 | Kiron |
| 2002/0133447 A1 | 9/2002 | Mastman |
| 2002/0138381 A1* | 9/2002 | Tomecek ........................ 705/36 |
| 2002/0143676 A1 | 10/2002 | Kiron |
| 2002/0143682 A1 | 10/2002 | Bergmann et al. |
| 2002/0156713 A1 | 10/2002 | Gaini |
| 2002/0161684 A1 | 10/2002 | Whitworth |
| 2002/0173998 A1 | 11/2002 | Case |
| 2002/0174045 A1* | 11/2002 | Arena et al. .................... 705/36 |
| 2002/0174047 A1 | 11/2002 | Fernholz |
| 2002/0178039 A1* | 11/2002 | Kennedy ............................ 705/7 |
| 2002/0184126 A1 | 12/2002 | McIntyre |
| 2003/0004849 A1 | 1/2003 | Velez et al. |
| 2003/0014343 A1 | 1/2003 | Jones |
| 2003/0018556 A1 | 1/2003 | Squyres |
| 2003/0018563 A1 | 1/2003 | Kilgour et al. |
| 2003/0018570 A1 | 1/2003 | McCabe |
| 2003/0036989 A1 | 2/2003 | Bhatia |
| 2003/0046215 A1 | 3/2003 | Teague et al. |
| 2003/0061169 A1 | 3/2003 | Long, III et al. |
| 2003/0065599 A1 | 4/2003 | Huang |
| 2003/0065600 A1 | 4/2003 | Terashima et al. |
| 2003/0065602 A1 | 4/2003 | Yip |
| 2003/0065604 A1 | 4/2003 | Gatto |
| 2003/0065605 A1 | 4/2003 | Gatto |
| 2003/0069822 A1 | 4/2003 | Ito et al. |
| 2003/0074293 A1 | 4/2003 | Kiron |
| 2003/0074295 A1 | 4/2003 | Little |
| 2003/0074306 A1 | 4/2003 | Rios et al. |
| 2003/0093352 A1 | 5/2003 | Muralidhar et al. |
| 2003/0105697 A1* | 6/2003 | Griffin et al. ................... 705/36 |
| 2003/0120577 A1 | 6/2003 | Sakui et al. |
| 2003/0120578 A1 | 6/2003 | Newman |
| 2003/0144947 A1 | 7/2003 | Payne |
| 2003/0154151 A1* | 8/2003 | Biondi et al. ................... 705/37 |
| 2003/0172026 A1 | 9/2003 | Tarrant |
| 2003/0182219 A1 | 9/2003 | Bodurtha et al. |
| 2003/0191704 A1 | 10/2003 | Alb |
| 2003/0212621 A1 | 11/2003 | Poulter et al. |
| 2003/0225657 A1 | 12/2003 | Whaley et al. |
| 2003/0225658 A1 | 12/2003 | Whaley |
| 2003/0225662 A1* | 12/2003 | Horan et al. .................... 705/36 |
| 2003/0225663 A1* | 12/2003 | Horan et al. .................... 705/36 |
| 2003/0229555 A1 | 12/2003 | Marlowe-Noren |
| 2004/0002910 A1* | 1/2004 | Mizukami ....................... 705/36 |
| 2004/0024671 A1 | 2/2004 | Freund |
| 2004/0039620 A1 | 2/2004 | Ando et al. |
| 2004/0044505 A1 | 3/2004 | Horwitz |
| 2004/0049448 A1 | 3/2004 | Glickman |
| 2004/0068456 A1 | 4/2004 | Korisch |
| 2004/0083150 A1 | 4/2004 | Michaud et al. |
| 2004/0083151 A1 | 4/2004 | Craig et al. |
| 2004/0093294 A1 | 5/2004 | Trevino |
| 2004/0111352 A1 | 6/2004 | Kim |
| 2004/0117284 A1 | 6/2004 | Speth |
| 2004/0133497 A1 | 7/2004 | Spear |
| 2004/0139031 A1 | 7/2004 | Amaitis et al. |
| 2004/0167847 A1 | 8/2004 | Nathan |
| 2004/0181477 A1 | 9/2004 | Sauter et al. |
| 2004/0193528 A1 | 9/2004 | Sadre |
| 2004/0210504 A1 | 10/2004 | Rutman |
| 2004/0225536 A1 | 11/2004 | Schoen et al. |
| 2004/0236661 A1 | 11/2004 | Benning |
| 2004/0254871 A1 | 12/2004 | Weiss |
| 2004/0267657 A1 | 12/2004 | Hecht |
| 2005/0010481 A1 | 1/2005 | Lutnick et al. |
| 2005/0015326 A1 | 1/2005 | Terry |
| 2005/0033679 A1 | 2/2005 | Rachev et al. |
| 2005/0038725 A1 | 2/2005 | Boyle et al. |
| 2005/0049948 A1 | 3/2005 | Fuscone |
| 2005/0049952 A1 | 3/2005 | Carter |
| 2005/0060254 A1 | 3/2005 | Jones |
| 2005/0080704 A1 | 4/2005 | Erlach et al. |
| 2005/0108043 A1 | 5/2005 | Davidson |
| 2005/0108148 A1* | 5/2005 | Carlson ............................ 705/37 |
| 2005/0114169 A1 | 5/2005 | Ansari |
| 2005/0114251 A1 | 5/2005 | Sperandeo |
| 2005/0144107 A1 | 6/2005 | Plonski |
| 2005/0149422 A1 | 7/2005 | Van Lier |
| 2005/0171884 A1 | 8/2005 | Arnott |
| 2005/0171894 A1 | 8/2005 | Traynor |
| 2005/0192889 A1 | 9/2005 | Sauter et al. |
| 2005/0216387 A1 | 9/2005 | Barany et al. |
| 2005/0216407 A1 | 9/2005 | Feldman et al. |
| 2005/0222941 A1 | 10/2005 | Tull |
| 2005/0228734 A1 | 10/2005 | Pagani |
| 2005/0246255 A1 | 11/2005 | Rousseau et al. |
| 2006/0015433 A1 | 1/2006 | Arnott et al. |
| 2006/0020531 A1 | 1/2006 | Veeneman et al. |
| 2006/0041489 A1* | 2/2006 | Arnott ............................. 705/35 |
| 2006/0059074 A1 | 3/2006 | Freund |
| 2006/0064364 A1 | 3/2006 | Whitehead |
| 2006/0074787 A1 | 4/2006 | Perg et al. |
| 2006/0080192 A1 | 4/2006 | McCabe |
| 2006/0100946 A1 | 5/2006 | Kazarian |
| 2006/0100949 A1 | 5/2006 | Whaley et al. |
| 2006/0100950 A1 | 5/2006 | Hecht |
| 2006/0100955 A1 | 5/2006 | Baldassini et al. |
| 2006/0149645 A1 | 7/2006 | Wood |
| 2006/0161489 A1 | 7/2006 | Allen et al. |
| 2006/0184438 A1 | 8/2006 | McDow |
| 2006/0184444 A1 | 8/2006 | McConaughy et al. |
| 2006/0190371 A1 | 8/2006 | Almgren et al. |
| 2006/0200395 A1 | 9/2006 | Masuyama et al. |
| 2006/0206398 A1 | 9/2006 | Coughlin |
| 2006/0206405 A1 | 9/2006 | Gambill |
| 2006/0212384 A1 | 9/2006 | Spurgin et al. |
| 2006/0218075 A1 | 9/2006 | Feldman et al. |
| 2006/0224487 A1 | 10/2006 | Galdi |
| 2006/0224494 A1 | 10/2006 | Pinkava |
| 2006/0247996 A1 | 11/2006 | Feldman |
| 2006/0253363 A1 | 11/2006 | Tarrant |
| 2006/0253376 A1 | 11/2006 | Seale et al. |
| 2006/0294000 A1 | 12/2006 | Bassett et al. |
| 2007/0005471 A1 | 1/2007 | Ho et al. |
| 2007/0005476 A1 | 1/2007 | Ho et al. |
| 2007/0016497 A1 | 1/2007 | Shalen et al. |
| 2007/0022033 A1 | 1/2007 | Ho et al. |
| 2007/0027790 A1 | 2/2007 | Gastineau et al. |
| 2007/0043644 A1 | 2/2007 | Weiss |
| 2007/0043650 A1 | 2/2007 | Hughes et al. |
| 2007/0055598 A1 | 3/2007 | Arnott et al. |
| 2007/0055599 A1* | 3/2007 | Arnott ............................. 705/35 |
| 2007/0061235 A1 | 3/2007 | Timmons et al. |
| 2007/0078743 A1 | 4/2007 | Shilpiekandula et al. |
| 2007/0112657 A1 | 5/2007 | Huber |
| 2007/0112662 A1 | 5/2007 | Kumar |
| 2007/0174102 A1 | 7/2007 | Coulter |
| 2007/0179874 A1 | 8/2007 | Spirgel et al. |

| | | | |
|---|---|---|---|
| 2007/0192228 A1 | 8/2007 | Phelps et al. | |
| 2007/0198389 A1 | 8/2007 | Orloske et al. | |
| 2007/0219894 A1 | 9/2007 | Guichard | |
| 2007/0239583 A1* | 10/2007 | Williams | 705/36 R |
| 2007/0244787 A1 | 10/2007 | Lowry | |
| 2007/0265952 A1 | 11/2007 | Kridel | |
| 2007/0288339 A1 | 12/2007 | Squyres | |
| 2008/0071699 A1 | 3/2008 | Catalano-Johnson | |
| 2008/0071700 A1 | 3/2008 | Catalano-Johnson | |
| 2008/0109377 A1 | 5/2008 | Haig | |
| 2008/0140547 A1 | 6/2008 | Murphy et al. | |
| 2008/0208769 A1 | 8/2008 | Beer et al. | |
| 2008/0215502 A1 | 9/2008 | Sabbia | |
| 2008/0235121 A1 | 9/2008 | Gonen | |
| 2008/0243717 A1 | 10/2008 | Rios | |
| 2008/0243721 A1 | 10/2008 | Joao | |
| 2008/0249957 A1 | 10/2008 | Masuyama | |
| 2008/0270317 A1 | 10/2008 | Waldron et al. | |
| 2008/0288387 A1 | 11/2008 | Meyerhoff, II | |
| 2008/0288416 A1 | 11/2008 | Arnott | |
| 2008/0294539 A1 | 11/2008 | Bassuk | |
| 2008/0313100 A1 | 12/2008 | Weber et al. | |
| 2009/0006267 A1 | 1/2009 | Fergusson et al. | |
| 2009/0006274 A1 | 1/2009 | Levin et al. | |
| 2009/0018966 A1 | 1/2009 | Clark | |
| 2009/0063363 A1 | 3/2009 | Present et al. | |
| 2009/0138407 A1 | 5/2009 | Trease | |
| 2009/0164388 A1 | 6/2009 | Jones | |
| 2009/0182683 A1 | 7/2009 | Taylor | |
| 2009/0198631 A1 | 8/2009 | McGarel | |
| 2010/0063942 A1 | 3/2010 | Arnott et al. | |
| 2010/0070429 A1 | 3/2010 | Spurgin et al. | |
| 2010/0153296 A1 | 6/2010 | Volpert et al. | |
| 2010/0191628 A1 | 7/2010 | Arnott et al. | |
| 2010/0262563 A1 | 10/2010 | Arnott et al. | |
| 2010/0287113 A1 | 11/2010 | Lo et al. | |
| 2010/0287116 A1 | 11/2010 | Arnott et al. | |

FOREIGN PATENT DOCUMENTS

| | | |
|---|---|---|
| GB | 2419011 A | 4/2006 |
| JP | 10-275177 | 10/1998 |
| JP | 20010249962 A | 9/2001 |
| JP | 2002-502514 | 1/2002 |
| JP | 2002-512405 | 4/2002 |
| JP | 2003044664 A | 2/2003 |
| JP | 2003-150779 | 5/2003 |
| JP | A2003-150779 | 5/2003 |
| JP | 2003/187052 | 7/2003 |
| JP | A2004-029882 | 1/2004 |
| JP | 2004259156 A | 9/2004 |
| JP | T 2007-502463 | 2/2007 |
| JP | T 2007-522562 | 8/2007 |
| JP | 2006-552146 | 9/2012 |
| JP | 2006547223 | 10/2012 |
| KR | 10-20087017731 | 10/2012 |
| WO | WO-96/06402 A2 | 2/1996 |
| WO | WO 97/22075 A1 | 6/1997 |
| WO | WO -98/44444 | 10/1998 |
| WO | WO 98/44444 * | 10/1998 |
| WO | WO-99/023592 A1 | 5/1999 |
| WO | WO-00/16226 A1 | 3/2000 |
| WO | WO 00/70484 | 11/2000 |
| WO | WO-01/33402 A2 | 5/2001 |
| WO | WO-01/37168 A2 | 5/2001 |
| WO | WO-01/39005 A2 | 5/2001 |
| WO | WO-01/46846 | 6/2001 |
| WO | WO-03/009094 A2 | 6/2001 |
| WO | WO-01/48629 A1 | 7/2001 |
| WO | WO-02/093322 | 11/2002 |
| WO | WO-02/095639 | 11/2002 |
| WO | WO03/032206 | 4/2003 |
| WO | WO-03/034180 A2 | 4/2003 |
| WO | WO2005/019986 | 3/2005 |
| WO | WO2005/076812 A2 | 8/2005 |
| WO | WO2005/076812 A3 | 8/2005 |
| WO | WO 2005/098723 A2 | 10/2005 |
| WO | WO-2006/089565 A2 | 8/2006 |
| WO | WO-2006101764 A1 | 9/2006 |
| WO | WO-2006/103474 A2 | 10/2006 |
| WO | WO-2007/027200 A2 | 3/2007 |

OTHER PUBLICATIONS

Arnott et al., "Redefining Indexation," Research Affiliates, LLC, pp. 1-24, 2004.
Arnott, et al., "Fundamental Indexation," Financial Analysis Journal, vol. 61, No. 2, pp. 83-89, Mar./Apr. 2005.
Arnott, et al., "Redefining Indexation," Research Affiliates, LLC, pp. 1-24, 2004.
Arnott, Rob and Hennessy, David, "Research Affiliates Fundamental Index," Feb. 2006.
Arnott, Robert D. et al., "The Management and Mismanagement of Taxable Assets," First Quadrant, L.P., Investment Management Reflections, 2000, No. 2.
Arnott, Robert D., "*An Overwrought Orthodoxy*", Institutional Investor Magazine, Dec. 2006.
Arnott, Robert D., "*Disentangling Size and Value*", Financial Analyst Journal, Sep. 2005.
Arnott, Robert D., "What Cost "Noise"?" Financial Analysts Journal, Editors Corner, CFA Institute, Mar./Apr. 2005, pp. 10-14.
Arnott, Robert D., "*Whither Finance Theory*", Financial Analysts Journal, Jan./Feb. 2005.
Arnott, Robert D., et al., "*Does Noise Create the Size and Value Effect?*", Working Paper, Jan. 2007.
Arnott, Robert D., et al., "Fundamental Indexes: Current and Future Applications", Institutional Investor Journals, Fall 2006.
Arnott, Robert D., et al., "*Noise CAPM and the Size and Value Effects*", Journal of Investment Management, vol. 5, No. 1, Jan. 2007.
Arnott, Robert, "Retrospectives on Selected Fundamental Index Strategies," Research Affiliates, Dec. 2005.
Arnott, Robert, Hsu, Jason, Moore, Phil, "Redefining Indexation," Sep. 9, 2004.
Arvedlund, Erin E., "*Wall Street Pushes Designer Index Funds*", The Wall Street Journal, Aug. 25, 2005.
Asness, Clifford, "New and Improved Same Old Thing: The Value of Fundamental Indexing", Institutional Investor Magazine, Oct. 2006.
Asness, Clifford, "The Value of Fundamental Indexing", Daily ii.com a.k.a. Institutional Investor, Oct. 19, 2006.
Author Unknown, "About Corporate Bonds, Overview," www.investinginbonds.com, The Securities Industry and Financial markets Association, 2005, p. 1.
Author Unknown, "About the America's Fastest Growing companies Family of Stock Indexes," America's Fastest Growing Companies, Jan. 2002.
Author Unknown, "America's Fastest Growing Companies Index," America's Fastest Growing Companies, Jan. 2002.
Author Unknown, "America's Fastest Growing Companies LargeCap Index," America's Fastest Growing Companies, Jan. 2002.
Author Unknown, "America's Fastest Growing Companies Midcap Index," America's Fastest Growing Companies, Jan. 2002.
Author Unknown, "America's Fastest Growing Companies Total Growth Index," America's Fastest Growing Companies, Jan. 2002.
Author Unknown, "Bond Basics, Fundamental Investment Strategies," www.investinginbonds.com, The Securities Industry and Financial Markets Association, 2005, p. 1.
Author Unknown, "Bond Basics: Selecting a Fixed Income Benchmark," www.pimco.com, A company of ALLIANZ, Jul. 2006, pp. 1-5.
Author Unknown, "CalPERS Goes Fundamental," News, Indexing Developments, Journal of Indexes, May/Jun. 2006, p. 52.
Author Unknown, "CME: Goldman Sachs Commodity Index (GSCI) to include CME Feeder Cattle in 2002 INdex Weighting," Nov. 7, 2001.
Author Unknown, "Dividend Party Goes Global," Journal of Indexes, Mar./Apr. 2006, p. 52.
Author Unknown, "Emerging Markets May Offer Opportunity to Enhance Returns," www.pimco.com, an ALLIANZ Company, Oct. 2005, pp. 1-3.
Author Unknown, "FTSE/RAFI PowerShares ETF Launches on Big Board," Journal of Indexes, Mar./Apr. 2006, pp. 51-52.

Author Unknown, "Generation OPM," Wall Street Technology, www.wallstreetandtech.com, Oct. 25, 2004.
Author Unknown, "Index Industry Leaders . . . In Their Own Words," Journal of Indexes, Sep./Oct. 2006, pp. 10-21.
Author Unknown, "Methodology for the Management of the FTSE RAFI (Research Affiliates Fundamental Index) Index Series," The FTSE RAFI Index Series Ground Rules, Version 1.1, Dec. 2005.
Author Unknown, "MSCI Methodology Book: MSCI Global Value and Growth Index Series," Morgan Stanley Capital International Inc., pp. 1, 2, 8-11, 2003.
Author Unknown, "MSCI to Adjust for Free Float and to Increase Coverage to 85%," MSCI Press Release, www.msci.com, Geneva, Dec. 10, 2000, pp. 1-3.
Author Unknown, "Optimal Value-Weighted Portfolios," Economist's View: Value Weighted Portfolios, Jun. 14, 2006.
Author Unknown, "PowerShares Exchange-Traded Fund Trust," PowerShares FTSE RAFI US 1000 Portfolio-PRF, Prospectus Supplement dated Feb. 22, 2006, Prospectus dated Dec. 19, 2005.
Author Unknown, "PowerShares FTSE RAFI US 1000 Portfolio," www.powershares.com, PRF Facts, Sep. 30, 2005.
Author Unknown, "Separately Managed Accounts to Become Dominant Vehicle for Individual Securities," Tower Group Research, www.advisorpage.com/modules, Advisor Page, Competitive Intelligence, Feb. 6, 2008.
Author Unknown, "Stock Market Perspective: Better Ways to Index?" http://www.pankin.com/persp062.pdf.
Author Unknown, "The Role of Pricing Model Uncertainty"—Resolving Four Paradoxes in Today's Market Behavior,—Strategic Economic Decisions, www.SEDinc.com, SED Profile, May 2008.
Author Unknown, "The Role of high Yield Bonds," www.pimco.com, Publication, Feb. 2006, pp. 1-5.
Author Unknown, "Types of Bonds, Bond and Bond Funds; What You Should Know Before Deciding," www.investinginbonds.com, The Securities Industry and Financial Markets Association, 2005, pp. 1-2.
Author Unknown, "William F. Sharpe Awards—Plus Editorial Board Meeting Excerpts," Journal of Indexes, Mar./Apr. 2006, pp. 36-41.
Author Unknown, DRM Portion of CalPERS' Presentation Given on Jan. 12, 2001, 4 pages.
Author Unknown, FRC Monitor, "Industry Trends," Nov. 2005.
Baker, Nick, "Arnott's 'Fundamental' Stock Index Beats S&P 500, Sparks Debate", Bloomberg.com, Oct. 18, 2006.
Baker, Nick, "Business: Marketplace by Bloomberg: Around the Markets, Rebuilding Indexes From Ground Up", International Herald Tribune, Oct. 19, 2006.
Baker, Nick, "Financial Post: FP Investing, Manager Adds Twist to Index Investing: Focus on Fundamentals", National Post (Canada), Oct. 19, 2006.
Baker, Nick, et al., "Fundamental' Index Sparks Debate: Arnott's FTSE RAFI US 1000 Beats The S&P 500 With a New Stock Weighting Method", Boomberg Markets Magazine, Feb. 2007.
Banz, Rolf W. et al., "Sample-Dependent Results Using Accounting and Market Data: Some Evidence," The Journal of Finance, vol. 41, No. 4 (Sep. 1986), pp. 779-793.
Barry Critchley, "You learn something new every day: New tricks to make the market work better," National Post (Canada), Jun. 15, 2007.
Bazley, John D., Financial Accounting Concepts and Uses, PWS-Kent Publishing Company, 1988, p. 4.
Beales, Richard, "*Getting Back to Fundamentals*", Financial Times, Feb. 24, 2006.
Bergstresser, Daniel, et al., "Investment Taxation and Portfolio Performance*," Preliminary Draft, Boston College Finance Wednesday Seminar and the 2006 UNC Tax Symposium, Apr. 12, 2006.
Berman, David, "Claymore Fundamental Index ETF Among 'New Breed' Of ETFs", National Post (Canada), Feb. 1, 2007.
Bernard, Victor et al., "Accounting-Based Stock Price Anomalies: Separating Market Inefficiencies from Risk*," 1996 Contemporary Accounting Research Conference, Sep. 1996, pp. 1-57.
Blanchett, David, "Building The Best Index; Equal-Weighting vs. Market Capitalization," Journal of Indexes, Jan./Feb. 2006, pp. 40-42.
Bloomberg News, "Is Jobs' Job Safe Amid Options Scandals?, Business, Analyst Touts 'Fundamentals'", St. Paul Pioneer Press, (St. Paul, Minnesota), Oct. 22, 2006.
Bogle, John C., "'Value' Strategies", Wall Street Journal, Feb. 9, 2007.
Brad Zigler, "Fundamentalism and Asset Allocation," Registered Rep, Apr. 1, 2007.
Brad Zigler, "Fundamentalists at the Gates: The Trouble With Cap-Weighted Indexes," Seeking Alpha, May 31, 2007.
Brandhorst, Eric, "MSCI's Methodology Enhancements: Free-Float and Capitalization Extension," www.ssga.com, Jul. 20, 2001, pp. 1-6.
Brock, Woody, The Role of 'Pricing Model Uncertainty,:—Resolving Four Paradoxes in Today's Market Behavior, Strategic Economic Decisions, SED Profile May 2008.
Brockman, Joshua, "The New Calculus of Designer ETFs, Financial Engineers Create Enhanced Indexes" Kiplinger.com, Jun. 2006.
Brooke Southall, "Fundamental Differences Over Schwab Funds," Investment News, Apr. 9, 2007.
Brooke Southall, "Malkiel Defends Investing Strategy," Investment News, Feb. 26, 2007.
Brooke Southall, "Merrill Lynch Claymore International Fundamental Index Accelerator Securities, Series 2," Canada Newswire, Feb. 27, 2007.
Burke, Kevin, "The ETF Weighting Game," Registered Rep./www.registeredrep. com, Apr. 2007, pp. 79-88.
Burns, Scott, "As Index Funds Duke It Out, It Pays to Be Skeptical", The Boston Globe Via Boston.com, Nov. 12, 2006.
Burns, Scott, "Indexing Idea Has A Challenger", The Dallas Morning News Via DallasNews.com, Nov. 12, 2006.
Burns, Scott, "Sloth, Passivity Yield Tidy Profit, Index Funds and Broad Asset Class Diversification Keep Investing Simple", Austin-American Statesman, Statesman.com, Personal Finance, Dec. 24, 2006.
Burns, Scott, "The Looming Battle: Fundamental Vs. Traditional Indexing", Scottburns.com, Nov. 11, 2006.
Burr, Barry B., "*Arnott, CFA Ethical Dance*", Pensions & Investments Online, Oct. 17, 2005.
Burr, Barry B., "Fundamental Index Concept Gets Institutional Investors' Attention", Pensions &Investments Online, Sep. 19, 2005.
Burton Malkiel, "Many Happy Returns," Barron's, May 28, 2007.
Burton, Jonathan, "Putting ETFs in Their Place: Vanguard Indexing Guru Gus Sauter on the Best Kind of Exchanged-Traded Fund", MarketWatch.com, Jan. 9, 2007.
Business Wire, Investment Technologies, (IVES), Jan. 6, 1989, p. 1.
Capon, Andrew, "*Beta Boosting*", Institutional Investor, Oct. 2005.
Carpenter, Margie et al., "Rethinking the World: Global Economic Changes Are Demanding a More Sophisticated Evaluation of Your Clients' Portfolio Allocations", Financial Planning Magazine, Dec. 1, 2006.
Carrel, Lawrence, "Exchange-Traded Funds: ETF Focus Index Wars", SmartMoney.com, Aug. 16, 2006.
Carrel, Lawrence, "Exchanging Exchanges", SmartMoney.com, Sep. 20, 2006.
Carrick, Rob, "Report on Business: Globe Investor: Portfolio Strategy, New ETFs Will Whet Your Appetite (Sub-Head) The Products May Satisfy Investors Who Like the Low Cost and Flexibility of These Funds That Trade Like A Stock", The Globe & Mail (Toronto), Nov. 18, 2006.
Carrigan, Bill, "Being in Right Sector Proves Key With ETFs", Toronto Star, Business: Getting Technical, Sep. 15, 2006.
Chan, Louis K.C., et al., "Fundamentals and Stock Returns in Japan," The Journal of Finance, vol. 46, No. 5 (Dec. 1991), pp. 1739-1764.
Chan, Louis K.C., et al., "The Risk and Return from Factors," The Journal of Financial and Quantitative Analysis, vol. 33, No. 2 (Jun. 1998), pp. 159-188.
Chance, Don M., "Six One Way, Half-A-Dozen The Other," www.indexuniverse.com/component/content/article/4035, Trading Places, May/Jun. 2008,.
Charles Leary, "The Harsh Light of Day," IndexUniverse.com, Mar. 8, 2007.
Charles Paikert, "AIM Investments® Launches AIM Independence Funds," Yahoo!Finance, Mar. 6, 2007.
Charles Paikert, "Index battle (p. 2)," Investment News, Jul. 16, 2007.

Charles Paikert, "Oyster Bar powwow no pearl for Street," Investment News, Mar. 5, 2007.
Chernoff, Joel, "A New Look in Benchmarks: Consultant Devises Alternative Based on Country Wealth," Pensions & Investments Online, Issue Date: Apr. 14, 1997.
Christine Ong, "AIM Vies for Lifecycle Edge by Diversification," Ignites.com, Mar. 28, 2007.
Clements, Jonathan, "When Good Index Funds Go Bad: the Case for a 'Fundamental' Strategy", The Wall Street Journal Online, Sep. 21, 2005.
Coggan, Philip, "*A Sound Idea With Solid Backing*", Financial Times, Jul. 18, 2005.
Coggan, Philip, "Report: FT Fund Management, Fundamental Indices Are Proving Their Worth", Financial Times—UK Edition, Aug. 7, 2006.
Conboy, Bill et al., "PowerShares Capital Management Launches Ten New ETF Portfolios on NASDAQ", M2 Presswire, Sep. 20, 2006.
Consuelo Mack, "A message from Consuelo (an email to WealthTrack subscribers from Consuelo Mack)," PBS WealthTrack, May 24, 2007.
Coyle, Thomas, "SunGard Hunts Trust Assets With Overlay Offering," SunGard Managed Account Solutions, www.sungard.com/Managed Accounts, Aug. 30, 2004.
Critchley, Barry, "Financial Post: Off the Record, Merrill (ML), Claymore (C) Steal A March," National Post (Canada), Dec. 19, 2006.
Curran, Greg, "Security Selection for Bond Index Portfolios," Mellon Institutional Asset Management, Standish Mellon, Copyright 2005, publication date unknown.
D. Morris, AIMIC Press Conference Presentation—Tokyo, May 29, 1998 (10 pages).
David A. Geracioti, "From Theory to Practice," Registered Rep, Jun. 1, 2007.
David Hoffman, "New ETFs Highlight Belief That Simple Is Good," Investment News, Mar. 5, 2007.
David Hoffman, "Non-Traditional Indexes Gaining Ground in ETF World," Investment News, Feb. 12, 2007.
David Hoffman, "Weightings Ignoring Market Caps Gain in Popularity," Pensions&Investments Online, Feb. 19, 2007.
David Williams, "Want another 5% on top? (Interview with Paul Stewart)," Business Day, Jun. 7, 2007.
Davis, James L., The Cross-Section of Realized Stock Returns: The Pre-COMPUSTAT Evidence, The Journal of Finance, vol. 49, No. 5 (Dec., 1994), pp. 1579-1593.
Decision issued Feb. 2, 2009 in related GB application No. 0616163.2.
Decision issued Feb. 19, 2009 in related GB application No. 0222239.6.
Diya Gullapalli, "On Tap: Retirement-Oriented Offerings," The Wall Street Journal, Feb. 22, 2007.
Don Vialoux, "More ways to access Japan: Seven exchange-traded funds now available," National Post (Canada), May 28, 2007.
Donald Jay Korn, "ETF Mania!," Financial Planning, Mar. 1, 2007.
Douglas Appell, "Disputing the superiority of fundamental indexing," Investment News, May 7, 2007.
Douglas Appell, "Fund News (excerpt)," No-Load Fund Investor, May 1, 2007.
Douglas Appell, "Fundamental Indexing Superiority Disputed: Claim of Cap-Weighting's Drag on Return is 'False'," Pensions &Investments Online, Apr. 30, 2007.
Dunstan, Barrie, "News: Managed Funds—A Third Way: Fundamental Indexing (Sub-Head) There Is Fresh Life in the Debate Between Active Share Managers and Index Fund Managers", Independent Financial Review (New Zealand), Nov. 15, 2006.
Dunstan, Barrie, "Supplement: Quarterly Review of Funds, Fundamental Shift Towards Value Is Best of Both Worlds", Australian Financial Review on Fundamental Indexation, Nov. 8, 2006.
Editorial Staff, "Marketplace", OnWallStreet, Nov. 1, 2006.
Ellen Roseman, "Canadians spread cash worldwide," Toronto Star, Jun. 20, 2007.

Eric Uhlfelder, "Challenging EAFE: Managers Who Closely Track Market-Cap-Weighted Country Indexes May Miss Opportunities," Financial Advisor Magazine, Mar. 1, 2007.
Eugene F. Fama, Kenneth R. French, "Straight Talk: Nouveau Indexes, Noise and the Nonsense of Active Management," Journal of Indexes, Mar./Apr. 2007.
Farrell, Christopher, Personal Finance, Battle for the Index Investor, Business Week, Oct. 9, 2006.
Fazzi, Raymond, "Surprisingly Few Surprises: Value Funds, International Equities and REITS Remained Strong Last Year", Financial Advisor, Feb. 2007.
Fernholz, Robert, Diversity-Weighted Indexing, Journal of Portfolio Management, Winter 1998, pp. 74-82.
Foster, Mike, "*Playing Poker With the Indices*", Financial News, Jul. 11, 2005.
Fox, Justin, "Fundamentally Okay Index Funds", Time.com, Jan. 29, 2007.
FRC Monitor, Jan. 2001, pp. 1-12.
Gaffen, David A., "SMAs Take on Multiple Personalities," www.registeredrep.com, May 1, 2003.
Gastineau, Gary L., "The Cutting Edge," IndexUniverse.com, Jan. 2007.
Gastineau, Gary, "Is Indexing Ready for the Challenges of the 21st Century?", Journal of Indexes, The Cutting Edge, Mar./Apr. 2006, pp. 32-35.
Goldberg, Steven, "Value Added, Don't Give Upon the S&P 500", Kiplinger.com, Mar. 21, 2006.
Goldberg, Steven, "Wretched Excess Hits ETFs", Kiplinger.com, Aug. 3, 2006.
Gotlieb, Rish, "Why Portfolio Pros by ETFs, Money Managers Who Don't Have the Time to Specialize in Every Market Use the Convenience of Exchange-Traded Funds", Toronto Star, Dec. 7, 2006.
Greenberg, Gregg, "The Brains Behind Fundamental Indexing", TheStreet.com, Jul. 25, 2006.
Haines, Lisa et al., "AP2 Considering Expanding Use of Fundamental Indexation", Financial News (U.K.), Sep. 4, 2006.
Hajim, Corey, "Smart Strategies, A Better Way to Index'?", Fortune, Oct. 30, 2006.
Heather Bell, "Fundamental Analysis," IndexUniverse.com, May 8, 2007.
Heather Bell, "News Briefs: Analysts wary of fundamental indexes," Pensions&Investments Online, May 14, 2007.
Hemminki, Julius et al., "Fundamental Indexation in Europe," Journal of Asset Management, vol. 8, 6, pp. 401-405, www.palgrave-journals.com/jam, Oct. 26, 2007.
Heuer, Max, "All the Rage: Schwab Joins Fundamental Indexers", Institutional Investor Newsletter, Feb. 5, 2007.
Hoffman, David, "ETF Powerhouses Leery of Fundamental Indexing", InvestmentNews.com, Nov. 6, 2006.
Hougan, Matthew, "Life From the Superbowl", IndexUniverse.com, Dec. 7, 2006.
Hsu, Jason C. and Campollo, Carmen, "New Frontiers in Index Investing," Journal of Indexes, Jan./Feb. 2006, pp. 32-34, 36, 37, 58.
Hsu, Jason D., "*Cap-Weighted Portfolios are Sub-Optimal Portfolios*", Journal of Investment Management, vol. 4, No. 3, Jul. 2006.
Hulbert, Mark, "*A Stock Market Riddle, May Have an Answer*", The New York Times, Jul. 3, 2005.
International Preliminary Report on Patentability and Written Opinion issued in counterpart International Application No. PCT/US2008/003762, mailed on Oct. 8, 2009.
International Preliminary Report on Patentability issued Mar. 24, 2009 in related PCT/US2006/042430.
International Search Report and Written Opinion from PCT/US2008/003762 mailed Sep. 10, 2008.
International Search Report and Written Opinion issued Dec. 21, 2007 in related Appl. PCT/US2006/042430.
International Search Report and Written Opinion issued in PCT/US2007/018534 mailed Sep. 17, 2008.
International Search Report issued in related PCT/US2005/002345 mailed Dec. 19, 2006.
J. Chernoff, "A New Look in Benchmarks: Consultant Devises Alternative Based on Country Wealth," Pensions & Investments Onling (pionline.com), Apr. 14, 1997 (4 pages).

Jackie Cameron, "New threat for active asset managers," Moneyweb, May 18, 2007.
Jacobius, Arleen, "Acting On Faith: Institutional Investors Are Leaping Into Alternative Investments, But Lack Tools to Assess the Risks", Pensions & Investments, Feb. 5, 2007.
Jaffe, Jeffrey et al., "Earnings Yields, Market Values, and Stock Returns," The Journal of Finance, vol. XLIV, No. 1, Mar. 1989.
James Picerno, "The ETF revolution is looking more speculative by the day," Wealth Manager, May 1, 2007.
Jamieson, Dan, "Money Manager Challenges Cap-Weighted Market Indexes", Investment News, Jul. 18, 2005.
Janet Kidd Stewart, "401(k) options worth looking over: Investors should keep track as firms pitch employers more ETFs," Chicago Tribune, Apr. 15, 2007.
Japanese Office Action issued Oct. 21, 2008 in Japanese Application No. 2003-584862.
Jason Hsu, Jason Chia-Shang Tuan, "Indexing for an inefficient market," IPA, Apr. 1, 2007.
Jeffrey R. Kosnett, "Are Your Stocks Simply a Mishmash?," Kiplinger's Personal Finance, Apr. 1, 2007.
Jesse Emspak, "Exchange-Traded Funds: Fundamental Indexing Fuels PowerShares ETF," Investors Business Daily, May 23, 2007.
Jesse Emspak, "Exchange-Traded Funds: PowerShares Launches Foreign Index Funds," Investors Business Daily, Jun. 20, 2007.
Jesse Emspak, "Four New Lyxor ETFs on Fundamental Indices Launched in the XTF Segment," Deutsche Borse Group, May 24, 2007.
Jesse Emspak, "Mutual Funds & Personal Finance: Schwab Focuses on Key Fundamentals," Investors Business Daily, Apr. 2, 2007.
John Authers, "It's time to point the finger at the index," Financial Times, May 26, 2007.
John C. Bogle, "False Promises: Index Funds That Promise to Beat the Market," Journal of Indexes, Mar./Apr. 2007.
John Kimelman, "ETF Pro Says Stocks Aren't Worth the Risk," Barron's, Apr. 20, 2007.
John Kimelman, "Sampling the ETF Smorgasbord," Barron's, Jun. 22, 2007.
John Spence, "Research Affiliates to Sub-Advise Value- and Growth-focused Mandates Based on the Fundamental Index™ Concept for Genworth Financial's AssetMark Asset Allocation Portfolios," Press Releases, Jul. 5, 2007.
John Spence, "Tempest in an index fund: Robert Arnott and John Bogle clash over best indexing strategy," MarketWatch, Jul. 1, 2007.
Jonathan Chevreau, "Hirings: AssetMark Investment Services," Pensions&Investments Online, Jun. 25, 2007.
Jonathan Chevreau, "New U.S. ETFs include Sudan-Free social ETF," Reuters, Jun. 25, 2007.
Jonathan Chevreau, "One in Ten Licensed for ETF Run-Up," National Post (Canada), Jun. 25, 2007.
Jonathan Chevreau, "PowerShares Expands Its Global ETF Initiative Strategy at NYSE," Press Release, Jun. 25, 2007.
Jonathan Chevreau, "PowerShares Launches Four New FTSE RAFI™ International ETFs on NYSE Arca," Press Release, Jun. 25, 2007.
Jonathan Chevreau, "Trading Begins Today on Two New Exchange-Traded Funds From Claymore Investments," National Post (Canada), Feb. 14, 2007.
Jonathan Clements, "Why Aiming for Average Has Its own Genius," The Wall Street Journal, May 6, 2007.
Julia Taylor, "New Funds: Informed Portfolio Management," Financial Times, Jun. 11, 2007.
Julian Harding, "Worth the Weight," Pensions Management, May 15, 2007.
Kalotay, Andrew J. et al., "A Model for Valuing Bonds and Embedded Options," Financial Analysts Journal, May-Jun. 1993, pp. 35-46.
Kaplan, Paul, "Let's Not All Become Fundamental Indexers Just Yet," Journal of Indexes, Jan./Feb. 2009, pp. 34-37.
Karen Dolan, "Morningstar's Take: PIMCO Fundamental IndexPLUS TR D PIXDX," Morningstar, Mar. 28, 2007.
Kathie O'Donnell, "Fundamentals-based index fund has goods, struggles for attention," Investment News, Jun. 18, 2007.
Kathie O'Donnell, "Genworth Financial's AssetMark Introduces New Fundamental Index™ Funds," Press Release, Jun. 18, 2007.

Kathleen M. McBride, "A Better Mousetrap?: Schwab Launches Three Fundamental Index Funds," Investment Advisor Magazine, Apr. 2, 2007.
Kathleen M. McBride, "Catching Up With . . . Jeffrey Mortimer," Investment Advisor Magazine, Apr. 1, 2007.
Kathleen M. McBride, "The IA 25: Robert Arnott," Investment Advisor Magazine, May 1, 2007.
Kathleen Pender, "Changing indexes for funds," San Francisco Chronicle, May 24, 2007.
Kathleen Pender, "Consuelo Mack WealthTrack: An Interview with Rob Arnott (transcript)," PBS WealthTrack, May 25, 2007.
Katie Benner, "Trying to Build a Better Index Fund: Fortune's Guide to Exchange-Traded Funds Based on Fundamental Indexes," CNN Money, Apr. 11, 2007.
Kazuaki Fujita, "Eye on Fundamentals Buoying Japanese Investors (translated)," Nikkei Financial Daily, May 18, 2007.
Kevin Bailey, "New Funds Are Old Hat," Herald Sun (Australia), Jun. 25, 2007.
Kevin Burke, "The ETF Weighting Game," Registered Rep, Apr. 1, 2007.
Kinnel, Russ, "Fund Spy Column: Four Great Funds for 401 K's and Iras Only", Morningstar, Jul. 24, 2006.
Kinnel, Russel, "The Five Best New Funds of 2005", Morningstar.com, Nov. 7, 2005.
Kinnel, Russell, "Fund Spy, Great Mutual Funds Go Head to Head, Its Marsico Vs. Janus and Fidelity Vs. Vanguard", Morningstar.com, Oct. 16, 2006.
Kittsley, Dod, "Alternatively Weighted Indexes: Strategy or Benchmark?", Investment News, Op-Ed, Aug. 8, 2006.
Knight, Rebecca et al., "Active Solution Is Within Reach: In the Second Part in A Series, Rebecca Knight and John Authers Say the Asset Class Could Move Beyond the Passive Approach in 2007", Financial Times, Jan. 30, 2007.
Knight, Rebecca, "FT Report: FT Fund Management: The Big Picture", Financial Times, Oct. 2, 2006.
Knight, Rebecca, "FT Wealth: Hands-On Investor, ETFs Start to Look Beyond the Index Model", Financial Times, Sep. 26, 2006.
Korn, Donald Jay, "Beyond Benchmarks, Tracking Alternative Indexes Can Add a Flavor of Active Management to the ETF Menu", Financial Planning, Oct. 1, 2006.
Lakonishok, Josef et al., NBER Working Paper Series, "Contrarian Investment, Extrapolation, and Risk," National Bureau of Economic Research, Working Paper No. 4360, May 1993.
Laura du Preez, "New index investment method promises more," Personal Finance, Jun. 2, 2007.
Lauricella, Tom, et al., "Fund Track, Buyer Beware; Not All Index ETF's Are What They Appear", The Wall Street Journal Europe, Jul. 24, 2006.
Lawrence Carrel, "Godfather of Fundamental Indexing Faces Challenge," TheStreet.com, Jun. 13, 2007.
Leake, Thomas and Morris, David, "Where Next for the Index Business Model? Bringing Low Cost to the World of Active Management," Journal of Indexes, May/Jun. 2006, pp. 22-26.
Lowry, Vincent T., "Fundamentally Better: The case for revenue weighting," Journal of Indexes, Mar./Apr. 2007.
Luxenberg, Stan, "Fundamental Indexing", Registered Rep, Jul. 1, 2006.
Lydon, Tom; Wasik, John F., iMoney, "Profitable Exchange-Traded Fund Strategies for Every Investor," Chapter 2, The Art of Indexing Using the iMoney Plan, date unknown.
Makepeace, Mark, "FTSE: Coming to America," Journal of Indexes, Jan./Feb. 2006, pp. 38-39.
Mark Salzinger, "Navigating Choppier Waters With ETFs, Funds & Stocks," No-Load Fund Investor, Jul. 1, 2007.
Markowitz, Harry M., "Market Efficiency: A Theoretical Distinction and So What?" www.cfapubs.org, Financial Analysts Journal, Reflections, CFA Institute, Sep./Oct. 2005, pp. 17-30.
Marla Brill, "Indexing Debate Heats Up," Financial Advisor Magazine, Jun. 1, 2007.
Marla Brill, "The age of investment strategy indices (Roundtable Discussion)," Global Pensions, Jun. 1, 2007.
Matthew Hougan, "ETF Watch: Jun. 7-25," IndexUniverse.com, Jun. 27, 2007.

Matthew Hougan, "International RAFI ETFs List on ARCA," IndexUniverse.com, Jun. 25, 2007.
Matthew Richards, "Get Down to the Fundamental Factors," Financial Times, Feb. 17, 2007.
Maureen Darrigo, "Market Pulse: BNN Market Call—Som Seif," The Globe & Mail (Toronto), Jun. 19, 2007.
Maureen Darrigo, "PowerShares to Launch Four International ETFs Based on FTSE RAFI™ Indexes at the New York Stock Exchange Jun. 25, 2007," Press Release, Jun. 19, 2007.
Max Heuer, "Schwab Looks Up Market," Defined Contribution & Savings Plan Alert, Apr. 9, 2007.
Michael Krause, "S&P 500 Shows Passive Aggressive Side," Yahoo!Finance, Apr. 24, 2007.
Morris, Sonya, "Fund Spy—What's The Right Way to Index? (Sub-Head) Our Take on the Newest Breed of Index Funds", Morningstar.com, Dec. 12, 2006.
Morris, Stephen, "CARESS Working Paper #95-13 Speculative Investor Behavior and Learning," Department of Economics, University of Pennsylvania, Philadelphia, PA, May 1995.
Murray Coleman, "New Twist on Indexing: Mutual Funds Meet ETFs," MarketWatch, Apr. 2, 2007.
Nusbaum, Roger, "Personal Finance: ETFs, A Surge of Energy ETFs", TheStreet.com, Oct. 13, 2006.
O'Connor, Cecily, "A Fundamental Change, Research Affiliates, With 55% Gain So Far This Year, Applies Its Index Concept Beyond U.S. Stocks", Pensions & Investments Money Management, Sep. 18, 2006.
O'Connor, Cecily, "At Research Affiliates, A Fundamental Change", Investment News. Sep. 25, 2006.
O'Donnell, Kathie, "One on One With Philip Taylor of AMVESCAP PLC, On New RAFI PowerShares", Investment News, Sep. 25, 2006.
Office Action dated Nov. 25, 2008 issued in related U.S. Appl. No. 10/961,404.
Office Action from related U.S. Appl. No. 10/961,404 mailed Mar. 13, 2008.
Office Action from related U.S. Appl. No. 11/196,509 mailed Mar. 19, 2008.
Office Action issued Jul. 8, 2009 in related U.S. Appl. No. 11/509,002.
Office Action issued Aug. 6, 2009 in related U.S. Appl. No. 10/159,610.
Office Action issued Aug. 19, 2009 in related U.S. Appl. No. 10/961,404.
Office Action issued Dec. 5, 2008 in related CN application No. 200580000459.0.
Office Action issued Nov. 26, 2008 in related Eurasian Patent Appl. No. 200870083/27 (with English translation).
Office Action issued Oct. 3, 2008 in related U.S. Appl. No. 10/159,610.
Office Action Issued Oct. 30, 2008 in U.S. Appl. No. 11/196,509.
Office Action received Apr. 28, 2009 in related EP 05 712 005.7.
Pam Black, "Press Release for 'Index Smackdown' debate between Rob Arnott and Gus Sauter," Financial Planning, Jun. 12, 2007.
Paul J. Lim, "The Indexing Wars," U.S. News & World Report, Apr. 29, 2007.
Pauline Skypala, "Spa ETPs Multi-launch set to expand range of ETF trackers," Financial Times, Jun. 18, 2007.
Pender, Kathleen, "Bogle Shares His Wisdom", San Francisco Chronicle, Oct. 29, 2006.
Peter A. McKay, "More Professors Are Lured Out of Ivory Tower to Street: Demand for New Funds Offers a Chance to Test Theories, Make Money," The Wall Street Journal, Apr. 21, 2007.
Peter A. McKay, "North Dakota Considers Research Affiliates," Money Management Letter, Apr. 23, 2007.
Peter Gibson, Ed Sollbach, Jeff Evans, Elizabeth Leung, "Research Comment: Portfolio Strategy & Quantitative Research," Desjardins Securities, May 7, 2007.
Petruno, Tom, "*New Take on Index Fund Concept*", Los Angeles Times, Jun. 26, 2005.
Philip Coggan, "Presenting the Portfolio Rebalancing Act: Fundamental Indexation Rejects Weighting Stocks Within a Benchmark by Market Value," Investment Advisor (UK), Apr. 28, 2007.
Plumpton, Emma (Redmayne-Bentley Stockbrokers), "Influence of Geography on the Wane", Aberdeen Press & Journal (UK), Nov. 20, 2006.
Point/Counterpoint, "The Fundamental Debate," Journal of Indexes, Jan./Feb. 2009, pp. 30-33, continued on p. 51.
Prestbo, John, "In Perspective; Weighting It Out," Journal of Indexes, Jan./Feb. 2009, pp. 38-40.
Pruitt, Ron, "A Comprehensive View of After-tax Investing and Tax Efficiency," Placemark Investment, 2002.
Pruitt, Ron, "The Tax Advisor: All Hail the Overlay Manager," Placemark Investments, Investment Advisor, Apr. 2005.
Ransom, Diana et al., "Talk the Talk: Financial Buzz Words of '07", Wall Street Journal, Dec. 26, 2006.
Raub, David, "Rethinking Indexing," www.NorthBaybiz.com, Issue: Apr. 2006.
Ray Turchansky, "Investment Vehicle Lines Get Blurry: Merits of Passive Versus Active Management Debated," Edmonton Journal, Feb. 14, 2007.
Regis Nyamakanga, "Stock index system due to launch in SA," Business Day, May 21, 2007.
Reinhart, Len, "The Bigger Picture: Will Overlay Management Become the New Business Model for Separately Managed Accounts?" Financial-Planning.com, Apr. 1, 2007.
Reinhart, Len, "The Next Big Thing: Unified Managed Accounts Must Mature Some More Before They Are Ready for Prime Time." Financial-Planning.com, Dec. 1, 2003.
Research Affiliates Fundamental Index (TM) Fundamental Index (TM) Enhanced Power Point Presentations.
Research Affiliates Fundamental Index™ Fundamental Index™ Enhanced Power Point Presentations.
Research Affiliates, LLC Fact Sheets on RAFI™—Related—Limited Partnerships.
Retrospectives on Selected Enhanced Fundamental Index™—Strategies.
Riley, Barry, "A Quest for Perpetual Profit Machines", Financial Times, Jan. 15, 2007.
Rinne, Jonas, "Translation From Swedish: The Stock Market's New Fundamentalist", Affarsvarlden, Apr. 19, 2006.
Rob Carrick, "For Your RRSP, Take a Page from the CPP," The Globe & Mail (Toronto), Feb. 24, 2007.
Rob Carrick, "Got high-dollar blues? Currency neutrality can bring peace of mind," The Globe & Mail (Toronto), May 24, 2007.
Rob Carrick, "The case for blending passive, active indexing," The Globe & Mail (Toronto), May 19, 2007.
Rob Wherry, "Enhanced Index Funds Make a Move on Their Older Brethren," SmartMoney.com, May 31, 2007.
Rob Wherry, "Fundamentally Schwab," IndexUniverse.com, Apr. 5, 2007.
Rob Wherry, "New From Morningstar's Conference," SmartMoney.com, Jun. 28, 2007.
Rob Wherry, "Ready for an All-ETF Portfolio? Here Are Some Models," SmartMoney.com, Feb. 13, 2007.
Rob Wherry, "Schwab Launches Fundamental Index™ Mutual Funds," Yahoo!Finance, Apr. 2, 2007.
Rob Wherry, "Schwab Launches Three Funds Similar to Popular ETFs," SmartMoney.com, Apr. 2, 2007.
Rob Wherry, "The Index-Fund Makeover," The Wall Street Journal, Jun. 2, 2007.
Robert Arnott et al., "Fundamental Indexation:" Research Affiliates Oct. 7, 2004, pp. 1-35.
Ron Hylton, "It's the Volatility, Stupid: The Source of Excess Returns in Alternative Index Weighting Schemes," Journal of Indexes, Mar./Apr. 2007.
Rudy Luukko, "Enhanced Indexing Cuts Costs of Funds," Toronto Star, Feb. 24, 2007.
Ryan, Jen, "Ask the Street: So Many ETFs", TheStreet.com, Oct. 4, 2006.
Saler, Tom, "Growing to the Sky", Barrons, Oct. 2, 2006.
Salisbury, Ian, "New ETFs to Weight Stocks by Revenue", Dow Jones, Jan. 4, 2007.
Salisbury, Ian, "PowerShares FTSE RAFI US1000 in Article on Actively Managed ETF's's", Wall Street Journal, Jul. 30, 2006.

Salzinger, Mark, "An Indexing Alternative", No Load Fund Investor, Jul. 2006.
Salzinger, Mark, "Feature Interview With Jason Hsu", Investor's ETF Report, Jan. 2007.
Savage, Steve, et al., "Kiplinger's Personal Finance Investing: Fund Insights, A Better Way of Indexing?", Kiplinger, Aug. 2006.
Schlagheck, Jim, "Exchange Traded Funds, Getting an Edge With Fundamental Indices", TheStreet.com., Oct. 5, 2006.
Schoenfeld, Steven A. and Ginis, Robert E., "Worth Weighting for? A Survey and Critique of Alternatively Weighted Indexes," Journal of Indexes, May/Jun. 2006, pp. 10-21.
Scott Burns, "Next-Generation Index Funds Coming," Dallas Morning News, Nov. 26, 2004.
Search Results, TowerGroup, Sep. 25, 2007.
Serwer, Andy, "Brains, Pluck, and Bucks," CNNMoney.com/magazines/fortune/fortune_archives, Jul. 3, 2006.
Shazar, Jonathan, "Taking on a Heavyweight: Two Strategies—With Attendant ETFs—Take Aim At Market-Cap Weighting", Institutional Investor, Jan. 24, 2006.
Siegel, Jeremy J., "*Long-term Returns on the Original S&P 500 Components*", Financial Analyst Journal, vol. 62, No. 1, Jan. 2006.
Siegel, Jeremy, "Consuelo Mack WealthTrack", PBS TV, Aug. 4, 2006.
Siegel, Jeremy, "*The 'Noisy Market' Hypothesis*", Wall Street Journal, vol. 62, No. 1, Jun. 2006.
Simon, Ellen, "New Indexes Aim to Beat Old Benchmarks", Associated Press Newswire, Aug. 8, 2006.
Simon, Ellen, "New Indexes Spiceup ETFs", Associated Press, Aug. 12, 2006.
Siracusano, Luciano, "A Fundamental Challenge," The Wisdom Tree, Aug. 9, 2007.
Sivanithy, R., "Companies: Is Fundamental Weighting Better in Nourse Indices?" The Business Times Singapore, Oct. 27, 2006.
Skypala, Pauline, "Stock Market Indices Prove Inefficien", Financial Times—UK Edition, Sep. 12, 2006.
Sonya Morris, "Measuring the Market's Value," Morningstar, Jul. 16, 2007.
Sonya Morris, Editor, "Introducing Model Portfolios," Morningstar ETFlnvestor, Mar. 1, 2007.
Sophia Grene, "Dilsaver Reveals Schwab Funds' Biggest Secret," MutualFundWire.com, Jun. 7, 2007.
Sophia Grene, "IPM launches four Fundamental IndexTM Funds," Press Release, Jun. 5, 2007.
Sophia Grene, "The fundamental rules apply: Rising interest in wealth weighted indices," Financial Times, Jun. 4, 2007.
Spence, John, "ETF Investing, for These ETFs, The Fundamental Things Apply, Firms, Experts Take Sides in Clash Over Best Investment Strategy", MarketWatch (Boston), Oct. 2, 2006.
Sree Vidya Bhaktavatsalam, "Schwab Offers 'Fundamental' Index Funds to Beat Market Returns," Bloomberg, Apr. 2, 2007.
Steel, Sandra, "FTSE RAFI Indexes to Be Used As Basis for the World's First Fundamentally Weighted Sector ETFs, Ten Fundamental Indexes Out-Perform Domestic Cap Weighted Equivalents", Media Information i.e. Press Release From FTSE the Index Company, Sep. 20, 2006.
Stephen P. Brown, "Actively Managed ETFs: The Next Generation?," Registered Rep, Jun. 1, 2007.
Strauss, Lawrence C., "Too Many ETFs?", Barrons, Jul. 3, 2006.
Susan Trammell, "Applied Science: How to Jump-Start a Quantitative Investment Process," CFA Magazine, Mar./Apr. 2007.
Tamura, Hirmichi, et al., Global Fundamental Indices: Do they outperform market-cap weighted indices *on a Global Basis*?, Security Analysts Journal, Oct. 2005.
Tamura, Hirmichi, et al., "Global Fundamental Indices: Do they outperform market-cap weighted indices on a Global Basis?", Security Analysts Journal, Oct. 2005.
Tan, Kopin, "Lipper Mutual Fund Quarterly, The Weighting Game", Barron's, Oct. 9, 2006.
Tassell, Tony, "Building on the Fundamentals", Financial Times—U.S. Edition, Feb. 6, 2007.
Tim Middleton, "Don't follow the dumb money," MSN Money, Jun. 26, 2007.

Tim Middleton, "Schwab to Launch Fundamental Index Mutual Funds," Reuters, Mar. 27, 2007.
Tim Middleton, "With Market Reeling, Get More Aggressive," MSN Money, Mar. 27, 2007.
Time Middleton, "Mutual Funds, A Play-It-Safe Portfolio for 2007", MSN Money, Dec. 26, 2006.
Trang Ho, "Exchange-Traded Funds: After An Excellent '06, Fast Start for Telecom," Investors Business Daily, Feb. 16, 2007.
Trang Ho, "Exchange-Traded Funds: Consumer ETFs Reflect Strong Buying Trends," Investors Business Daily, Feb. 20, 2007.
Trang Ho, "Foreign ETF Assets Up 24% So Far This Year," Investor's Business Daily, Jul. 11, 2007.
Treynor, Jack, "Perspectives; Why Market-Valuation-Indifferent Indexing Works," Financial Analysts Journal, vol. 61, No. 5, CFA Institute, Sep./Oct. 2005.
Unknown, "Alternative Indices", Financial Times (U.K. Edition), Oct. 13, 2006.
Unknown, "Asset Allocation Basics: Rebalancing", Seeking Alpha, Jul. 10, 2006.
Unknown, "Bettering Fundamentals", IndexUniverse.com, Jan. 4, 2007.
Unknown, "Breaking News, SSgA Goes Fundamental", IndexUniverse.com, Nov. 2, 2006.
Unknown, "Breaking News: PowerShares Spreads the Love", IndexUniverse.com, Sep. 15, 2006.
Unknown, "Canadian Fundamental 100 Income Fund Announces Initial Public Offering", Canada Newswire, Sep. 28, 2005.
Unknown, "Claymore Investments Announces New (RAFI) ETFs, on TSX", Canada Newswire: Claymore Investments, Inc., Sep. 8, 2006.
Unknown, "CRQ, PowerShares Autonomic Allocation ETFs Cited in 'Portfolio Strategy'", Toronto Globe & Mail, Jul. 24, 2006.
Unknown, "ETF Versus No-Loads", No-Load Fund Investor, Sep. 19, 2006.
Unknown, "FTSE and Rob Arnott Launch First Fundamental Indexes", Press Release, Jul. 19, 2005.
Unknown, "FTSE RAFI Indexes to Be Used As Basis for World's First Fundamentally Weighted Sector ETF's", PR Newswire, Sep. 20, 2006.
Unknown, "Fundamental Indices Show Resilience", Financial News, Sep. 11, 2006.
Unknown, "Growth-stock Investing Has Required the Patience of Job During the Last Few Years", New York Times, Sep. 3, 2006.
Unknown, "Investing: Throughbred Indexes Work to Sustain Pace", International Herald Tribune, Aug. 7, 2006.
Unknown, "*Letters to the Editor*", Pensions & Investments Online, Oct. 31, 2005.
Unknown, "Merrill Lynch Claymore International Fundamental Index Accelerator Securities, Series 1", Canada NewsWire, Sep. 19, 2006.
Unknown, "New Fundamental Index Series Launched by FTSE Group and Research Affiliates", PressRelease, Nov. 28, 2005.
Unknown, "Nomura Asset Management and Research Affiliates to Launch Products Based on Fundamental Indexation", Press Release, Aug. 19, 2005.
Unknown, "PowerShares FTSE RAFI US1000 ETF Celebrates IPO on the NYSE", NYSE.com, Dec. 19, 2005.
Unknown, "PowerShares Pitches Alt-Weighted ETFs", Fund Action, Sep. 22, 2006.
Unknown, "RA Among Enhanced-Index Managers Approved by Tacoma ERS", Pension & Investment Daily, Dec. 19, 2006.
Unknown, "Recap of No-Load Fund Investor Coverage of PRF, Boroson on Money", Daily Record (Morristown, NJ), Jul. 23, 2006.
Unknown, "Rob on Consuelo Mack WealthTrack", PBS Interview, Sep. 22, 2006.
Unknown, "*San Joaquin Ups Value-Added Real Estate Allocation*", Pensions & Investments Online, Aug. 30, 2005.
Unknown, "*South Dakota Signs on With New Strategy*", Pensions & Investments Online, Jan. 10, 2005.
Unknown, "Ten to Watch 2006", Registered Rep, Aug. 1, 2006.
Unknown, "The Buttonwood Column, Weights and Measures, A Squabble Erupts Over How Best to Create a Stockmarket Index", The Economist Newspaper Limited (London), Dec. 13, 2006.

Unknown, "The most dangerous patent in finance! Is fundamental indexing patently absurd?," Research Comment, Desjardins Securities, May 7, 2007.
Unknown, "XACT—First in Europe With a fundamental ET," Announcing Launch of the EXACT FTSE RAFI Fundamental Euro ETF on the Stockholm Stock Exchange, and FTSE Licenses First European ETF on FTSE RAFI Index, XACT, Sep. 11, 2006.
Vernon Wessels, "Plexus scores home run with international partner," Fanews, May 18, 2007.
Vernon Wessels, "Plexus Will Use Arnott's Index to Choose South African Stocks," Bloomberg, May 18, 2007.
Vincent T. Lowry, "Fundamentally Better: The Case for Revenue Weighting," Journal of Indexes, Mar./Apr. 2007.
Voyles, Bennett, "New Kid in Town: The Fundamental Index", OnWallStreet, Nov. 1, 2006.
Waid, Robert, "Fundamentally Active," IndexUniverse.com, www.indexuniverse.com/index, Feb. 8, 2008, pp. 1-6.
Warren Boroson, "A New Strategy for Stock Indexes," Daily Record, Feb. 18, 2007.
Warren Boroson, "Expert predicts volatile market," Daily Record, May 20, 2007.
Warren Boroson, "Having 'fun' in market is costly," Daily Record, Jun. 3, 2007.
Warren Boroson, "New Fundamental Index Fund Listed in Stockholm," XACT, Mar. 26, 2007.
Warren Boroson, "Tough Questions for Smart Manager," Daily Record, Mar. 25, 2007.
Warren Buffet, "Letter to Bershire Hathaway, Inc. Shareholders," pp. 3, 16, 19, 1999.
Watt, James L., CPA/PFS, "Is Fundamental Indexing a Better Way to Index?", Fort Collins Coloradoan, Jul. 30, 2006.
Wherry, Rob, "Battle for Index Supremacy, and Centers of Attention: A New Generation of Indexers Want to Replace the S&P 500. Should You Follow Their Lead", SmartMoneySelect.com, Dec. 22, 2006.
Wherry, Rob, "Happy B-Day Vanguard 500", SmartMoney.com, Aug. 31, 2006.
Wherry, Rob, "SmartMoney.com Picks the Best Mutual Fund of 2006", SmartMoney.com, Jan. 5, 2007.
Wood, Paul C., "Fundamental Profit-Based Equity Indexation", Journal of Indexes, Second Quarter, 2003.
Woods, Nancy, "Financial Post: FP Weekend: Ask a Broker Column, Working Toward a Balanced Portfolio", National Post (Canada), Dec. 16, 2006.
Wooley, Scott, "The Index Insurgents," Forbes.com, Magazine article, Oct. 30, 2006.
Communication from the European Patent Office dated Dec. 3, 2009, issued in related European Patent Application No. 03726210.2.
Office Action from U.S. Appl. No. 11/931,913 mailed Jul. 23, 2010.
Office Action from U.S. Appl. No. 10/159,610 mailed May 17, 2010.
Office Action in JP Counterpart Application No. 2006-552146 Dated May 25, 2010.
Australian Examiner's Report for AU Application 2005213293, Dated May 19, 2010.
Supplemental EP Search Report for EP06827143.6 mailed Jul. 2, 2010.
John D. Bazley, Financial Accounting Concepts and Uses, PWS-Kent Publishing Company, 1988, p. 4.
Business Wire, Investment-Technlgies; (IVES) Jan. 6, 1989, p. 1.
Diversity-Weighted Indexing, Robert Fernholz, Journal of Portfolio Management, Winter 1998, pp. 74-82.
Investing at the edge (investing in non-capitalization weighted index funds), Jarrod W. Wilcox, Journal of Portfolio Management, New York, Spring 1998, vol. 24, Iss. 3; 16 pages.
ITG Research, ITG Australia Ltd, "A Quick Guide to Tax Efficient Investment," Nov. 1, 2005.
Office Action from U.S. Appl. No. 12/819,199 mailed Dec. 15, 2011.
EPC Communication from EP 07811461.8, dated Nov. 23, 2010.
EP Office Communication from EP 05712005.7 dated Dec. 23, 2008.
International Search Report for PCT/US 08/03762, dated Sep. 10, 2008.
Examination Communication in EP 06827143.6 mailed Jan. 30, 2012.
Decision of Rejection in JP 2006-552146, mailed Oct. 21, 2011.
Communication in EP 05712005.7, mailed Apr. 28, 2009.
Communication in EP 03726210.2, mailed Dec. 3, 2009.
International Search Report of PCT/US06/42430, dated Dec. 21, 2007.
Third Party Submission in U.S. Appl. No. 10/961,404, dated May 3, 2007.
Third Party Submission in U.S. Appl. No. 10/961,404, dated Oct. 4, 2005, by Matson.
Third Party Submission in U.S. Appl. No. 10/961,404, dated Oct. 4, 2005, by Hemenway.
Asness, Clifford S., "Non-Cap Weighted Indexes, " The Q-Group Spring 2007 Seminar, Mar. 25-28, 2007 AQR Capital Management, LLC.
Wood et al., "Fundamental Profit Based Equity Indexation: A Better Way to Hold the Market," 5 pages, Second Quarter 2003 (at http://www.journalofindexes.com).
Author Unknown, "Registration Statement for iShares (R) Trust," pp. 1, 2, 4, 5, 8, 14, 15 of 67, Aug. 18, 2003 (at http://www.sec.gov/Archives/edgar/data/).
Author Unknown, "Dow Jones Indexes to Launch Dividend Index," 2 pages, Oct. 30, 2003 (at http://www.dowjones.com/cgi-bin).
Author Unknown, "Dow Jones Indexes: Dow Jones Select Dividend Index Summary," 5 pages, at least as early as Sep. 30, 2003.
Arnott et al., "Fundamental Indexation," Financial Analysts Journal, vol. 61, No. 2, pp. 83 and 98, Mar./Apr. 2005 (at www.cfapubs.org).
Block, Sandra, "Stock Funds to Go Gourmet to Beat Index," USA Today, Section Money, 2 pages, Mar. 3, 1997.
Author Unknown, "MSCI Press Release: MSCI Develops Enhanced Methodology for its Global Value and Growth Indices," 2 pages, Sep. 25, 2002 (at http://www.msci.com).
Fama, Eugene, Jr., "he New Indexing," 2 pages, Jul. 2000 (at http://www.dfaus.com/).
Arnott et al., "Surprise! Higher Dividends=Higher Earnings Growth," Financial Analysts Journal, pp. 70-72, and 82, Jan./Feb. 2003.
Author Unknown, "CME: Goldman Sachs Commodity Index (GSCI)revises commodity weights for 2003," 1 page, Nov. 6, 2002.
Buffett, Warren, Letter to Berkshire Hathaway, Inc. Shareholders, pp. 3, 16, and 19, at least as early at 1999.
Notice of Preliminary Rejection in KIPO 10-2006-7017949.
Office Action from U.S. Appl. No. 12/619,668 mailed Feb. 13, 2012.
ITG Research, ITG Australia Ltd., "A Quick Guide to Tax Efficient Investment," Nov. 1, 2005.
Exam Report from New Zealand NZ593108 mailed May 31, 2011.
Exam Report in Australia AU2005213293 mailed Aug. 5, 2010.
Canadian Office Action from CA 2,481,506 mailed Feb. 8, 2012.
Notice of Rejection in JP Patent Application No. 2008-547223.
Shigeki Sakakibara, Shoken Toshi-ron[Financial Investment Theory], Japan, Nikkei, Apr. 24, 1998, 3rd Edition, pp. 200-201.
Exam Report(GCC/SIPO/637) dated Jan. 19 and 20, 2012 from SIPO Application GCC/CN2011/000412 prepared for GCC Patent Application No. GCC/P/2008/10433.
"First Dividend Exchange Traded Fund Launched by iShares on the New York Stock Excahnge," iShares Press Release, Nov. 7, 2003.
iShares SEC Form N-1A Registration Statement under the Securities Act of 1933 and Investment Company Act of 1940, Aug. 18, 2003.
"Dow Jones Indexes To Launch Dividend Index," Dow Jones Indexes—a CME Group Company, New York, Oct. 30, 2003.
Dow Jones U.S. Select Dividend Index(SM) Methodology, METH-ETF-510-091233, Sep. 2011.
"Down Jones Indexes, Dow Jones Select Dividend Index Summary Report", on or about Oct. 2003.
"Earnings Basis for Weighting Stock Portfolios," GSAM, Robert C. Jones, Pensions & Investments, Aug. 5, 1990.
Jones, Robert C. "Quantitative Equity-Earnings Weighted Index," Jones EWI Marketing Materials, pp. 1-22, 1990.
"Goldman Sachs, Portfolio Strategy, Stock Selection," Aug. 31, 1988.
"S&P SmallCap 600 Equity Indices", FactSheet, McGraw-Hill Financial, pp. 1-3, 2011.
"S&P MidCap 400 Equity Indices", FactSheet, McGraw-Hill Financial, pp. 1-3, 2011.

"S&P MidCap 400" SEC Registration Statement, pp. 1-87, Jan. 19, 1996.
"Mergent, Inc.'s Dividend Achievers Index (TM) Achieves 18.67% Total Return in 2003-Index Includes U.S. Stocks the have raised their dividends for 10 consecutive years or longer," WayBack Machine-Feb. 22, 2004, Jan. 12, 2004.
McLean, Bethany, "Introducing the FORTUNE Stock Indexes The FORTUNE 500 Index and the FORTUNE e-50 Index represent the size, strength, and amazing inventiveness of American business," FORTUNE Magazine, CNN Money, Mar. 6, 2000.
"Dividend Achievers (TM) Introduction," Indxis/Indices, printed May 3, 2012.
French and Fama, "The Cross-Section of Expected Stock Returns," The Journal of Finance, vol. XLVII, No. 2, pp.427-465, Jun. 1992.
"FORTUNE Introduces The FORTUNE 500 Index and The FORTUNE e-50 Index; Two Stock Market Indexes Designed As New Metrics for the New Economy," BusinessWire, pp. 1-3, printed Mar. 15, 2012.
"FORTUNE e-50(TM) Index Tracking Stock," Contract Specifications, Spec Sheet, streetTRACKS, pp. 1-3, printed Mar. 15, 2012.
"Fortune 500 Index Fund and Fortune e50 Index Fund," strretTRACKS Prospectus, Tracked by State Street, pp. 1-36, Sep. 25, 2000.
"Dow Jones Sector Titans Indexes (TM) Methodology," METH-ETF-793-070711, pp. 1-3, Jul. 2011.
Knoepfel, Ivo, "Dow Jones Sustainability Group Index: A Global Benchmark for Corporate Sustainability," Elsevier Science Inc., Corporate Enviromental Strategy, pp. 1-10, 2001.
"DFA-A Better Way to Invest," Vista Capital Partners, pp. 1-7, Jun. 30, 2011.
Bethany McLean, "The FORTUNe-50 Index More Than Just Dot-Coms—As the Internet Broadens from the realm of geeks to encompass much of business, how do you track its performance! Here's out proposal: an index of e-stocks with the potential to upstage the Dow," FORTUNE Magazine, CNNMoney, pp. 1-4, Dec. 6, 1999.
Allen R. Gillespie, Money Manager Interview-Alternative Asset Management, The Wall Street Transcript, "Profit Weighted 100 Fund," pp. 1-4, 2006.
Mitchell, Wesley C., "A Critique of Index Numbers of the Prices of Stocks," Chicago Journals, Journal of Political Economy, vol. 24, No. 7, accessed Feb. 21, 2012, Jul. 1916.
U.S. Appl. No. 60/494,974, filed Aug. 14, 2003 as provisional patent application, file history excerpts, pp. 1-38, child of US20050049952 A1, published Mar. 3, 2005.
"US Broad Dividend Achievers (TM) Index," Indxis, 19.057 Mergent Broad Dividend Achievers Index, noting DAA ticker symbol since Dec. 5, 2003, 2011.
"MSCI Global Value and Growth Index Series, Index Construction Objectives and Methodology for the MSCI Global Value and Growth Index Series," 19.034 MSCI Methodology Book, GVG Methodology, pp. 1-28, May 2004.
"MSCI Index Calculation Methodology," 19.033 MSCI, IndexCalculation Methodology, last updated Jul. 2005.
Haensly, Paul J., Tripathy, Niranjan, and Peak, Daniel, "Tracking Error in the Dow Jones Industrial Average Versus Alternative Market Indices: New Evidence," pp. 1-17, Spring 2003.
Haugen, Robert A., and Baker, Nardin L. "The efficient market inefficiency of capitalization-weighted stock portfolios," The Journal of Portfolio Management, pp. 35-40, Spring 1991.
Eun, Cheol S., "The Benchmark Beta, CAPM, and Pricing Anomalies," Oxford Economic Papers, New Series, vol. 46, No. 2, Oxford Journals, Oxford University Press, pp. 330-343, Apr. 1994.
Wood, Paul, and Evans, Richard, "Fundamental Profit Based Equity Indexation," Journal of Indexing, pp. 1-8, 2003.
Borgen, Michael J., "Enhancing market value weighted indexes," ProQuest Dissertations and Theses; pp. 1-75, 2005.
Amenc, Noel, Faff, Robert, and Martellini, Lionel, "Desperately Seeking Pure Style Indexes," Risk and Asset Management Research Centre, Nov. 25, 2003.
Gastineau, Gary L., "Beating the Equity Benchmarks," Financial Analysts Journal, vol. 50, No. 4, pp. 6-11, Jul.-Aug. 1994.
Fielitz, Bruce D., and Muller, Frederick L., "A Simplified Approach to Common Stock Valuation," Financial Analysts Journal, vol. 41, No. 6, pp. 35-41, Nov.-Dec. 1985.
Alexander, Gordon J., "Alexander Reevaluation of Alternative Portfolio Selection," Journal of Financial and Quantitative Analysis, pp. 1-9, Mar. 1978.
Stutzer, Michael, "A Portfolio Performance Index," Financial Analysts Journal, vol. 56, No. 3, pp. 52-61, CFA Institute, May-Jun., 2000.
Mamaysky, Harry, "A Model for Pricing Stocks and Bonds," Yale International Center for Finance, Yale ICF Working Paper No. 02-10, Yale International Center for Finance, Apr. 23, 2002.
Siracusano, Luciano, "A Fundamental Challenge-is there a better way to index," Journal of Indexes, Sep./Oct. 2007—The Alternative Issue, pp. 1-12, 2007.
Abanmay, Zeyand Abdulrahman "A factor analytic approach to global portfolio management," University of Missouri-Rolla, Dissertation, pp. 1-24, 1996.
"Rules for the Management of the FTSE Global Wealth Allocation (GWA) Index Series," FTSE, Index Methodology 2007, pp. 1-15, V 1.15, Oct. 2007.
"FTSE GWA Index Series Methodology," Overview, 2007.
"FTSE introduces wealth weighted index family with GWA—New series welcomed by investment consultant community,—Research shows outperformance against traditional cap weighted indices," media information, Oct. 17, 2005.
"Trustee Guide to Protecting Your Pension Scheme—Diversify your equity portfolio with a global wealth weighted index—All equity indexes are not the same and trustees must ensure that are spreading their risks property says David Morris, CEO of Global Wealth Allocation (GWA),"Engaged Investor, May/Jun. 2008.
"AIMIC Press Conference, David Morris, Tokyo," Global Wealth Allocation, pp. 1-8, Delivered Friday May 29, 1998.
"GWA: Building Portfolios Without Prices," GWA website screenshot, http://www.globalwealthallocation.com/, printed on Dec. 12, 2011.
"GWA: Building Portfolios Without Prices: Investment Philosphy," GWA website screenshot, http://www.globalwealthallocation.com/ Philosphy.html, printed on Dec. 12, 2011.
"CalPERS Presentation, Davig Morris," Global Wealth Allocation, pp. 1-3, Delivered Jan. 12, 2001.
Chernoff, Joel, "A New Look in Benchmarks: Consultant Devises Alternative Based on Country Wealth," P&I, pp. 1-4, Apr. 14, 1997.
Journal of Indexes Staff, "Bloomberg Enters Index-Licensing Business," and "America's Fastest Growing Companies SmallCap 500, LargeCap 50 and MidcCap 300," Journal of Indexes, pp. 5,6, IndexUniverse.com, pp. 1-23, printed Jan. 8, 2012, (C) 2001.
"About the America's Fastest Growing Companies (SM) Family of Stock Indexes," "MidCap Index," "LargeCap Index," "Total Growth Index," America's Fastest Growing Companies Webpage, Methodology, pp. 1-11, http://www.afgc.com, printed Jan. 24, 2002, (c) 1997-2002.
Index Funds Staff, "AMEX/Tokyo Cross-List ETFs," http://www.indexfunds.com/articles/20010619_Tokyo_new_gen_ST.htm, accessed Apr. 4, 2012.
"Individual Investor Group, Inc. Announces Two New Indexes, LargeCap and MidCap Indexes Extend America's Fastest Growing Companies (R) brand," Mar. 26, 2001.
"American Stock Exchange Begins Calculating and Disseminating—Values of Three—New Stock Indexes from Individual Investor Group, Inc.—the America's Fastest Growing Companies (TM) Total Market, LargeCap 50, and MidCap 300 Indexes," Jun. 14, 2012.
Arnott, Robert D., "Redefining Indexation," pp. 1-24, 2004.
Doc #20, Feb. 22, 2012, Case 8:11-cv-01846-DOC-AN, "Defendant's Notice of Motion and Motion for Judgement on the Pleadings Based on Unpatentable Subject Matter: Memo of Points and Authorities in Support Thereof", Case No. SACV11-01846 DOC (ANx), pp. 1-33.
Civil Minutes re Motion for Judgement by Judge Carter.
Doc#20-1, Appendix A, Feb. 22, 2012, Case 8:11-cv-01846-DOC-AN, pp. 1-2.
Doc#20-2, Appendix B, Feb. 22, 2012, Case 8:11-cv-01846-DOC-AN, pp. 1-4.

Doc#20-3, Appendix C, Feb. 22, 2012, Case 8:11-cv-01846-DOC-AN, pp. 1-4.

Doc#25 "Plaintiff's Memo of Points and Authorities in Opposition to Defendant's Motion for Judgement on the Pleadings," Case 8:11-cv-01846-DOC-AN, Filed Mar. 12, 2012. Case No. SACV11-01846 DOC (ANx), pp. 1-33.

Doc#25-1 "Natalie J. Morgan Declaration ISO Plaintiff's Memo of Points and authorities in Opposition to Defendant's Motion for Judgement on the Pleadings," Case 8:11-cv-01846-DOC-AN, Filed Mar. 12, 2012. Case No. SACV11-01846 DOC (ANx), pp. 1-3.

Doc#25-3 "Declaration of Mr. Himanshu Sudhir Surti RE Plaintiff's Memo of Points and Authorities in Opposition to Defendant's Motion for Judgement on the Pleadings," Case 8:11-cv-01846-DOC-AN, Filed Mar. 12, 2012. Case No. SACV11-01846 DOC (ANx), pp. 1-5.

Doc#31 "Defendants'Reply Memo in firthur support of Motion for Judgement on the Pleadings Based on Unpatentable Subject matter," Case 8:11-cv-01846-DOC-AN, Filed Mar. 19, 2012. Case No. SACV11-01846 DOC (ANx), pp. 1-30.

Doc#32-1 "Corrected Defendants'Reply Memo in further support of Motion for Judgement on the Pleadings Based on Unpatentable Subject Matter," Case 8:11-cv-01846-DOC-AN, Filed Mar. 19, 2012. Case No. SACV11-01846 DOC (ANx), pp. 1-30.

Doc#33-1 "Second Corrected Defendants'Reply Memo in Further Support of Motion for Judgement on the Pleadings Based on Unpatentable Subject Matter," Case 8:11-cv-01846-DOC-AN, Filed Mar. 20, 2012. Case No. SACV11-01846 DOC (ANx), pp. 1-30.

Doc #34 "Notice of Supplemental Authority," Case 8:11-cv-01846-DOC-AN, Filed Mar. 20, 2012. Case No. SACV11-01846 DOC (ANx), pp. 1-30.

Doc #39 "Plaintiff's Notice of Supplemental Authority," Case 8:11-cv-01846-DOC-AN, Filed Mar. 20, 2012 Case NO SACV11-01846 DOC (ANx), pp. 1-4.

Doc #45 "Second Notice of Supplemental Authority," Case 8:11-cv-01846-DOC-AN, filed Mar. 20, 2012, Case No. SACV11-01846 DOC (ANx), pp. 1-4.

Doc #45-1 "Exhibit A," "Second Notice Exhibit A," Case 8:11-cv-01846-DOC-AN, filed Apr. 20, 2012, Case No. SACV11-01846 DOC (ANx), pp. 1-7.

Doc #59 "Notice of Motion and Motion for Leave to File First Amended Answer and Counterclaims," Case 8:11-cv-01846-DOC-AN, filed Jun. 11, 2012, Case No. SACV11-01846 DOC (ANx), pp. 1-3.

Doc #59-1 "Declaration of Peter J. Wied ISO Motion for Leave to File First Amended Answer and Counterclaims," Case 8:11-cv-01846-DOC-AN, filed Jun. 11, 2012, Case No. SACV11-01846 DOC (ANx), pp. 1-2.

Doc #59-2 "Exhibit A to Motion for Leave to File First Amended Answer and Counterclaims," Case 8:11-cv-01846-DOC-AN, filed Jun. 11, 2012. Case No. SACV11-01846 DOC (ANx), pp. 1-75.

Doc #59-3 "Memo of Points and Authorities in support of motion for leave to file First Amended answer ISO Motion for Leave to File First Amended Affirmative Defenses and Counterclaims," Case 8:11-cv-01846-DOC-AN, filed Jun. 11, 2012, Case No. SACV11-01846 DOC (ANx), pp. 1-9.

"Defendants'Preliminary Invalidity Contentions," Case 8:11-cv-01846-DOC-AN, filed Jun. 11, 2012, Case No. SACV11-01846 DOC (ANx), pp. 1-546.

European search report, EP 08727072.4, Dec. 30, 2011.

Interrogatory in JP Appearl 2012-4715 of Counterpart JP Application No. 2006-552146.

Nonfinal Rejection in U.S. Appl. No. 13/216,238 mailed Dec. 12, 2012.

* cited by examiner

SYSTEM, METHOD, AND COMPUTER PROGRAM PRODUCT FOR MANAGING A VIRTUAL PORTFOLIO OF FINANCIAL OBJECTS

CROSS-REFERENCE TO RELATED APPLICATIONS

This application claims the benefit of and is a continuation-in-part of U.S. patent application Ser. No. 11/509,003, entitled "Method and Apparatus for Managing a Virtual Portfolio of Investment Objects," filed Aug. 24, 2006, to issue on Sep. 8, 2009 as U.S. Pat. No. 7,587,352, which is a continuation-in-part (CIP) of U.S. patent application Ser. No. 10/252,761, entitled "Method and Apparatus for Managing a Virtual Mutual Fund," filed Sep. 23, 2002, which is a non-provisional application of U.S. Provisional Patent Application 60/371,662, entitled "Method and Apparatus for Managing a Virtual Mutual Fund," filed Apr. 10, 2002, the contents of all of which are incorporated herein by reference in their entireties, and are of common assignee to the present invention.

This application also claims the benefit of and is a continuation-in-part of U.S. patent application Ser. No. 11/931,913, entitled "USING ACCOUNTING DATA BASED INDEXING TO CREATE A PORTFOLIO OF FINANCIAL OBJECTS," filed Oct. 31, 2007, claiming the benefit of U.S. Patent Application 60/896,867, entitled, "USING ACCOUNTING DATA BASED INDEXING TO CREATE A PORTFOLIO OF EMERGING MARKET OR HIGH YIELD BONDS," filed Mar. 23, 2007, inter alia, the contents of all of which are incorporated herein by reference in their entireties, and are of common assignee to the present invention.

This application also claims the benefit of and is a continuation-in-part (CIP) of U.S. patent application Ser. No. 11/509,002, entitled "Using Accounting Data Based Indexing to Create a Portfolio of Assets," filed Aug. 24, 2006, which is a non-provisional of U.S. Provisional Patent Application 60/751,212 filed on Dec. 19, 2005, and is also a continuation-in-part (CIP) of U.S. patent application Ser. No. 11/196,509, entitled "Non-Capitalization Weighted Indexing," filed Aug. 4, 2005, which is a CIP of Ser. No. 10/961,404, "Non-Capitalization Weighted Indexing," filed Oct. 12, 2004 (which itself is a non-provisional of U.S. Provisional Patent Application 60/541,733, entitled "Securities Indexing," filed Feb. 4, 2004) and U.S. patent application Ser. No. 10/159,610, entitled "Non-Capitalization Weighted Stock Market Index and Index Fund or Funds," filed Jun. 3, 2002), the contents of all of which are incorporated herein by reference in their entireties, and are of common assignee to the present invention.

BACKGROUND OF THE INVENTION

1. Field of the Invention

This invention relates generally to the field of systems for managing financial transactions and more specifically to systems for managing investments made on the behalf of investors by investment managers.

2. Related Art

Conventionally, some investors in securities, such as stocks and bonds, choose not to manage their own portfolios but instead rely on professional investment managers to manage and diversify their portfolios. One way to access the services of a professional investment manager is for an investor to buy shares in a mutual fund. In doing so, the investor is able to take advantage of a professional manager's expertise along with other investors. However, an investor in a mutual fund does not directly hold the assets purchased by the professional manager, thus the investor loses some of the tax benefits of directly holding an asset.

Another way that an investor can use professional investment managers and diversify a portfolio is by allowing a group of professional managers to directly manage multiple portfolios where the investor directly holds the assets in the multiple portfolios. This allows an investor to take advantage of a diversity of investment strategies and capture any tax benefits from directly holding an asset. However, this may create tax problems for the investor. For example, one manager may buy an asset too soon after another manager has sold the same asset, thus creating a "wash sale". Another problem may occur when one manager buys an asset at the same time another manager sells the same asset, thus creating a taxable event for the investor without actually generating any income for the investor.

Therefore, a need exists for an investment management system that allows an investor to take advantage of the investment expertise from a variety of professional investment managers. In addition, the investment management system should allow the investor to reap the tax benefits from directly holding an asset without creating undue adverse tax consequences.

Also, conventionally, there are various broad categories of securities portfolio management. One conventional securities portfolio management category is active management wherein the securities are selected for a portfolio individually based on economic, financial, credit, and/or business analysis; on technical trends; on cyclical patterns; etc. Another conventional category is passive management, also called indexing, wherein the securities in a portfolio duplicate those that make up an index. The securities in a passively managed portfolio are conventionally weighted by relative market capitalization weighting or equal weighting. Another middle ground conventional category of securities portfolio management is called enhanced indexing, in which a portfolio's characteristics, performance and holdings are substantially dominated by the characteristics, performance and holdings of the index, albeit with modest active management departures from the index.

The present invention relates generally to the passive and enhanced indexing categories of portfolio management. A securities market index, by intent, reflects an entire market or a segment of a market. A passive portfolio based on an index may also reflect the entire market or segment. Often every security in an index is held in the passive portfolio. Sometimes statistical modeling is used to create a portfolio that duplicates the profile, risk characteristics, performance characteristics, and securities weightings of an index, without actually owning every security included in the index. (Examples could be portfolios based on the Wilshire 5000 Equity Index or on the Lehman Aggregate Bond Index.) Sometimes statistical modeling is used to create the index itself such that it duplicates the profile, risk characteristics, performance characteristics, and securities weightings of an entire class of securities. (The Lehman Aggregate Bond Index is an example of this practice.)

Indexes are generally all-inclusive of the securities within their defined markets or market segments. In most cases indexes may include each security in the proportion that its market capitalization bears to the total market capitalization of all of the included securities. The only common exceptions to market capitalization weighting are equal weighting of the included securities (for example the Value Line index or the Standard & Poors 500 Equal Weighted Stock Index, which includes all of the stocks in the S&P 500 on a list basis; each stock given equal weighting as of a designated day each year) and share price weighting, in which share prices are simply added together and divided by some simple divisor (for example, the Dow Jones Industrial Average). Conventionally, passive portfolios are built based on an index weighted using one of market capitalization weighting, equal weighting, and share price weighting.

Most commonly used stock market indices are constructed using a methodology that is based upon either the relative share prices of a sample of companies (such as the Dow Jones Industrial Average) or the relative market capitalization of a sample of companies (such as the S&P 500 Index or the FTSE 100 Index). The nature of the construction of both of these types of indices means that if the price or the market capitalization of one company rises relative to its peers it is accorded a larger weighting in the index. Alternatively, a company whose share price or market capitalization declines relative to the other companies in the index is accorded a smaller index weighting. This can create a situation where the index, index funds, or investors who desire their funds to closely track an index, are compelled to have a higher weighting in companies whose share prices or market capitalizations have already risen and a lower weighting in companies that have seen a decline in their share price or market capitalization.

Advantages of passive investing include: a low trading cost of maintaining a portfolio that has turnover only when an index is reconstituted, typically once a year; a low management cost of a portfolio that requires no analysis of individual securities; and no chance of the portfolio suffering a loss—relative to the market or market segment the index reflects—because of misjudgments in individual securities selection.

Advantages of using market capitalization weighting as the basis for a passive portfolio include that the index (and therefore a portfolio built on it) remains continually 'in balance' as market prices for the included securities change, and that the portfolio performance participates in (i.e., reflects) that of the securities market or market segment included in the index.

The disadvantages of market capitalization weighting passive indexes, which can be substantial, center on the fact that any under-valued securities are underweighted in the index and related portfolios, while any over-valued securities are over weighted. Also, the portfolio based on market capitalization weighting follows every market (or segment) bubble up and every market crash down. Finally, in general, portfolio securities selection is not based on a criteria that reflects a better opportunity for appreciation than that of the market or market segment overall.

Price or market capitalization based indices can contribute to a 'herding' behavior on the behalf of investors by effectively compelling any of the funds that attempt to follow these indices to have a larger weighting in shares as their price goes up and a lower weighting in shares that have declined in price. This creates unnecessary volatility, which is not in the interests of most investors. It may also lead to investment returns that have had to absorb the phenomenon of having to repeatedly increase weightings in shares after they have risen and reduce weightings in them after they have fallen.

Capitalization-weighted indexes ("cap-weighted indexes") dominate the investment industry today, with approximately $2 trillion currently invested. Unfortunately, cap-weighted indexes suffer from an inherent flaw as they overweight all overvalued stocks and underweight all undervalued stocks. This causes cap-weighted indexes to underperform relative to indexes that are immune to this shortcoming. In addition, cap-weighted indexes are vulnerable to speculative bubbles and emotional bear markets which may unnaturally drive up or down stock prices respectively.

It is a well established empirical conclusion of investment theory that cap-weighting is not mean-variance optimal. This conclusion holds because weighting schemes based on market price, including cap-weighting, overweight 100% of overvalued stocks and underweight 100% of undervalued stocks. Both mathematically and empirically, this over and under weighting problem inherent to cap-weighting leads to a return drag of 200 bps per year in the U.S. and more than 200 bps per year internationally.

One example of the phenomenon comes from the recent stock market bubble of 1997-2000, when, e.g., Internet network service provider Cisco comprised nearly 5% of the S&P 500. At its peak in 2000, Cisco traded at $70 per share. Since March 2000, Cisco has fallen to approximately 12% of its peak, dragging down S&P 500 performance of which it comprised 5%.

While it is difficult or impossible to know the true fair value of a company, what is known is that if an overvalued company's weight in an index is determined by market capitalization, then the company will be over-weighted in the index. Conversely, if a company's weight is determined by market capitalization and it is undervalued, it will be underweighted in a capitalization-weighted index.

Over the past 40 years, the largest stock by market capitalization in the S&P 500 has underperformed the average stock in the index over a 10-year time period by an average of 40%. The largest 10 stocks by market capitalization have underperformed the average stock over the subsequent 10-year time frame by an average of 26%. Yet, cap-weighted indexes continue to invest 20-30% of their value in the largest 10 stocks by market cap, despite the fact that they underperform the average stock in the index, because the stocks are selected and weighted using market capitalization, which by its nature over-weights over valued stocks and under-weights undervalued stocks.

Equal-weighted indexation is a popular alternative to cap-weighting but one that suffers from its own shortcomings. One significant problem with equal-weighted indexes is that they come out of the same cap-weighted universes as cap-weighted indexes. For example, the S&P Equal Weighted Index simply re-weights the 500 equities that comprise the S&P 500, retaining the bias already inherent to cap-weighted indexes.

High turnover and associated high costs are additional problems of equal-weighted indexes. Equal-weighted indexes include small illiquid stocks, which are required to be held in equal proportion to the larger, more liquid stocks in the index. These small illiquid stocks must be traded as often as the larger stocks but at a higher cost because they are less liquid.

What is needed then is an improved method of weighting financial objects in a portfolio based on an index that overcomes shortcomings of conventional solutions.

SUMMARY OF THE INVENTION

An exemplary embodiment of the invention may include a method of managing one or more financial objects, the method being executed on a data processing system, the method may include: managing a virtual portfolio of the financial objects wherein the virtual portfolio may include a collection of the financial objects managed collectively but tracked separately with separately owned lots on behalf of a plurality of investors; providing, receiving or accessing a computer database associating a plurality of lots owned by each of the plurality of investors and associating the plurality of lots as tradable regardless of initiator of the purchase of the plurality of lots; providing, receiving or accessing lot selection rules; receiving a requested trade; selecting a lot for trading from the plurality of lots using the computer database, the lot selection rules, and the requested trade; providing, receiving or accessing taxation rules; determining if a trade using the selected lot should be deferred using the computer database and the taxation rules; generating a deferred trade in a tax-managed sub-account if it is determined that the requested trade should be deferred; and selecting the deferred trade in the tax-managed sub-account for execution if it is determined that the deferred trade should no longer be deferred using the computer database and the taxation rules.

An exemplary embodiment of the invention may include the method where the lot selection rules include a rule for selecting a lot with a highest cost basis for trading.

An exemplary embodiment of the invention may include the method where the financial object may include at least one of: equity, debt, a bond, a stock, a financial instrument, a contract, a security, a contract, a mutual fund, an exchange traded fund (ETF), a fund of funds, an index fund, a passive index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets tracking S&P indexes, Russell indexes, Dow Jones indexes, Morgan Stanley indexes, Lehman indexes, Wilshire indexes, composite indexes, Morgan Stanley Capital International indexes, a portfolio of assets tracking an ADBI weighted index, a commodity, an option, a derivative trade, a long hedge, a short hedge, a swap, a futures contract, a hedge fund, and/or a negative weighting on any financial object.

An exemplary embodiment of the invention may include the method where the lot selection rules comprise investment management rules.

An exemplary embodiment of the invention may further include receiving a plurality of requested trades; selecting a plurality of lots for trade execution; and aggregating any executed trades for reconciliation.

An exemplary embodiment of the invention may include a method of managing one or more financial objects may include: managing a plurality of virtual portfolios of the financial objects with separate lots owned by one or more individual investors and tracked separately; providing, receiving or accessing a computer-implemented lot matrix associating a plurality of lots with the plurality of virtual portfolios of the financial objects, each lot of the plurality of lots tradable regardless of initiator of purchase of the lot and associating the plurality of lots as separately owned by the one or more investors; providing, receiving or accessing lot selection rules; receiving a requested trade; for each of the plurality of virtual portfolios, performing the following: for the requested trade, selecting a lot from the plurality of lots for execution of the requested trade using the lot selection rules, and the lot matrix; determining if the requested trade should be deferred using the lot matrix, taxation rules, and the lot selection rules; generating a deferred trade in a tax-managed sub-account if it is determined that the requested trade should be deferred; and selecting the deferred trade in the tax-managed sub-account for execution if it is determined that the deferred trade should no longer be deferred using the lot matrix and the taxation rules.

An exemplary embodiment of the invention may further generating trades for execution from selected lot; and aggregating generated trades for a virtual portfolio of the plurality of virtual portfolios.

An exemplary embodiment of the invention may further include aggregating tax savings across the plurality of virtual portfolios for each of the one or more individual investors.

An exemplary embodiment of the invention may include a data processing system for managing one or more financial objects may include: a virtual portfolio of the financial objects wherein the virtual portfolio may include a collection of the financial objects managed collectively but tracked separately with separately owned lots on behalf of a plurality of investors; a computer database adapted to associate a plurality of lots of the plurality of investors and adapted to associate the plurality of lots as tradable regardless of initiator of the purchase of one of the plurality of lots; a processor; and a memory coupled to the processor and having program instructions stored therein, the processor being operable to execute the program instructions, the program instructions including: lot selection rules; instructions being adapted to receive a requested trade; and adapted to select a lot for trading from the plurality of lots using the computer database, the lot selection rules, and the requested trade; taxation rules; instructions being adapted to determine if a trade using the selected lot should be deferred using the computer database and the taxation rules; and adapted to generate a deferred trade in a tax-managed sub-account if it is determined that the requested trade should be deferred; and instructions being adapted to select a deferred trade in the tax-managed sub-account for execution if it is determined that the deferred trade should no longer be deferred using the computer database and the taxation rules.

An exemplary embodiment of the invention may include the system where the lot selection rules include a rule adapted to select a lot with a highest cost basis for trading.

An exemplary embodiment of the invention may include the system where the financial object may include at least one of: equity, debt, a bond, a stock, a financial instrument, a contract, a security, a contract, a mutual fund, an exchange traded fund (ETF), a fund of funds, an index fund, a passive index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets tracking S&P indexes, Russell indexes, Dow Jones indexes, Morgan Stanley indexes, Lehman indexes, Wilshire indexes, composite indexes, Morgan Stanley Capital International indexes, a portfolio of assets tracking an ADBI weighted index, a commodity, an option, a derivative trade, a long hedge, a short hedge, a swap, a futures contract, a hedge fund, and/or a negative weighting on any financial object.

An exemplary embodiment of the invention may include the system where the lot selection rules comprise investment management rules.

An exemplary embodiment of the invention may include the system where the program instructions further including: receiving a plurality of requested trades; selecting a plurality of lots for trade execution; and aggregating any executed trades for reconciliation.

Another exemplary embodiment of the invention may include a data processing system for managing one or more financial objects may include: a plurality of virtual portfolios of the financial objects with separate lots owned by one or more individual investors; a computer-implemented lot matrix database associating a plurality of lots with the plurality of virtual portfolios each lot of the plurality of lots tradable regardless of initiator of purchase of the lot; a processor; and a memory coupled to the processor and having program instructions stored therein, the processor being operable to execute the program instructions, the program instructions including: lot selection rules; instructions receiving one or more requested trades; and for each of the plurality of virtual portfolios, the system operative to perform the following: for the requested trade: the system operative to select a lot from the plurality of lots for execution of the requested trade using the lot selection rules, and the lot matrix; instructions determining if the requested trade should be deferred using the lot matrix, taxation rules; and the system operative to generate a deferred trade in a tax-managed sub-account if it is determined that the requested trade should be deferred; and instructions further including selecting a deferred trade in a tax-managed sub-account for execution if it is determined that the deferred trade should no longer be deferred using the lot matrix and the taxation rules.

Another exemplary embodiment of the invention may include the system where the financial object may include at least one of: equity, debt, a bond, a stock, a financial instrument, a contract, a security, a contract, a mutual fund, an exchange traded fund (ETF), a fund of funds, an index fund, a passive index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets tracking S&P indexes, Russell indexes, Dow Jones indexes, Morgan Stanley indexes, Lehman indexes, Wilshire indexes, composite indexes, Morgan Stanley Capital International indexes, a portfolio of assets tracking an ADBI weighted index, a commodity, an option, a derivative trade, a long hedge, a short hedge, a swap, a futures contract, a hedge fund, and/or a negative weighting on any financial object.

An exemplary embodiment of the invention may include the system where the lot selection rules comprise investment management rules.

An exemplary embodiment of the invention may include the system where the program instructions generating trades for execution from the selected lots; and aggregating the generated trades for a virtual portfolio from the one or more virtual portfolios.

An exemplary embodiment of the invention may include the system where the program instructions further including aggregating tax savings across the plurality of virtual portfolios for each of the one or more investors.

An exemplary embodiment of the invention may include a method of managing one or more financial objects, the method being executed on a data processing system, the method may include: managing a virtual portfolio of the financial objects may include a collection of the financial objects managed collectively but tracked separately with separately-owned lots on behalf of a plurality of investors; providing, receiving or accessing a computer database associating a plurality of holdings owned by each of the plurality of investors as tradable, regardless of initiator of purchase of a holding; providing, receiving or accessing holding selection rules; receiving a requested trade; selecting a holding for trading from the plurality of holdings using the computer database, the holding selection rules, and the requested trade; determining whether a trade using the holding should be deferred using the computer database and the holding selection rules; and generating a deferred trade in a tax-managed sub-account associated with one investor of the plurality of investors using the holding if it is determined that the holding should be sold in order to realize a loss for the one investor, wherein a manager's account is unaffected by the loss realized by sale of the holding.

An exemplary embodiment of the invention may further include generating an offsetting purchase of the holding if it is determined that enough time has passed to avoid a wash-sale violation.

An exemplary embodiment of the invention may include a previously described above method which may further include generating an offsetting purchase of a temporary offsetting holding; and generating a sale of the temporary offsetting holding when generating the offsetting purchase of the holding.

An exemplary embodiment of the invention may include a data processing system for managing one or more financial objects may include: a virtual portfolio of the financial objects may include a collection of the financial objects managed collectively but tracked separately with separate accounts on behalf of a plurality of investors; a computer-implemented database associating a plurality of holdings owned by each of the plurality of investors, wherein a holding may be traded regardless of initiator of purchase of the holding; a processor; and a memory coupled to the processor and having program instructions stored therein, the processor being operable to execute the program instructions, the program instructions providing, receiving or accessing at least one holding selection rule; receiving a requested trade; selecting a holding for trading from the plurality of holdings using the computer-implemented database, the holding selection rule; and the requested trade; determining whether the trade using the holding should be deferred using the computer-implemented database and the holding selection rules; and generating a deferred trade in a tax-managed sub-account associated with one investor of the plurality of investors using the holding if it is determined that the holding should be sold in order to realize a loss for the one investor, wherein a manager's account is unaffected by the loss realized by sale of the holding.

An exemplary embodiment of the invention may include the system where the program instructions generate an offsetting purchase of the holding if it is determined that enough time has passed to avoid a wash-sale violation.

An exemplary embodiment of the invention may include the system where the program instructions further generating an offsetting purchase of a temporary offsetting holding; and generating a sale of the temporary offsetting holding when generating the offsetting purchase of the holding.

An exemplary embodiment of the invention may include one of the previously discussed methods further may include providing, receiving or accessing a holdings matrix associating one or more managers with the plurality of virtual portfolios; and wherein in the selecting the lot for execution of the requested trade, further may include using the holdings matrix.

An exemplary embodiment of the invention may include one of the methods discussed above, where the lot selection rules comprise a rule for selecting a lot with a highest cost basis for trading.

An exemplary embodiment of the invention may include one of the methods discussed above, where the plurality of lots may include at least one of: one or more financial objects, wherein the financial object may include at least one of: equity, debt, a bond, a stock, a financial instrument, a contract, a security, a contract, a mutual fund, an exchange traded fund (ETF), a fund of funds, an index fund, a passive index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets tracking S&P indexes, Russell indexes, Dow Jones indexes, Morgan Stanley indexes, Lehman indexes, Wilshire indexes, composite indexes, Morgan Stanley Capital International indexes, a portfolio of assets tracking an ADBI weighted index, a commodity, an option, a derivative trade, a long hedge, a short hedge, a swap, a futures contract, a hedge fund, and/or a negative weighting on any financial object; a plurality of securities; and/or a group of financial objects and/or securities.

Another exemplary embodiment of the invention may include a method of managing one or more financial objects, the method being executed on a data processing system, the method may include: managing a plurality of virtual financial objects may include a collection of the financial objects managed collectively but tracked separately with separately-owned lots on behalf of one or more investors; providing, receiving or accessing a computer database associating a plurality of holdings owned by each of the one or more investors to separate managers in separate manager accounts wherein a holding may be traded regardless of initiator of purchase of the holding; providing, receiving or accessing holding selection rules; receiving a requested trade; selecting the holding for trading from the plurality of holdings using the computer database, the holding selection rules, and the requested trade; determining whether the trade using the holding should be deferred using the computer database and the holding selection rules; and generating a deferred trade in a tax-managed sub-account associated with one investor of the one or more investors using the holding if it is determined that the holding should be sold in order to realize a loss for the investor, wherein a manager's account is unaffected by the loss realized by sale of the holding.

An exemplary embodiment of the invention may further include generating an offsetting purchase of the holding if it is determined that enough time has passed to avoid a wash-sale violation.

An exemplary embodiment of the invention may further include generating an offsetting purchase of a temporary offsetting holding; and generating a sale of the temporary offsetting holding when generating the offsetting purchase of the holding.

Yet still, another exemplary embodiment of the invention may a method of managing one or more financial objects, the method being executed on a data processing system, the method may include: managing a plurality of virtual portfolios of financial objects may include a collection of the financial objects managed collectively but tracked separately with separately-owned lots on behalf of a plurality of investors; providing, receiving or accessing a computer database associating a plurality of holdings owned by each of the plurality of investors to separate managers in separate manager accounts wherein a holding may be traded regardless of initiator of purchase of the holding; providing, receiving or accessing holding selection rules; receiving a requested trade; selecting the holding for trading from the plurality of holdings using the computer database, the holding selection rules, and the requested trade; determining whether the trade using the holding should be deferred using the computer database and the holding selection rules; and generating a deferred trade in a tax-managed sub-account associated with one investor of the plurality of investors using the holding if it is determined that the holding should be sold in order to realize a loss for the one investor, wherein a manager's account is unaffected by the loss realized by sale of the holding.

An exemplary embodiment of the invention may further generating an offsetting purchase of the holding if it is determined that enough time has passed to avoid a wash-sale violation.

An exemplary embodiment of the invention may further generating an offsetting purchase of a temporary offsetting holding; and generating a sale of the temporary offsetting holding when generating the offsetting purchase of the holding.

An exemplary embodiment of the invention may include a data processing system for managing one or more financial objects may include: a plurality of virtual portfolios of financial objects may include a collection of the financial objects managed collectively but tracked separately with separate accounts on behalf of one or more investors; a computer-implemented database associating a plurality of holdings owned by each of the one or more investors, wherein a holding may be traded regardless of initiator of purchase of the holding; a processor; and a memory coupled to the processor and having program instructions stored therein, the processor being operable to execute the program instructions, the program instructions providing, receiving or accessing at least one holding selection rule; receiving a requested trade; selecting a holding for trading from the plurality of holdings using the computer-implemented database, the holding selection rule; and the requested trade; determining whether the trade using the holding should be deferred using the computer-implemented database and the holding selection rules; and generating a deferred trade in a tax-managed sub-account associated with one investor of the one or more investors using the holding if it is determined that the holding should be sold in order to realize a loss for the one investor, wherein a manager's account is unaffected by the loss realized by sale of the holding.

An exemplary embodiment of the invention may include the system, where the program instructions generating an offsetting purchase of the holding if it is determined that enough time has passed to avoid a wash-sale violation.

An exemplary embodiment of the invention may include the system, where the program instructions further generating an offsetting purchase of a temporary offsetting holding; and generating a sale of the temporary offsetting holding when generating the offsetting purchase of the holding.

An exemplary embodiment of the invention may a data processing system for managing one or more financial objects may include: a plurality of virtual portfolios of financial objects may include a collection of assets managed collectively but tracked separately with separate accounts on behalf of a plurality of investors; a computer-implemented database associating a plurality of holdings owned by each of the plurality of investors, wherein a holding may be traded regardless of initiator of purchase of the holding; a processor; and a memory coupled to the processor and having program instructions stored therein, the processor being operable to execute the program instructions, the program instructions providing, receiving or accessing at least one holding selection rule; receiving a requested trade; selecting a holding for trading from the plurality of holdings using the computer-implemented database, the holding selection rule; and the requested trade; determining whether the trade using the holding should be deferred using the computer-implemented database and the holding selection rules; and generating a deferred trade in a tax-managed sub-account associated with one investor of the plurality of investors using the holding if it is determined that the holding should be sold in order to realize a loss for the one investor, wherein a manager's account is unaffected by the loss realized by sale of the holding.

An exemplary embodiment of the invention may include the system, where the program instructions generate an offsetting purchase of the holding if it is determined that enough time has passed to avoid a wash-sale violation.

An exemplary embodiment of the invention may further include the system, where the program instructions further generating an offsetting purchase of a temporary offsetting holding; and generating a sale of the temporary offsetting holding when generating the offsetting purchase of the holding.

An exemplary embodiment of the invention may a method of providing, receiving or accessing a computer-implemented trading platform for intercepting trades, coordinating trading and/or preventing offsetting trades of one or more financial objects, the method being executed on a data processing system, the method may include: managing a virtual portfolio of the financial objects wherein the virtual portfolio may include a collection of the financial objects managed collectively but tracked separately with separately owned lots on behalf of a plurality of investors, wherein the financial object may include at least one of: equity, debt, a bond, a stock, a financial instrument, a contract, a security, a contract, a mutual fund, an exchange traded fund (ETF), a fund of funds, an index fund, a passive index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets tracking S&P indexes, Russell indexes, Dow Jones indexes, Morgan Stanley indexes, Lehman indexes, Wilshire indexes, composite indexes, Morgan Stanley Capital International indexes, a portfolio of assets tracking an ADBI weighted index, a commodity, an option, a derivative trade, a long hedge, a short hedge, a swap, a futures contract, a hedge fund, and/or a negative weighting on any financial object; providing, receiving or accessing a computer database associating a plurality of lots owned by each of the plurality of investors and associating the plurality of lots as tradable regardless of initiator of the purchase of the plurality of lots; providing, receiving or accessing lot selection rules may include investment management rules may include at least one of: coordinating trades, enforcing compliance with policy, and/or preventing offsetting trades may include avoiding both purchasing and selling the same lot; receiving a requested trade; and selecting a lot for trading from the plurality of lots using the computer database, the lot selection rules, and the requested trade.

An exemplary embodiment of the invention may include a method of managing one or more financial objects, the method being executed on a data processing system, the method may include: managing a plurality of virtual portfolios of the financial objects with separate lots owned by one or more individual investors and tracked separately; providing, receiving or accessing a computer-implemented lot matrix associating a plurality of lots with the plurality of virtual portfolios, each lot of the plurality of lots tradable regardless of initiator of purchase of the lot and associating the plurality of lots as separately owned by the one or more investors, wherein the financial object may include at least one of: equity, debt, a bond, a stock, a financial instrument, a contract, a security, a contract, a mutual fund, an exchange traded fund (ETF), a fund of funds, an index fund, a passive index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets tracking S&P indexes, Russell indexes, Dow Jones indexes, Morgan Stanley indexes, Lehman indexes, Wilshire indexes, composite indexes, Morgan Stanley Capital International indexes, a portfolio of assets tracking an ADBI weighted index, a commodity, an option, a derivative trade, a long hedge, a short hedge, a swap, a futures contract, a hedge fund, and/or a negative weighting on any financial object; providing, receiving or accessing lot selection rules may include investment management rules may include at least one of: coordinating trades, enforcing compliance with policy, and/or preventing offsetting trades may include avoiding both purchasing and selling the same lot; receiving a requested trade; and for each of the plurality of virtual portfolios, performing the following: for the requested trade, selecting a lot from the plurality of lots for execution of the requested trade using the lot selection rules, and the lot matrix.

An exemplary embodiment of the invention may a system for managing one or more financial objects may include: a virtual portfolio of the financial objects wherein the virtual portfolio may include a collection of the financial objects managed collectively but tracked separately with separately owned lots on behalf of a plurality of investors, wherein the financial object may include at least one of: equity, debt, a bond, a stock, a financial instrument, a contract, a security, a contract, a mutual fund, an exchange traded fund (ETF), a fund of funds, an index fund, a passive index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets tracking S&P indexes, Russell indexes, Dow Jones indexes, Morgan Stanley indexes, Lehman indexes, Wilshire indexes, composite indexes, Morgan Stanley Capital International indexes, a portfolio of assets tracking an ADBI weighted index, a commodity, an option, a derivative trade, a long hedge, a short hedge, a swap, a futures contract, a hedge fund, and/or a negative weighting on any financial object; a computer database adapted to associate a plurality of lots of the plurality of investors and adapted to associate the plurality of lots as tradable regardless of initiator of the purchase of one of the plurality of lots; a processor; and a memory coupled to the processor and having program instructions stored therein, the processor being operable to execute the program instructions, the program instructions including: lot selection rules may include investment management rules may include at least one of: coordinating trades, enforcing compliance with policy, and/or preventing offsetting trades may include avoiding both purchasing and selling the same lot; and instructions being adapted to receive a requested trade; and adapted to select a lot for trading from the plurality of lots using the computer database, the lot selection rules, and the requested trade.

An exemplary embodiment of the invention may include a data processing system for managing one or more financial objects may include: a plurality of virtual portfolios of the financial objects with separate lots owned by one or more individual investors, wherein the financial object may include at least one of: equity, debt, a bond, a stock, a financial instrument, a contract, a security, a contract, a mutual fund, an exchange traded fund (ETF), a fund of funds, an index fund, a passive index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets tracking S&P indexes, Russell indexes, Dow Jones indexes, Morgan Stanley indexes, Lehman indexes, Wilshire indexes, composite indexes, Morgan Stanley Capital International indexes, a portfolio of assets tracking an ADBI weighted index, a commodity, an option, a derivative trade, a long hedge, a short hedge, a swap, a futures contract, a hedge fund, and/or a negative weighting on any financial object; a computer-implemented lot matrix database associating a plurality of lots with the plurality of virtual portfolios each lot of the plurality of lots tradable regardless of initiator of purchase of the lot; a processor; and a memory coupled to the processor and having program instructions stored therein, the processor being operable to execute the program instructions, the program instructions including: lot selection rules may include investment management rules may include at least one of: coordinating trades, enforcing compliance with policy, and/or preventing offsetting trades may include avoiding both purchasing and selling the same lot; and instructions receiving one or more requested trades; and for each of the plurality of virtual portfolios, being adapted to perform the following: for the requested trade: the system operative to select a lot from the plurality of lots for execution of the requested trade using the lot selection rules, and the lot matrix.

An exemplary embodiment of the invention may include any of the above systems, methods and/or computer program products where the financial object may include: at least one unit of interest in at least one of: an asset; a liability; a tracking portfolio; a financial instrument and/or a security, wherein the financial instrument and/or the security denotes a debt, an equity interest, and/or a hybrid; a derivatives contract, including at least one of: a future, a forward, a put, a call, an option, a swap, and/or any other transaction relating to a fluctuation of an underlying asset, notwithstanding the prevailing value of the contract, and notwithstanding whether such contract, for purposes of accounting, is considered an asset or liability; a fund; and/or an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

Figure 1:
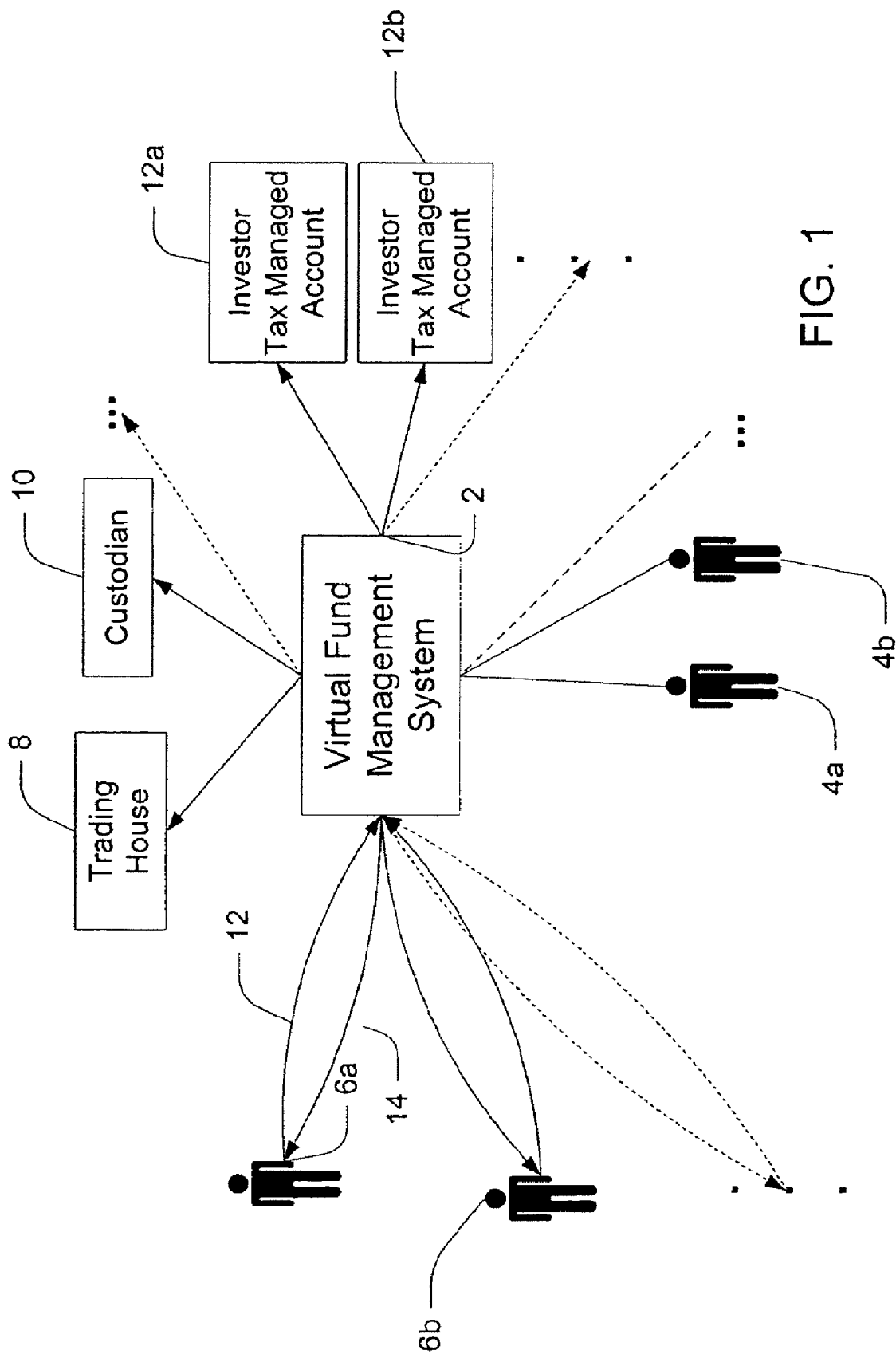
FIG. 1 is a block diagram of a virtual mutual fund management system in accordance with an exemplary embodiment of the present invention.

DETAILED DESCRIPTION OF EMBODIMENTS
OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

An exemplary embodiment of the invention may be implemented on a computing device(s), processor(s), computer(s) and/or communications device(s).

The computer, in an exemplary embodiment, may comprise one or more central processing units (CPUs) or processors, which may be coupled to a bus. The processor may, e.g., access main memory via the bus. The computer may be coupled to an input/output (I/O) subsystem such as, e.g., but not limited to, a network interface card (NIC), or a modem for access to a network. The computer may also be coupled to a secondary memory directly via bus, or via a main memory, for example. Secondary memory may include, e.g., but not limited to, a disk storage unit or other storage medium. Exemplary disk storage units may include, but are not limited to, a magnetic storage device such as, e.g., a hard disk, an optical storage device such as, e.g., a write once read many (WORM) drive, or a compact disc (CD), or a magneto optical device. Another type of secondary memory may include a removable disk storage device, which may be used in conjunction with a removable storage medium, such as, e.g. a CD-ROM, a floppy diskette or flash drive, etc. In general, the disk storage unit may store an application program for operating the computer system referred to commonly as an operating system. The disk storage unit may also store documents of a database (not shown). The computer may interact with the I/O subsystems and disk storage unit via bus. The bus may also be coupled to a display for output, and input devices such as, but not limited to, a keyboard and a mouse or other pointing/selection device.

In this document, the terms "computer program medium" and "computer readable medium" may be used to generally refer to media such as, e.g., but not limited to, a removable storage drive, a hard disk installed in hard disk drive, and signals, etc. These computer program products may provide software to the computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

A financial object, as discussed herein, may include at least one unit of interest in an asset; a liability; a tracking portfolio; and/or a financial instrument and/or a security, where the financial instrument and/or security denotes a debt, an equity interest, and/or a hybrid. A financial object, as discussed herein, may also include at least one unit of interest in a derivatives contract, including but not limited to at least one of: a future, a forward, a put, a call, an option, a swap, or other financial instrument whose price is derived from the price of the underlying financial asset, and/or any other transaction relating to a fluctuation of an underlying asset, notwithstanding the prevailing value of the contract, and notwithstanding whether such contract, for purposes of accounting, is considered an asset or liability. A financial object, as discussed herein, may also include at least one unit of interest in a fund; and/or in an investment entity or account of any kind, including an interest in, or rights relating to: a hedge fund, an exchange traded fund (ETF), a fund of funds, a mutual fund, a closed end fund, an investment vehicle, and/or any other pooled and/or separately managed investments.

Virtual Portfolio of Financial Objects

FIG. 1 is a block diagram of an exemplary virtual mutual fund management system in accordance with an exemplary embodiment of the present invention. Although referred to herein as a virtual mutual fund management system, the term VIRTUAL MUTUAL FUND™, available from Research Affiliates, LLC of Pasadena, Calif., USA, refers to a virtual portfolio of financial objects. As discussed above, an exemplary financial object may include securities, such as, e.g. but not limited to, stocks. An exemplary embodiment of the virtual portfolio of financial objects may include any other financial object. Indeed, an exemplary embodiment contemplates a virtual portfolio holding accounts and/or sub-accounts, which may include, in an exemplary embodiment, an interest in a fund, such as, e.g., but not limited to, a portfolio created and/ore weighted based on accounting data, such as, e.g., but not limited to, a RESEARCH AFFILIATES FUNDAMENTAL INDEX™ (RAFI™) available from Research Affiliates, LLC of Pasadena, Calif., USA. The virtual mutual fund management system 2 manages trades of securities such as stocks made on behalf of one or more investors, as exemplified by investors 4a and 4b, by one or more managers, as exemplified by managers 6a and 6b. The investors may include individuals and institutional investors such as pension funds, trusts, corporations, etc. The managers make trade requests, as exemplified by trade request 12, of securities on behalf of the investors and the virtual mutual fund management system determines if the trades should be made in consideration of the tax consequences for each investor. If the virtual mutual fund management system determines that a requested trade should take place, the virtual mutual fund management system requests the trades from one or more trading houses, as exemplified by trading house 8, or one or more custodians, as exemplified by custodian 10. In making the trade, the virtual mutual fund management system determines which of several lots of securities held by an investor should be used to make the trade so as to minimize any adverse tax consequences of the trade. If a trade should not take place because of an avoidable adverse tax consequence to an investor, the virtual mutual fund management system creates a deferred "paper" trade for the investor in a tax-managed sub-account 12a. The virtual mutual fund management system monitors the status of the deferred paper trade and consummates the deferred trade with an actual trade when the trade no longer creates an adverse tax consequence for the investor. The virtual mutual fund management system transmits back to the managers reconciliations of the managers' positions as exemplified by reconciliation 14.

Figure 2:
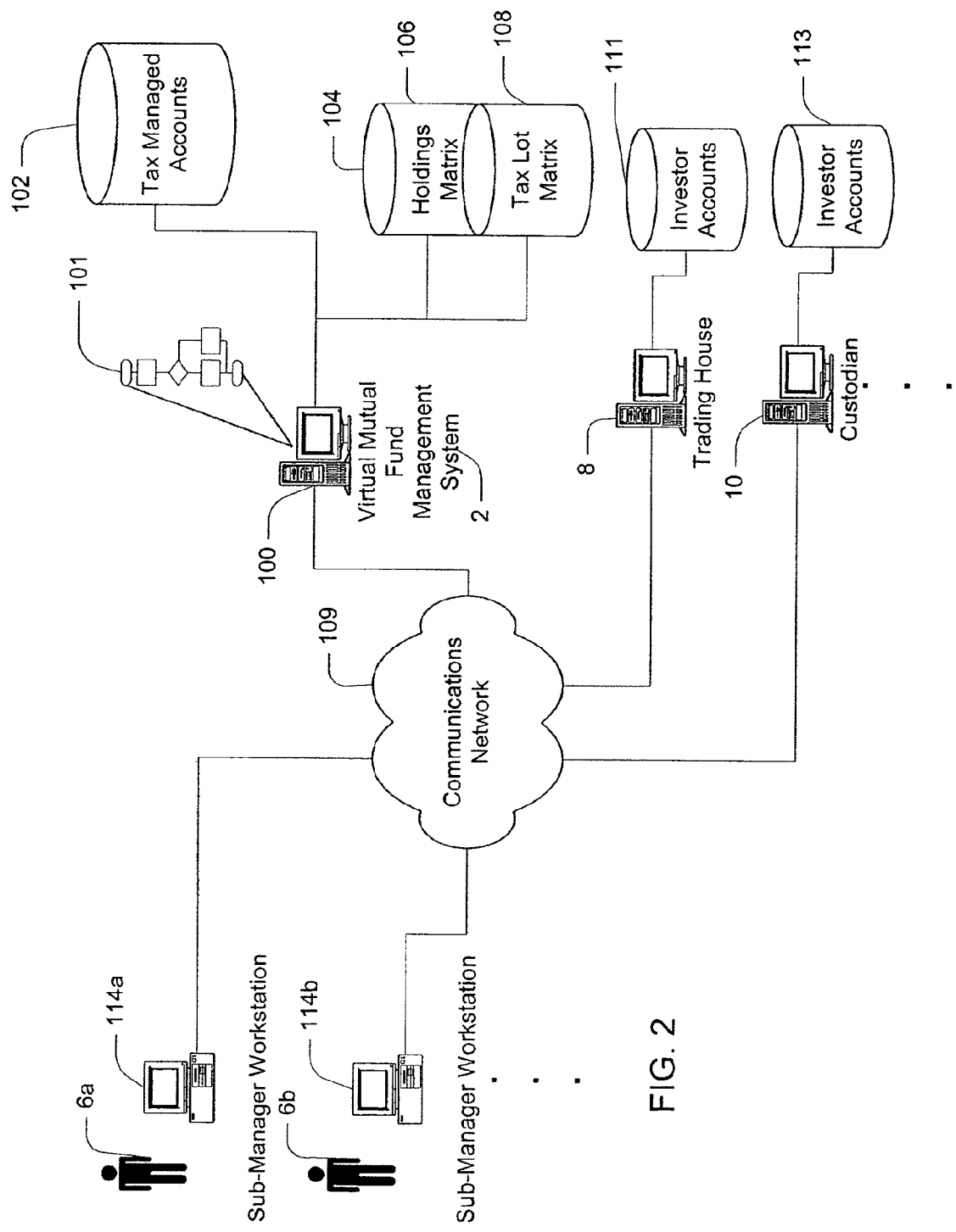
FIG. 2 is a deployment diagram of a virtual mutual fund management system in accordance with an exemplary embodiment of the present invention.

FIG. 2 is a deployment diagram of a virtual mutual fund management system in accordance with an exemplary embodiment of the present invention. A virtual mutual fund management system 2 includes a virtual mutual fund host 100 and software objects 101 implementing the features of the virtual mutual management system. The collective software objects are herein after termed a "virtual mutual fund manager". The virtual mutual fund manager is operably coupled to a database of tax-managed sub-accounts 102 and a tracking database 104. As previously described, a tax-managed sub-account is an sub-account held in an investor's name where paper trades are held for actual trades deferred because of adverse tax consequences. The tracking database includes a holdings matrix 106 associating exemplary managers 6a and 6b with a virtual mutual fund. The tracking database further includes a tax lot matrix associating specific lots of securities held in the name of investors to a virtual mutual fund.

The virtual mutual fund manager is operably coupled through a communications network 109 to one or more trading houses, as exemplified by trading house 8, or one or more custodians, as exemplified by custodian 10. The trading houses and custodians manage actual investor sub-accounts, 111 and 112 respectively, for an investor or investors participating in the virtual mutual fund. The managers use manager workstations, as exemplified by manager workstations 114a and 144b, to transmit trade requests to the virtual mutual fund manager via the communications network.

Figure 3:
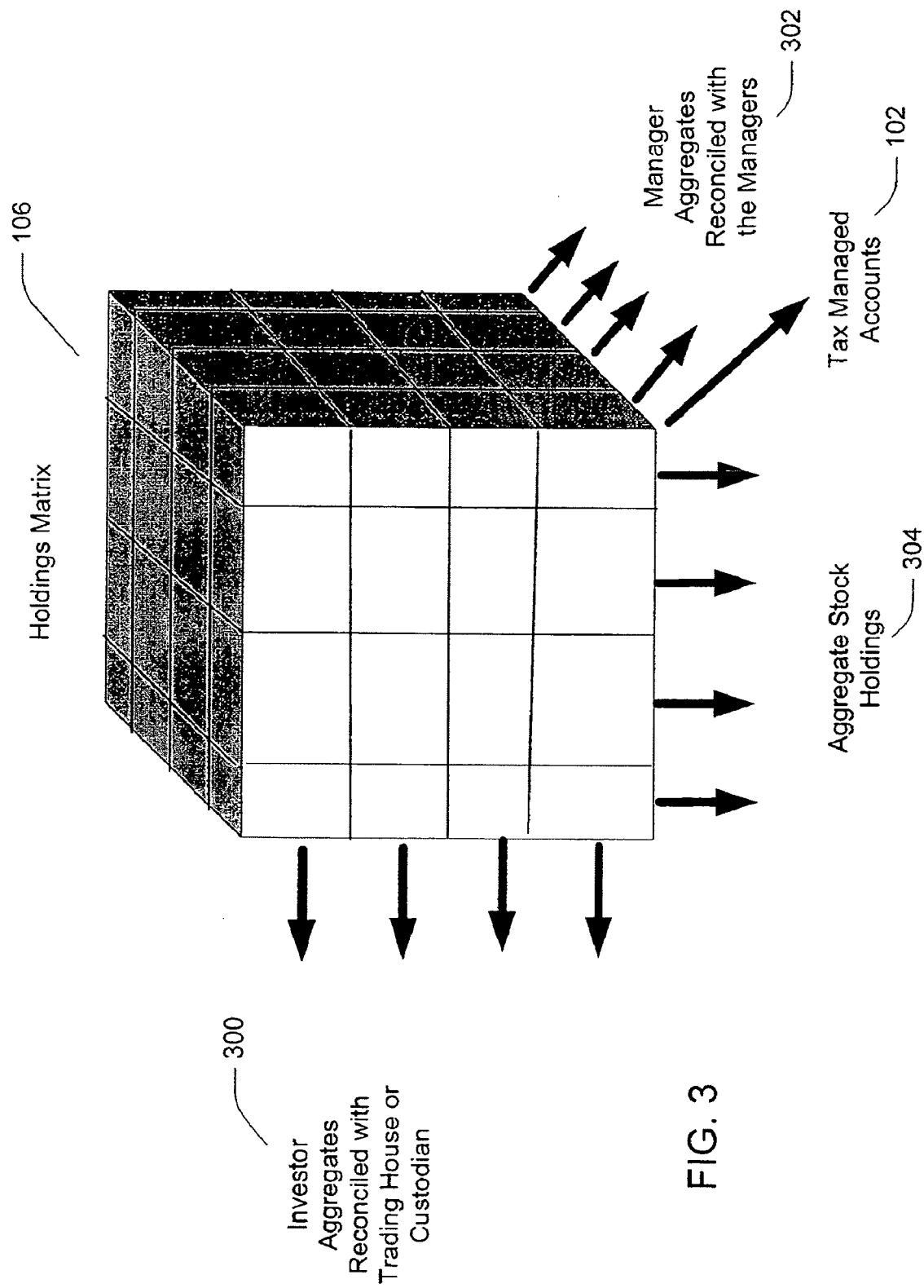
FIG. 3 is a diagram of a holdings matrix in accordance with an exemplary embodiment of the present invention.

FIG. 3 is a diagram of a holdings matrix in accordance with an exemplary embodiment of the present invention. A holding matrix 106 is a paper portfolio including the lot matrix less deferred trades. The holdings matrix associates one or more managers with the holdings of one or more investors. The holdings matrix is used to generate investor aggregates 300 for reconciliation with a trading house or custodian. As each manager has a separate portfolio base, the holdings matrix is also used to generate manager aggregates 302 for reconciliation by the managers of their respective positions in their respective portfolio bases. The holdings matrix is also used to determine the aggregate holdings of a particular asset 304. The holdings matrix may also associate an investor with one or more tax-managed sub-accounts 102.

In one embodiment of a holdings matrix in accordance with an exemplary embodiment of the present invention, the holdings matrix is realized in a database. For example, a database record may contain fields for an investor identifier, a manager identifier, an asset identifier, and the number of units of the asset held on sub-account for the investor. The database can then be queried to aggregate the holdings of a particular investor or of a particular manager.

Figure 4:
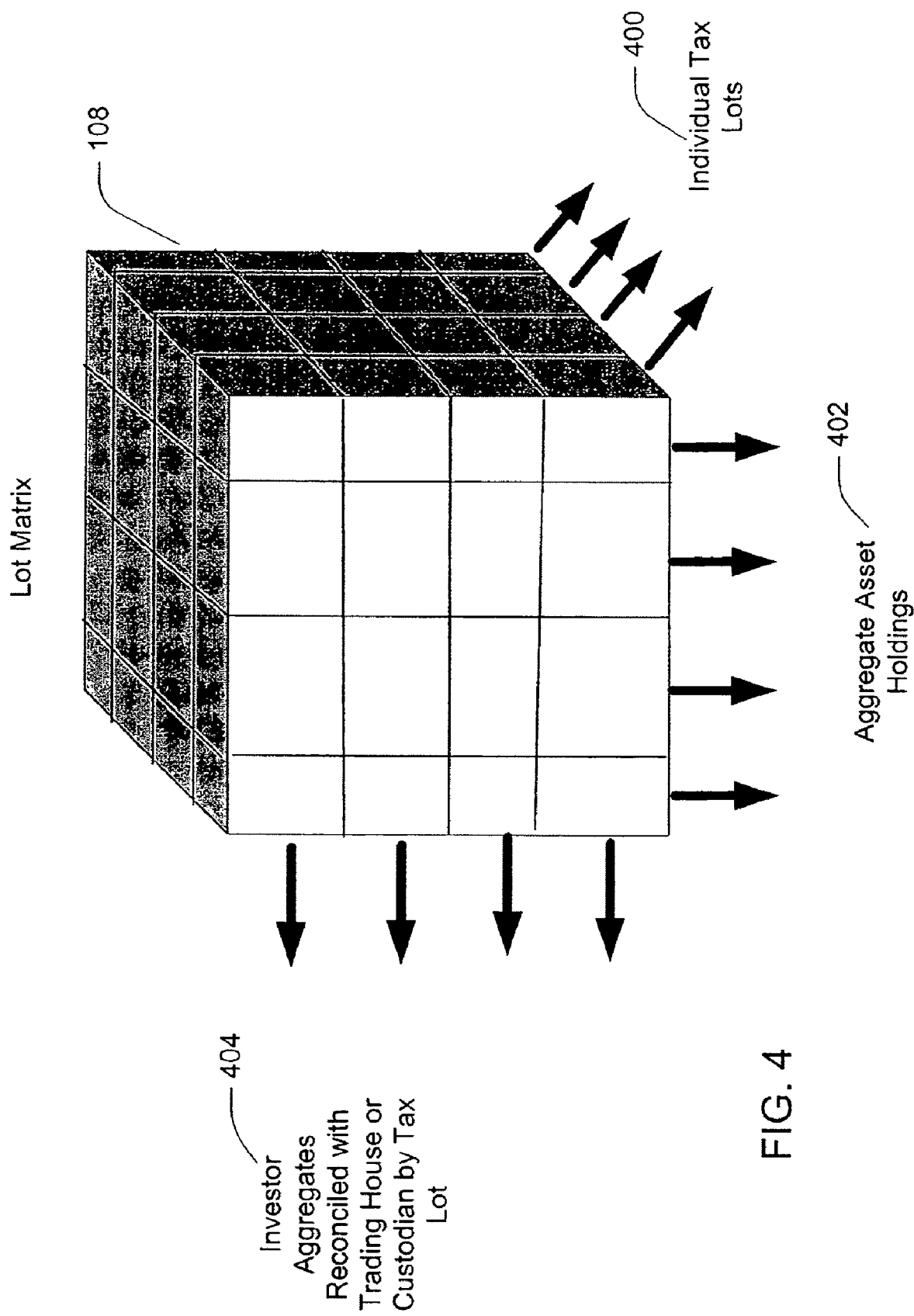
FIG. 4 is a diagram of a lot matrix in accordance with an exemplary embodiment of the present invention.

FIG. 4 is a diagram of a lot matrix in accordance with an exemplary embodiment of the present invention. A lot matrix 108 associates individual lots of assets 400 with investors. Once associated, a virtual mutual fund manager can determine which lots of assets to trade or defer for an investor based on the tax consequences of trading the lot for the investor's sub-account. Additionally, the lots can be reconciled (404) with a trading house or custodian or aggregated (402) in order to determine the investor's holdings at any time.

In an embodiment of a lot matrix in accordance with an exemplary embodiment of the present invention, the lot matrix is realized in a database. For example, a database record may contain fields for an investor identifier, an asset identifier, a date of purchase, number of units of the asset that were purchased, and the purchase price per unit of the asset. The database can then be queried in a variety of ways such as by investor identifier to create aggregations of holdings, by investor identifier and asset id to determine purchase prices, and investor identifier and asset id to determine purchase dates.

Figure 5:
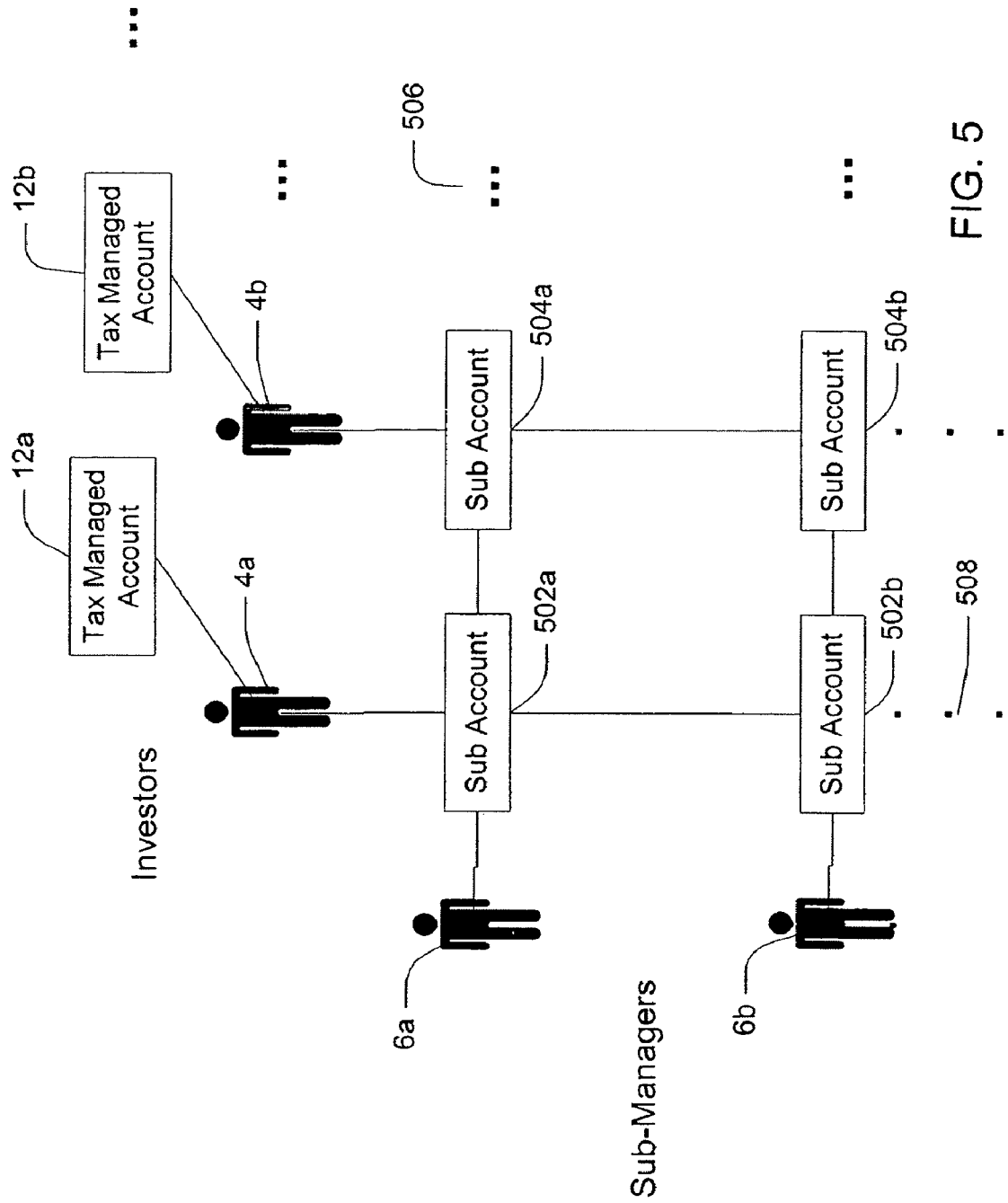
FIG. 5 is a block diagram of the associations between a plurality of virtual mutual funds, a plurality of managers, and a plurality of tax-managed sub-accounts in accordance with an exemplary embodiment of the present invention.

FIG. 5 is a block diagram of the associations between virtual mutual funds, a plurality of managers, and a plurality of tax-managed sub-accounts in accordance with an exemplary embodiment of the present invention. One or more managers, as exemplified by managers 6a and 6b, are associated with one or more investors, as exemplified by investors 4a and 4b, by sub-accounts, as exemplified by sub-accounts 502a, 502b, 504a, and 504b.

A single manager manages one or more sub-accounts, such as manager 6a managing sub-accounts 502a and 504a thus creating a "virtual mutual fund". In a conventional mutual fund, a group of investors make small investments into the mutual fund and a professional manager manages the mutual fund. However, the investors do not directly hold the assets of the mutual fund, thereby missing some of the tax advantages associated with holding an asset directly. A virtual mutual fund allows a group of investors to directly hold assets in sub-accounts, thereby capturing any tax benefits from the direct holdings, and have the benefit of a professional manager. In return, the virtual mutual fund allows a professional manager to have a group of investors with small investments aggregated into a single virtual mutual fund, thus making it economically feasible for the professional manager to manage investments for smaller investors. Each manager manages their virtual mutual fund as a separate portfolio base independently of the other managers with the virtual mutual fund manager resolving conflicts between manager requests for trades within the sub-accounts.

A manager makes trades using the investors' sub-accounts with each manager making trades for one or more investors. To determine a manager's position, investor sub-accounts managed by the manager are aggregated. For example, to determine manager 6*a*'s position, sub-account 502*a* belonging to investor 4*a* and sub-account 504*a* belonging to investor 4*b* are aggregated. In this example, manager 6*a* is shown with only two investors. In other embodiments, manager 6*a* may manage many more sub-accounts, and thus many more investors, as indicated by ellipses 506.

To determine the aggregate holdings of an investor, the separate sub-accounts of an investor are aggregated. For example, to determine the holdings of investor 4*a*, sub-account 502*a* managed by manager 6*a* is aggregated with sub-account 502*b* managed by manager 6*b*. In this example, investor 4*a* is shown with only two sub-accounts. In other embodiments, investor 4*a* may have many more sub-accounts as indicated by ellipses 508. By having multiple sub-accounts managed by multiple managers, an investor can participate in multiple virtual mutual funds.

An investor may also be associated with a tax-managed sub-account as exemplified by tax-managed sub-account 12*a* associated with investor 4*a* and tax-managed sub-account 12*b* associated with investor 4*b*. A tax-managed sub-account is used to generate deferred trades on an investor's behalf if a requested trade will have an adverse tax consequence for an investor. For example, manager 6*a* may make a trade request that requires investor 4*a* and 4*b* to sell a particular asset. For investor 4*a*, this may have no adverse tax consequence and the trade is consummated using assets held in investor 4*a*'s sub-account 502*a*. However, the requested trade may have adverse tax consequences for investor 4*b*. In this case the trade is replaced by a paper trade transferring assets from investor 4*b*'s sub-account 504*a* to investor 4*b*'s tax-managed sub-account 12*b*. In this example, manager 6*a* sees that all of the sub-accounts the manager manages have made the requested trade. However, investor 4*b* still holds the asset specified in the requested trade thus avoiding the adverse tax consequence for investor 4*a*.

Figure 6:
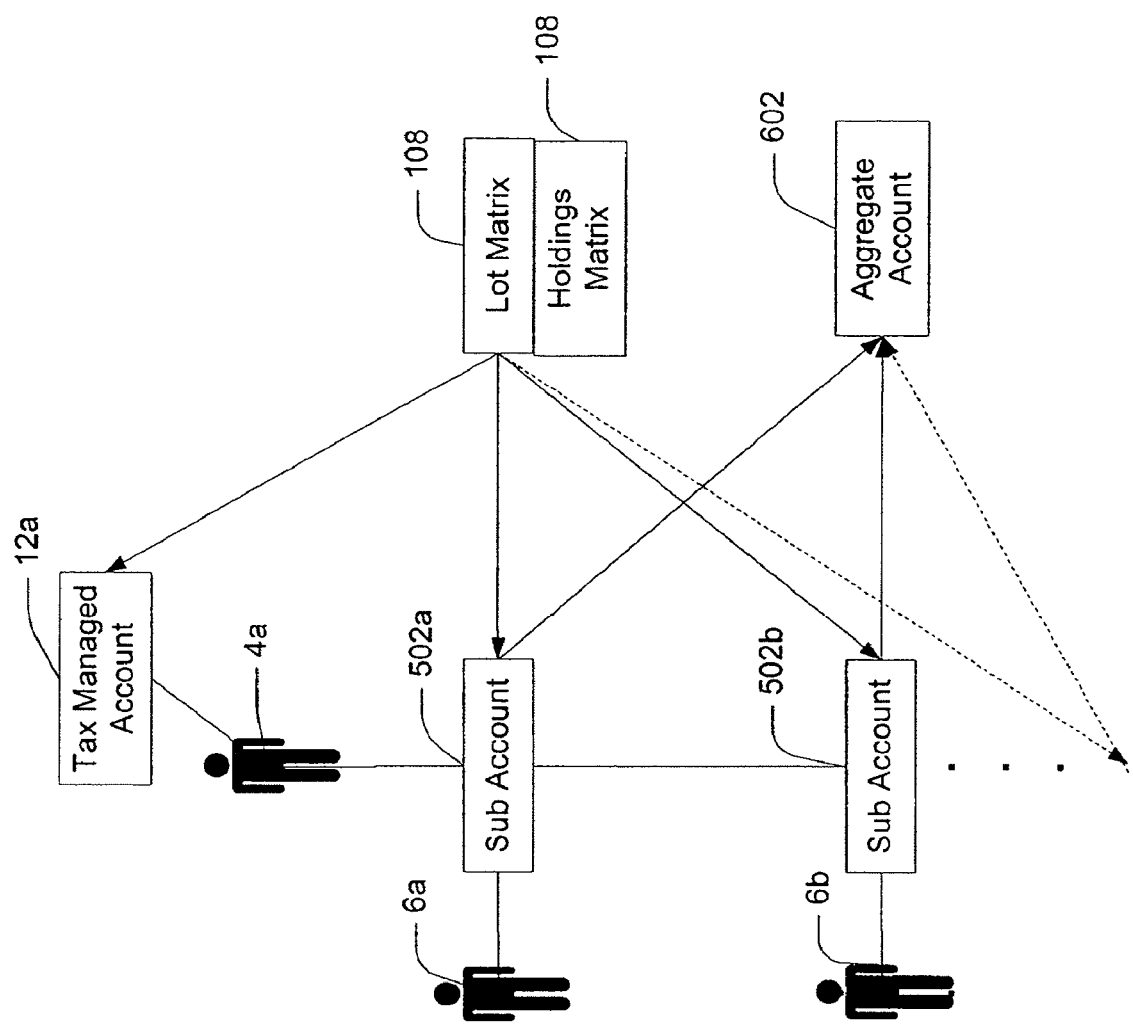
FIG. 6 is a block diagram of the associations between a plurality of managers and a single virtual mutual fund in accordance with an exemplary embodiment of the present invention.

FIG. 6 is a block diagram of the associations between a plurality of managers and a single virtual mutual fund in accordance with an exemplary embodiment of the present invention. An investor 4*a* is associated with one or more managers, as exemplified by managers 6*a* and 6*b*, through one or more sub-accounts as exemplified by sub-accounts 502*a* and 502*b*. The investor is also associated with a tax-managed sub-account 12*a*. The lots of assets held by the investor in each sub-account and the tax-managed sub-account are tracked using the previously described lot matrix 108 and holdings matrix 106. The sub-accounts for the investor can be aggregated using the holdings matrix to generate an aggregate sub-account 602 for the investor.

Figure 7:
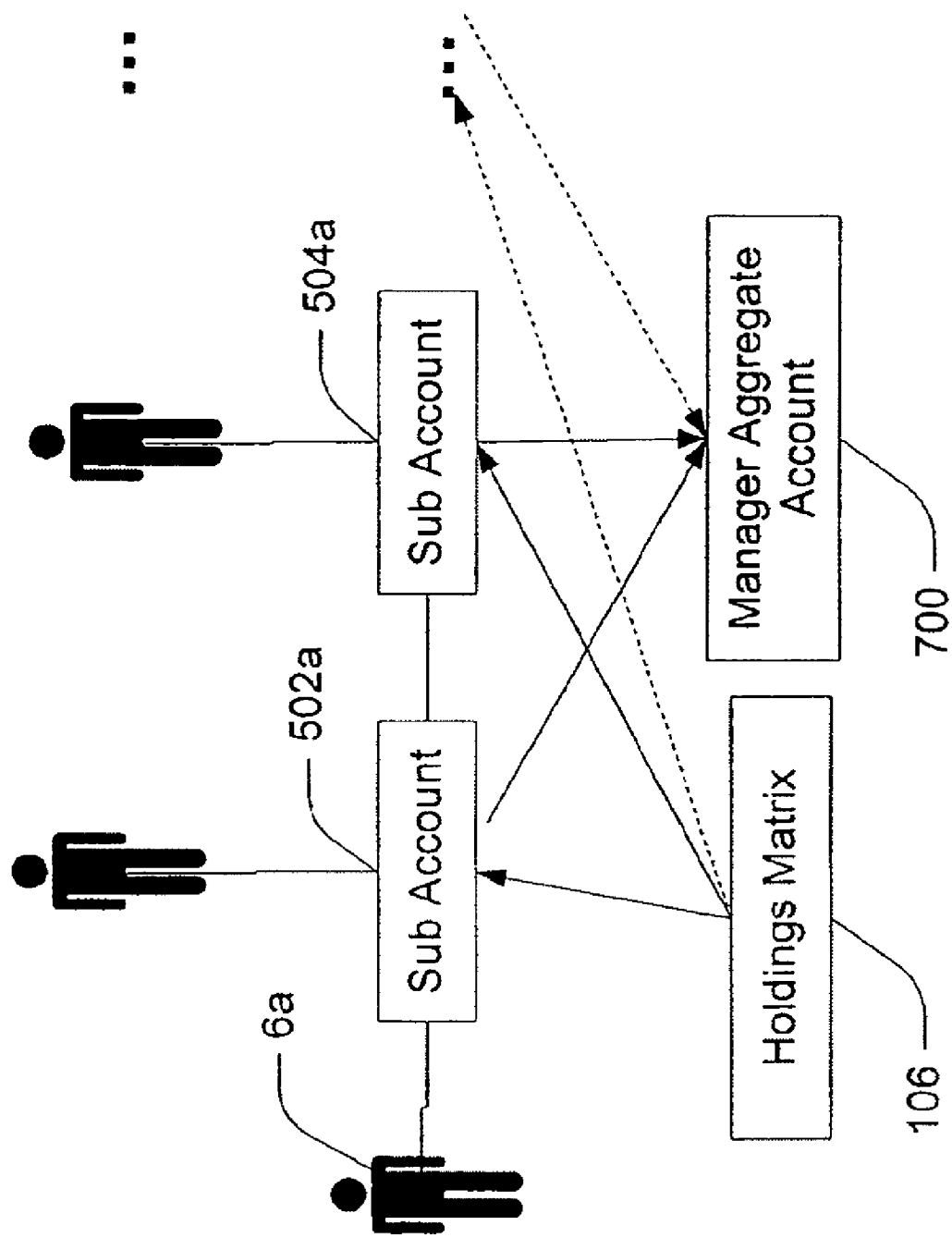
FIG. 7 is a block diagram of the associations between a manager and a plurality of virtual mutual funds in accordance with an exemplary embodiment of the present invention.

FIG. 7 is a block diagram of the associations between a manager and a plurality of, virtual mutual funds in accordance with an exemplary embodiment of the present invention. A manager 6*a* manages one or more sub-accounts, as exemplified by sub-account 502*a* associated with investor 4*a* and sub-account 504*a* associated with investor 4*b*. The associated sub-accounts are tracked using holdings matrix 106. Using the holdings matrix, a manager aggregate sub-account 700 can be generated for the manager.

Figure 8:
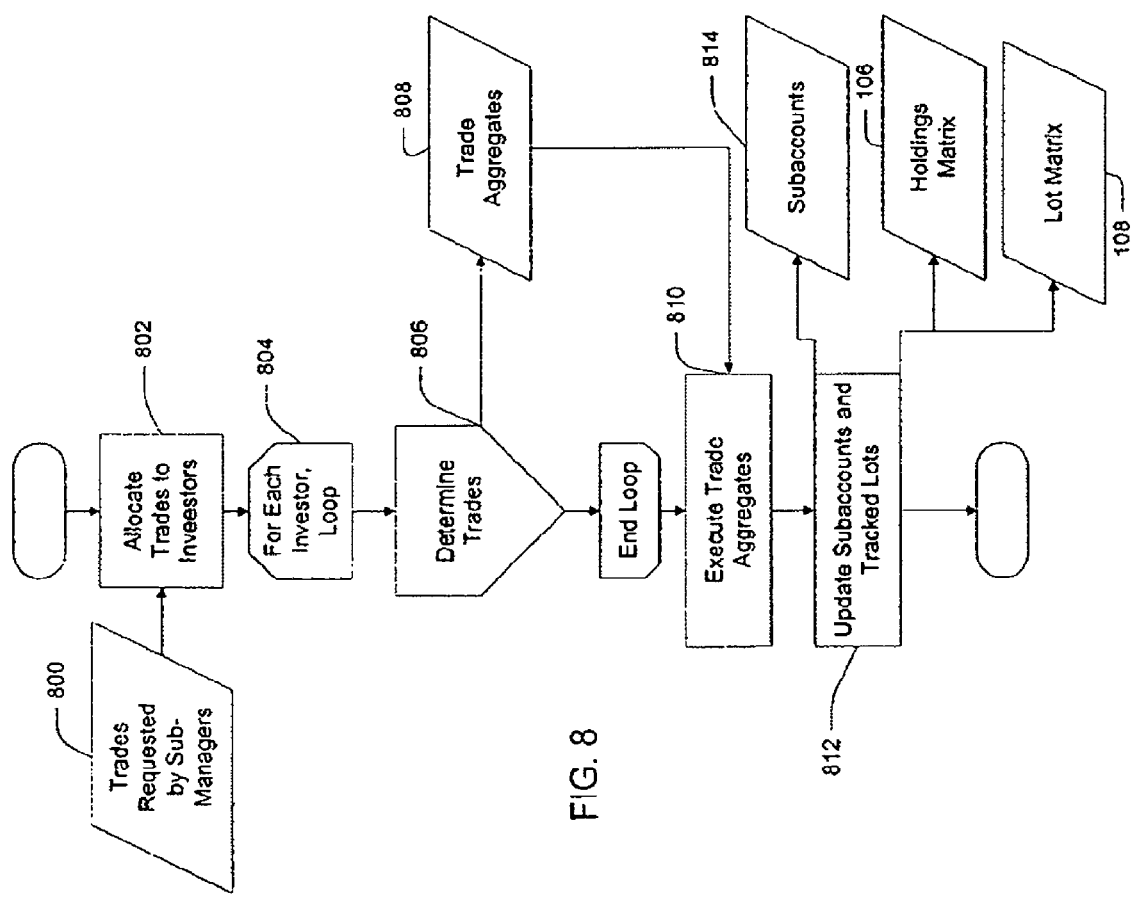
FIG. 8 is a process flow diagram of a trading process used by a virtual mutual fund manager in accordance with an exemplary embodiment of the invention.

FIG. 8 is a process flow diagram of a trading process used by a virtual mutual fund manager in accordance with an exemplary embodiment of the invention. The virtual mutual fund manager receives trades 800 requested by managers. The virtual mutual fund manager allocates (802) the requested trades to the investors. For each investor (804) the virtual fund manager determines (806) which trades should be processed from the investor's sub-accounts in a to-be-described process. The trades to be processed are aggregated into trade aggregates 808 for transmission to a trading house or a custodian. The collected trade aggregates are used to execute (810) the requested trades by transmitting the trade aggregates to a trading house or a custodian. The virtual fund manager updates (812) the investor's sub-accounts 814, the holdings matrix 104, and the lot matrix 106.

Figure 9:
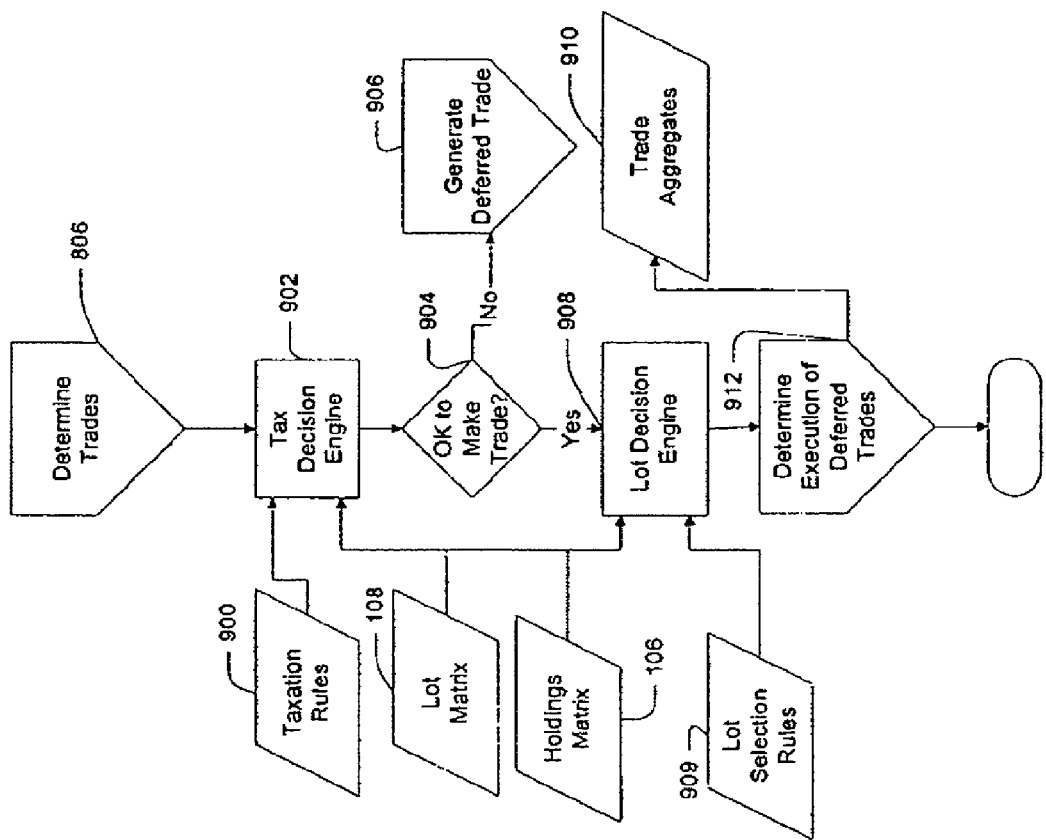
FIG. 9 is a process flow diagram of a trade determination process used by a virtual mutual fund manager in accordance with an exemplary embodiment of the invention.

FIG. 9 is a process flow diagram of a trade determination process 806 used by a virtual mutual fund manager in accordance with an exemplary embodiment of the invention. The virtual fund manager uses taxation rules 900, lot matrix 108, and holdings matrix 106 in a tax decision engine 902 to determine whether or not a requested trade will result in adverse tax consequences for the investor. If the virtual fund manager determines (904) that a requested trade will result in adverse trade consequences for the investor, the virtual fund manager generates (906) a deferred trade for the investor in a to-be-described process.

Deferred trades allow an investor to use multiple managers while avoiding some conflicts between the multiple managers. For example, a first manager may want to sell an asset from the investor's portfolio and a second manager may want to buy the same asset for the same investor's portfolio. Making the actual trades causes the second manager's trade to reverse the first manager's trade. By deferring both trades, sales commissions can be saved and potential adverse tax consequences can be avoided.

In another example, a trade may be deferred because the trade will result in a "wash sale". A wash sale occurs when an investor buys replacement assets within 30 days before or after the sale of substantially the same asset. If a wash sale occurs, the investor is prevented from claiming a loss on a sale of the asset and the basis for tax purposes of the replacement asset is readjusted to the basis of the sold asset.

In another example, a trade is deferred if the requested trade will increase the investor's capital gains tax burden because the asset that is the subject of the requested trade has not been held long enough by the investor to qualify for a lower capital gains rate.

If the virtual fund manager determines (904) that a trade is allowable, the virtual fund manager uses a lot decision engine 908, a set of lot selection rules 909, the lot matrix, and the holding matrix to determine which lot held by the investor in the investor's sub-accounts to trade. For example, the lot decision engine will choose to trade a lot with the highest basis in order to generate the smallest amount of capital gains from the sale of an asset. This reduces the adverse tax consequences to the investor from the trade. The virtual fund manager generates a trade aggregate 910 for the investor that is added to the previously described trade aggregates used by the virtual fund manager to execute non-deferred trades. The virtual fund manager also determines 912 if any deferred trades should now been executed on behalf of the investor in a to-be-described process. If any deferred trades are to be executed, the trades are added to the trade aggregate generated for the investor.

In another exemplary embodiment, other adverse consequences other than tax consequences, may be avoided, such as, e.g., but not limited to, uncoordinated trades, avoiding trades which are noncompliant with management strategy, trades failing to meet investment management rules, etc. As will be understood, in an exemplary embodiment, a trading platform may be provided which may avoid offsetting trades of one or more financial objects. The trading platform, in an exemplary embodiment, may be provided an umbrella-like view of trading, which may include intercepting trades prior to execution, determining which trades may make sense, coordinating trades that make sense based on a set of rules, where the trades may come from multiple managers with one or more portfolios, and/or multiple portfolios with one or more managers. The trading platform according to an exemplary embodiment, may take investment management strategy, formulate the strategy into rules, and may then take the rules and may intercept trades, in one exemplary embodiment, intercepting all trades, and may enforce the rules so as to, e.g., but not limited to, allow, prevent, defer, and/or modify a trade according to the rules, in an exemplary embodiment. In one exemplary embodiment, tax implications may be considered in the rules. In another exemplary embodiment, other investment management rules may be enforced.

In another exemplary embodiment, e.g., but not limited to, an energy company, for example, may wish to manage trading of financial objects at a company, or subsidiary level. In an exemplary embodiment, the energy company may desire to trade to hedge risk in the areas of commodities. The energy company, in the exemplary embodiment, could have certain trading rules requiring, e.g., that managers stay within particular limits of trading, perhaps another rule could require that the manager cannot be a market maker, etc. In an exemplary embodiment, trading may include use of derivative trades, commodities, options, calls, puts, futures contracts, hedges, long and short hedges, etc. In an exemplary embodiment, categories of trade like transactions may also be coordinated.

In another exemplary embodiment, imagine that a trading company has, e.g., but not limited to, 50 traders, all incurring brokerage and mediation fees, in an exemplary embodiment, internal trading within the company may occur so as to avoid external transaction costs related to markets, etc.

Figure 10:
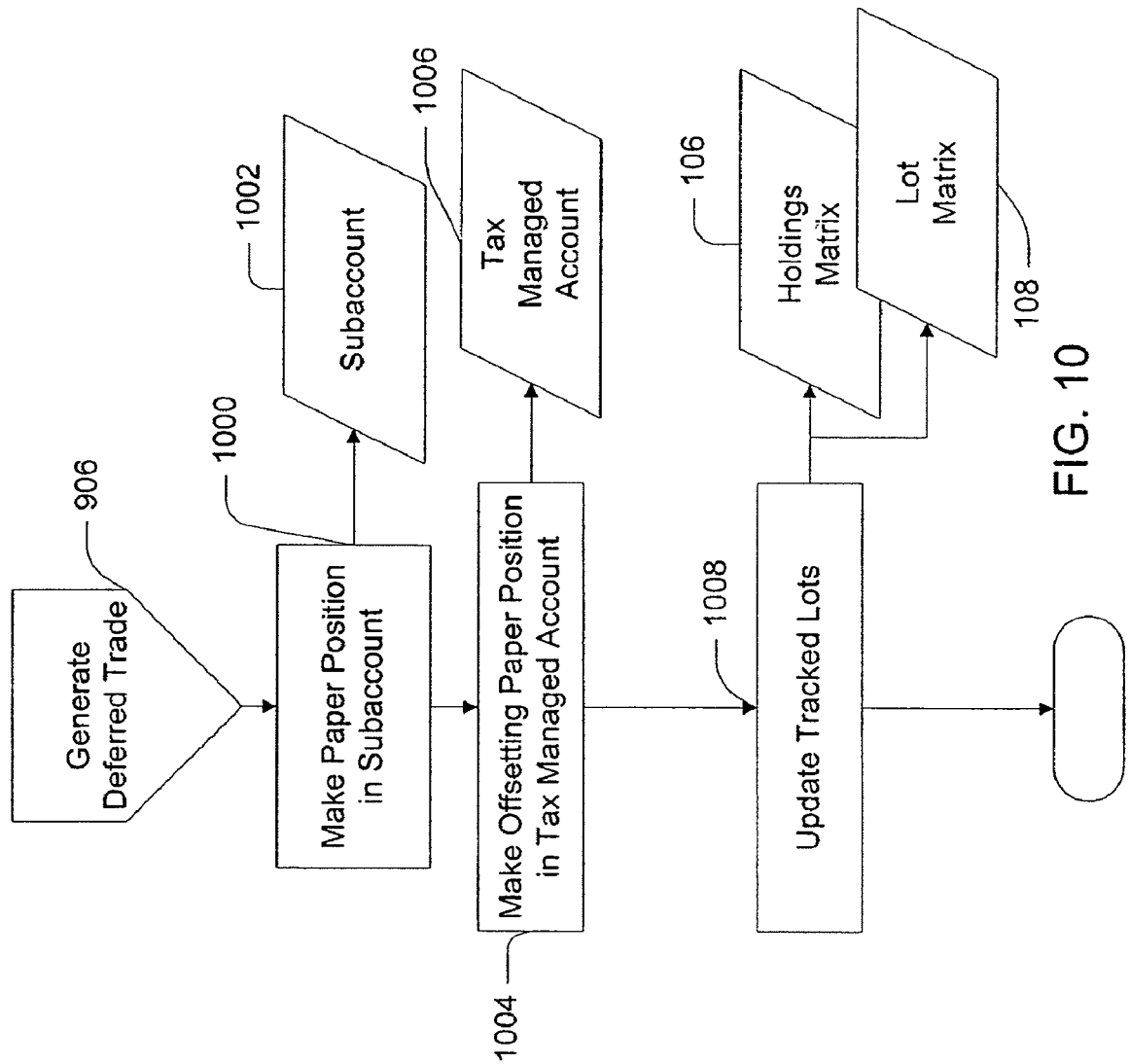
FIG. 10 is a process diagram of a deferred trade determination process used by a virtual mutual fund manager in accordance with an exemplary embodiment of the invention.

FIG. 10 is a process diagram of a deferred trade generation process 906 used by a virtual mutual fund manager in accordance with an exemplary embodiment of the invention. The virtual fund manager generates 1000 a paper position in a sub-account 1002 of the investor and the virtual fund manager also generates (1004) an offsetting paper position in a tax-managed sub-account 1006 maintained by the investor. The positions are paper positions because the investor still holds the asset, but the asset has been transferred from one sub-account, the sub-account, to another sub-account, the tax-managed sub-account, both of which are held by the investor. To continue to track the asset as it is moved between sub-accounts, the virtual fund manager updates (1008) holdings matrix 104 and lot matrix 106.

Figure 11:
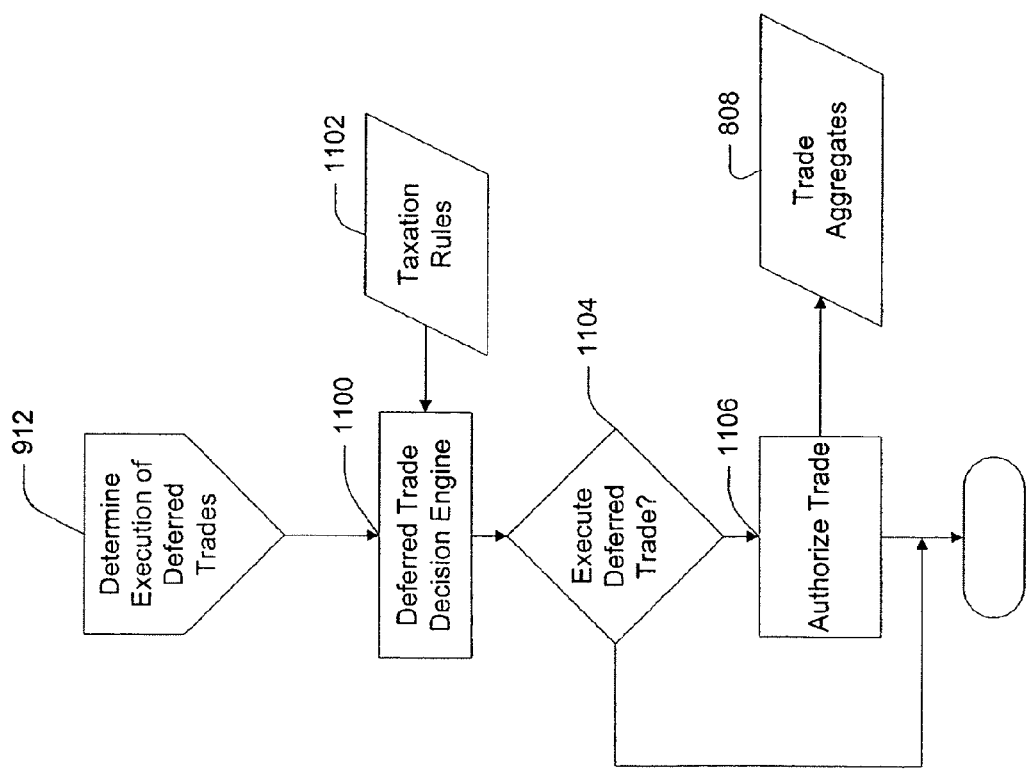
FIG. 11 is a process diagram of a deferred trade execution process used by a virtual mutual fund manager in accordance with an exemplary embodiment of the invention.

FIG. 11 is a process diagram of a deferred trade execution determination process 912 used by a virtual mutual fund manager in accordance with an exemplary embodiment of the invention. The virtual fund manager uses a deferred trade decision engine 1102 and a set of taxation rules in order to determine when a deferred trade should be executed. For example, if the investor can take advantage of lower capital gains rate by waiting for two weeks before a lot of assets are sold, the virtual fund manager waits for two weeks before the lot is sold. In another example, if a manager has requested that some assets should be acquired for an investor's sub-account but the acquisition would violate a wash rule, the virtual fund manager waits until the wash rule no longer applies and the investor may acquire the asset before actually executing the trade. If the virtual fund manager determines (1104) from the results of the deferred trade decision engine that a deferred trade should be executed, the virtual fund manager authorizes the trade by adding the deferred trade to the investor's aggregated trade 808 for execution by a trading house or custodian.

The use of deferred trades also allows a crossing trade. Crossing is related to any rule that results in a paper trade followed by an actual trade deferred to a later date. For example, assume that a rule is in place where 100 shares of stock A cannot be purchased during a current month, so the trade of stock A is deferred until next month. A paper trade is created indicating to the portfolio manager that 100 shares of stock A were purchased at the current market price. It is recorded that 100 shares of stock A will be bought in a following month.

During the following month, a request may come in by another manager or even the same manager to sell 100 shares or less of stock A. Since stock A was never actually purchased, the sale would have to be put on hold until the stock was actually bought in order to sell it. Instead of actually proceeding with the purchase and sale, the current trade is crossed with the deferred trade, creating another paper trade indicating that 100 shares of stock A were sold at a current market price and the deferred trade is canceled trade.

There are two advantages to crossing. Crossing may minimize wash sale exposure since crossing reduces actual trade volume. Crossing may also improve the quality of execution since no broker fees are incurred and the deferred trade volume is reduced. Crossing is the cancellation of one or more deferred trades or a portion of those trades where the net position change that would have resulted is negated by one or more new trades. The new trades or a portion of the new trades is also canceled according to the amount, which matches one or more deferred trades.

Figure 19:
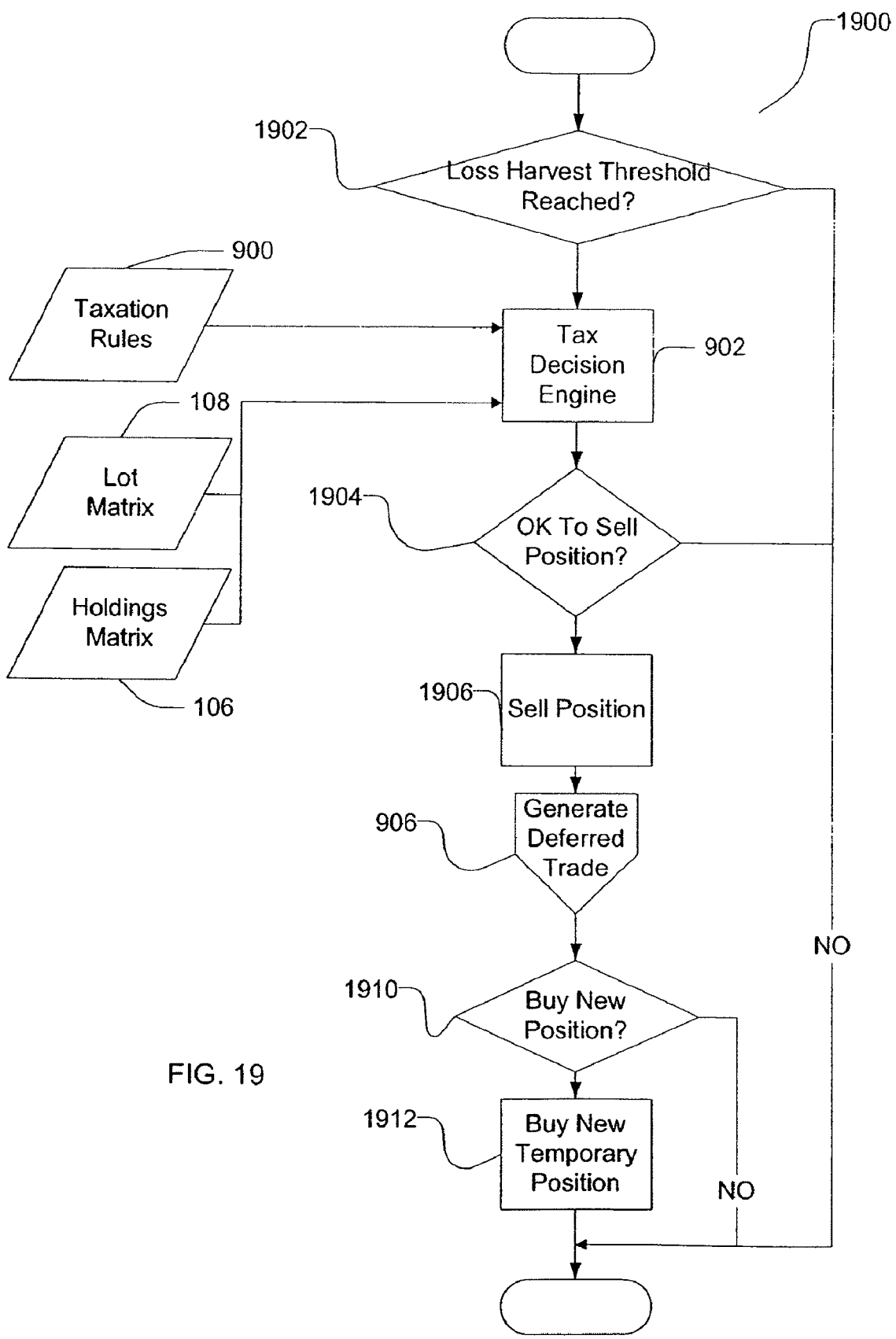
FIG. 19 is a process flow diagram of a loss-harvesting process in accordance with an exemplary embodiment of the present invention.

FIG. 19 is a process flow diagram of a loss-harvesting process in accordance with an exemplary embodiment of the present invention. A loss-harvesting process 1900 implements a method whereby an holding from an investor's portfolio is sold when the current value of the holding is lower than the holding's purchase price by some pre-established threshold. The investor may then realize a loss and claim the loss for tax purposes. For instance, if stock A is purchased at $40, and a loss harvest threshold is established at 10 percent, the loss harvest process sells the holding when the price goes to $36. This is similar to a stop sell order. When the holding is sold off, a deferred trade is created to buy back the holding in 31 days. The 31 day wait is required to avoid a wash sale as previously described. The sale and repurchase of the holding is done to avoid reconstituting the portfolio and to create a loss sale transaction. In another embodiment, another temporary holding is purchased and held for the wash-sale period such as the next 30 days. The temporary holding is then sold to raise cash to regain the old holding. In addition to monitoring the price of the holding, the loss-harvesting process confirms whether there will be a wash-sale exposure in that holding. If there is a wash-sale exposure then the loss can not be claimed for the current year.

A loss-harvesting process determines (1902) if a position, such as a held stock, has declined in value to the point that its value drops below the loss-harvesting threshold. If so, the loss-harvesting process uses the previously described tax decision engine 902, taxation rules 900, lot matrix 108, and holdings matrix 106, to determine (1904) if the position can be sold. If the position can be sold, the loss-harvesting process sells (1906) the position and generates (906) a deferred trade. The deferred trade is deferred for a period of time sufficient to avoid a wash sale as previously described. The loss-harvesting process then determines (1910) if a new position should be bought to be held during the wash sale period for the position that was sold. If a new position should be bought, such as another stock, the loss-harvesting process buys (1912) a new position.

In summary, loss-harvesting is the selling of a position to capture a capital loss in the current year that can be used to offset capital gains. Since the purpose of the sale is to capture a capital loss, it is only done when the wash sale rule does not apply. After 31 days, the position is repurchased. During the 31-day interim, the money raised may or may not be used to purchase a substitute investment. If a substitute investment is purchased it is sold after 30 days to repurchase the original investment or at such other time when the wash sale rule is not in effect.

Figure 12:
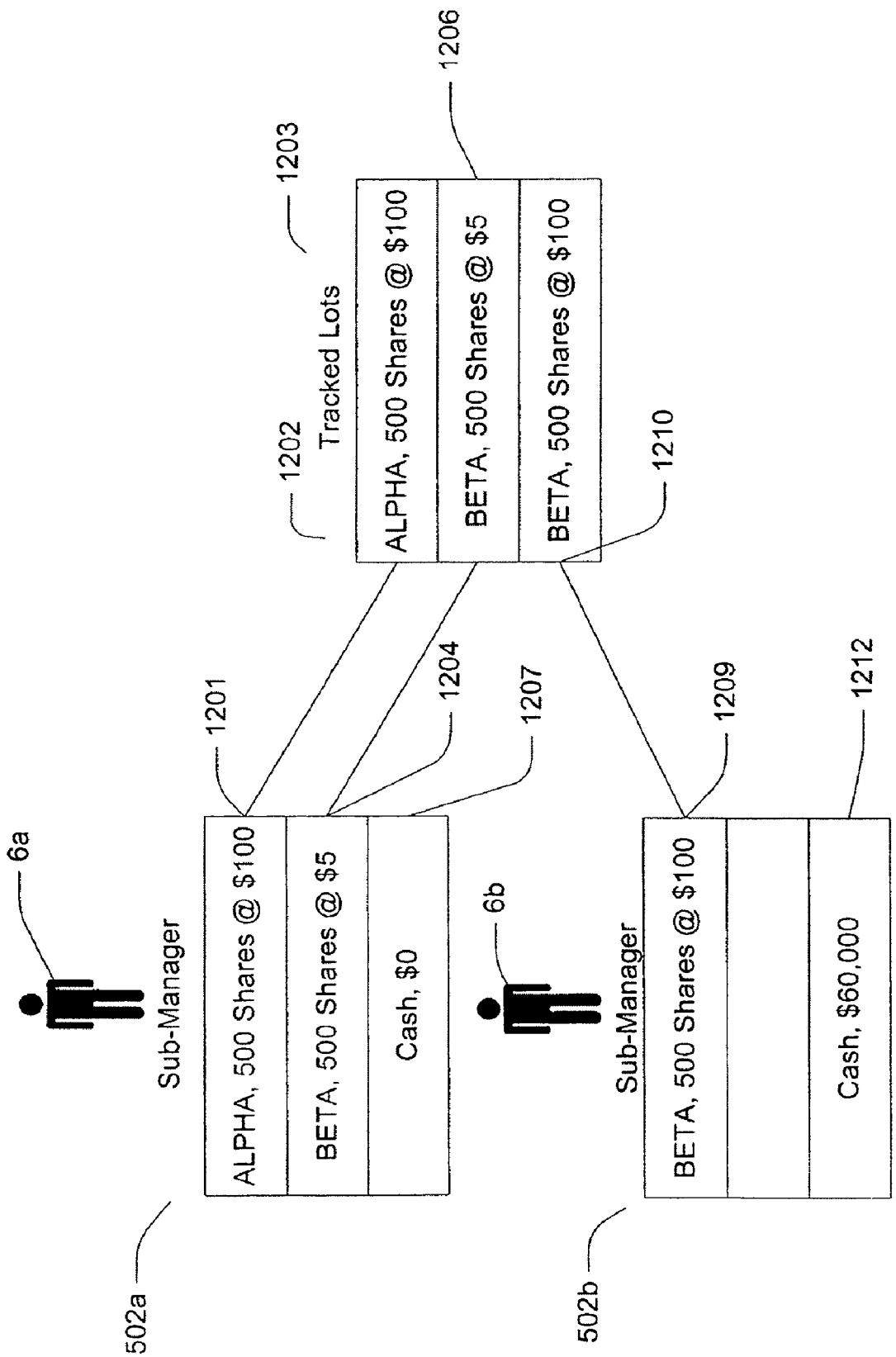
FIG. 12 is a block diagram of an example of an initial state for a plurality of sub-accounts before a trade as used by a virtual mutual fund manager in accordance with an exemplary embodiment of the invention.

FIG. 12 is a block diagram of an example of an initial state for a plurality of sub-accounts before a trade as used by a virtual mutual fund manager system in accordance with an exemplary embodiment of the invention. Manager 6a manages sub-account 502a for an investor as previously described. Manager 6b manages sub-account 502b for the same investor as previously described. Included in sub-account 502a, are two lots of assets. Lot 1201 includes 500 shares of ALPHA bought at $100 per share is tracked in a data set of tracked lots 1203 through the previously described holdings and lot matrices. The matrices include a record 1202 pointing to lot 1201 in sub-account 502a. The price of $100 per share is thus the basis of the lot ALPHA held by the investor in sub-account 502a. Sub-account 502a further includes lot 1204 including 500 shares of BETA bought at $5 per share. Lot 1204 has a corresponding data record 1206 in the holding and lot matrices. Sub-account 502a further includes a cash on hand amount 1207, currently at $0.

Sub-account 502b includes lot 1209 including 500 shares of BETA purchased for $100 per share. Lot 1209 is tracked using data record 1210 included in the holding and lot matrices. Sub-account 502b further includes a cash on hand amount of $60,000. This is the initial state of the sub-accounts in this example before any trades take place.

In operation, manager 6a makes a trade request that 500 shares of ALPHA and 500 shares of BETA are to be sold from sub-account 502a As ALPHA is now trading at $70 per share, the investor will take a loss through the sale of ALPHA. As BETA is selling at $120 per share, the investor will realize a gain through the sale of BETA. Since the investor holds 500 shares of BETA with a basis of $5 per share in lot 1204 of sub-account 502a and 500 shares of BETA in sub-account 502b with a basis of $100 per share, it would be more advantageous from a tax view point to sell the 500 shares of BETA from sub-account 502b and move the 500 shares of BETA from sub-account 502a to sub-account 502b. Using the set of tracked lots in the holding and lot matrices, a virtual fund manager can execute such a transaction as shown in FIG. 13.

Figure 13:
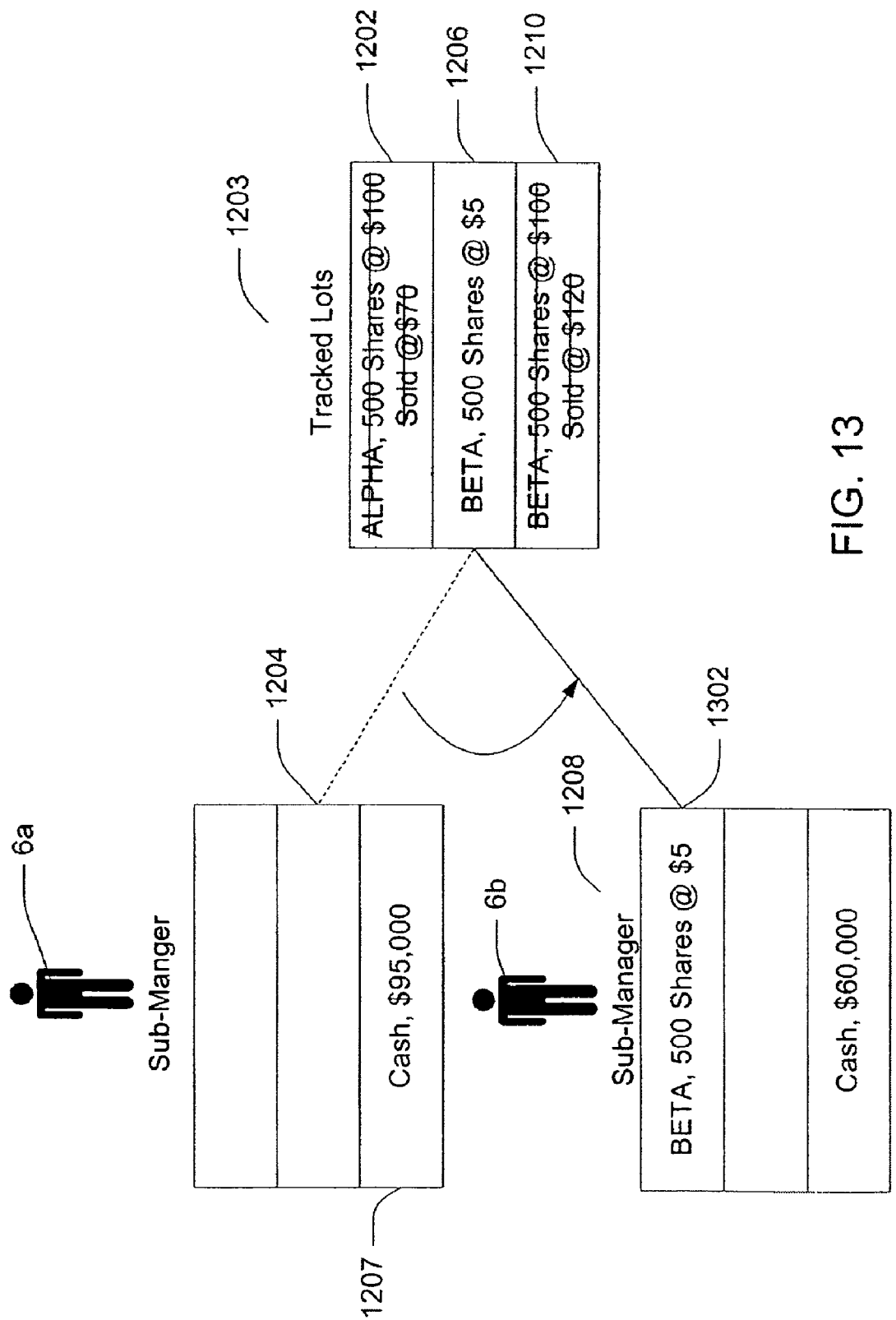
FIG. 13 is a block diagram of an example of a final state for a plurality of sub-accounts after a trade as used by a virtual mutual fund manager in accordance with an exemplary embodiment of the invention.

FIG. 13 is a block diagram of an example of a final state for a plurality of sub-accounts after a trade as used by a virtual mutual fund manager in accordance with an exemplary embodiment of the invention. The virtual fund manager generates a trade request to sell 500 shares of ALPHA at $70 per share from sub-account 502b. The sale is recorded in the set of tracked lots 1203 by updating the records in the holdings and lot matrices. As the investor has actually sold the assets, the assets are no longer tracked into the sub-accounts. The virtual fund manager also executes the sale of 500 shares of BETA. However, rather than sell lot 1204 in sub-account 502a, the virtual fund manager sells the lot in sub-account 502b and transfers lot 1204 from sub-account 502a to sub-account 502b, thus creating a new lot 1302 in sub-account 502b. The virtual fund manager updates the record 1206 in tracked lots 1203 maintained in the holdings and lot matrices in order to continue tracking the lot. At the end of the trade, sub-account 502a includes $95,000 in cash from the sale of the assets and sub-account 502b includes lot 1302 of 500 shares of BETA with a basis of $5 per share.

Figure 14:
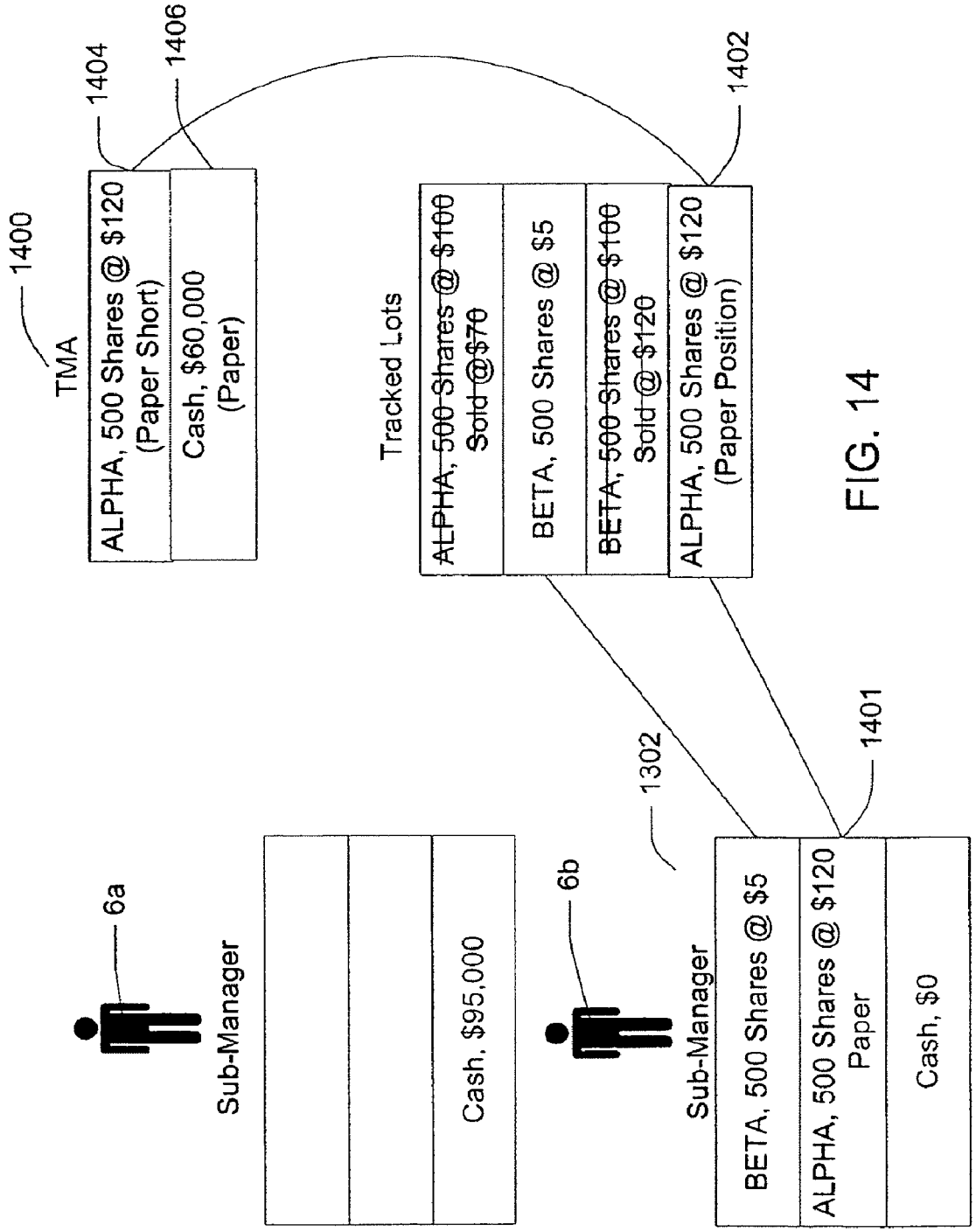
FIG. 14 is a block diagram of an example of states for a plurality of sub-accounts and a tax-managed sub-account during a deferred buy order as used by a virtual mutual fund manager in accordance with an exemplary embodiment of the invention.

FIG. 14 is a block diagram of an example of states for a plurality of sub-accounts and a tax-managed sub-account during a deferred buy order as used by a virtual mutual fund manager in accordance with an exemplary embodiment of the invention. As illustrated in the FIG. 12 and FIG. 13, manager 6a requested the sale of 500 shares of ALPHA with a basis of $100 per share for $70 per share, thus generating a loss of $30 per share. If the manager 6b now wants to purchase shares of ALPHA, manager 6b may be precluded by wash rules from making the purchase too close to manager 6a's sale of ALPHA. The virtual fund manager may accommodate the purchase of ALPHA by making a paper trade in a tax-managed sub-account 1400 and an offsetting paper trade in sub-account 502b as follows. The virtual fund manager transfers the purchase price from sub-account 502b to a cash sub-account 1406 included in the tax-managed sub-account. The virtual fund manager then creates a paper short 1404 in the tax-managed sub-account and offsetting lot 1401 in sub-account 502b. Both lot 1401 and the paper short 1404 are tracked in a set of tracked lots 1203 through record 1402 maintained in the holdings and lot matrices. At the end of the transaction, manager 6b has effectively "purchased" 500 shares of ALPHA, the purchase price has been deducted from sub-account 502b and placed into the tax-managed sub-account, and the investor has avoided a wash sale.

Figure 15:
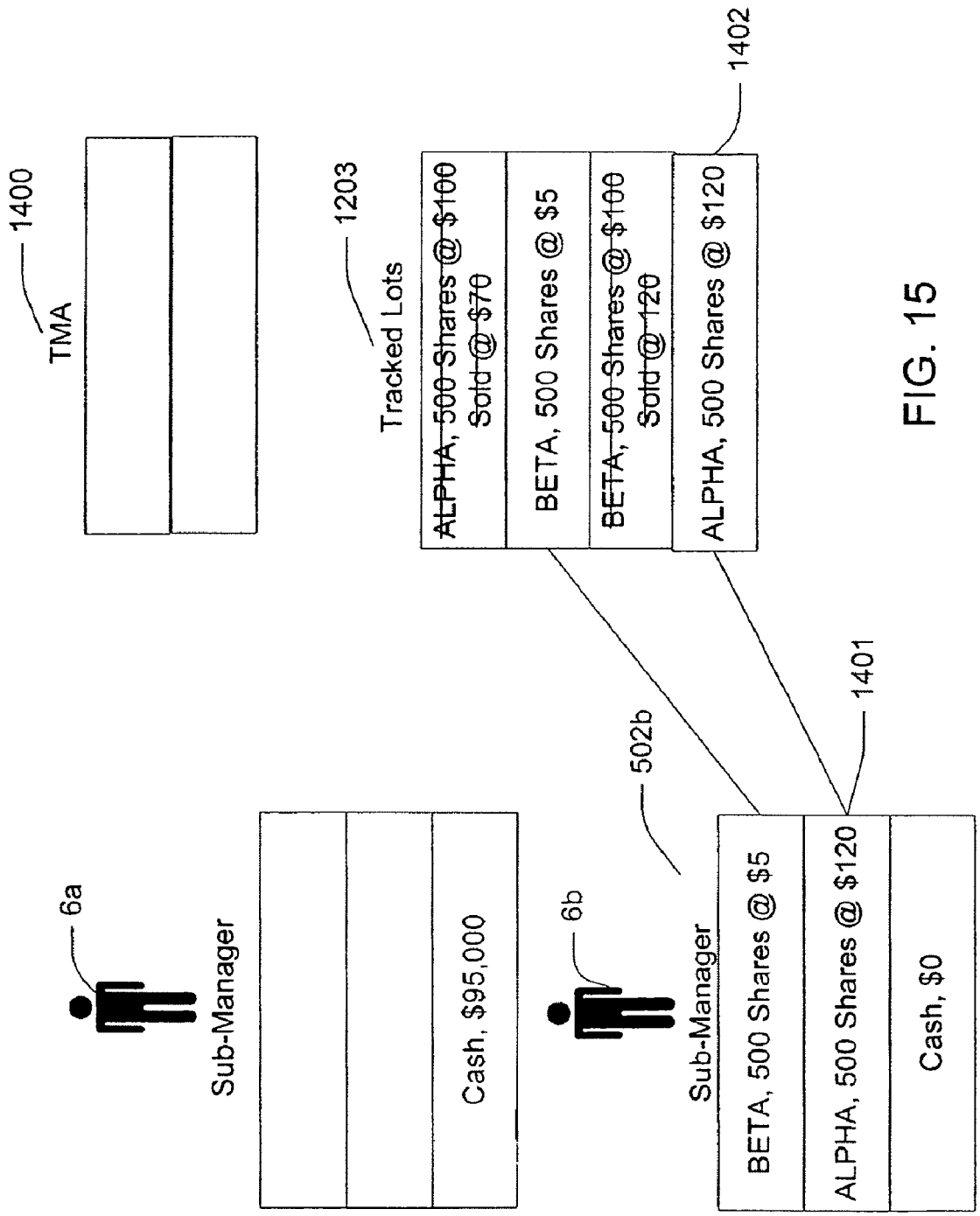
FIG. 15 is a block diagram of an example of a final state for a plurality of sub-accounts and a tax-managed sub-account after a deferred buy order is executed as used by a virtual mutual fund manager in accordance with an exemplary embodiment of the invention.

FIG. 15 is a block diagram of an example of a final state for a plurality of sub-accounts and a tax-managed sub-account after a deferred buy order is executed as used by a virtual mutual fund manager in accordance with an exemplary embodiment of the invention. The virtual fund manager defers executing the buy until the wash rule no longer applies. The virtual fund manager then buys the shares of ALPHA and the paper positions are reconciled in the tax-managed sub-account 1400 and the sub-account 502b. Sub-account 502b now contains a lot 1401 including 500 shares of ALPHA with a basis of $120 as requested by manager 6b. The lot is tracked using a record entry 1402 in a set of tracked lots 1203 maintained in the holdings and lot matrices.

Figure 16:
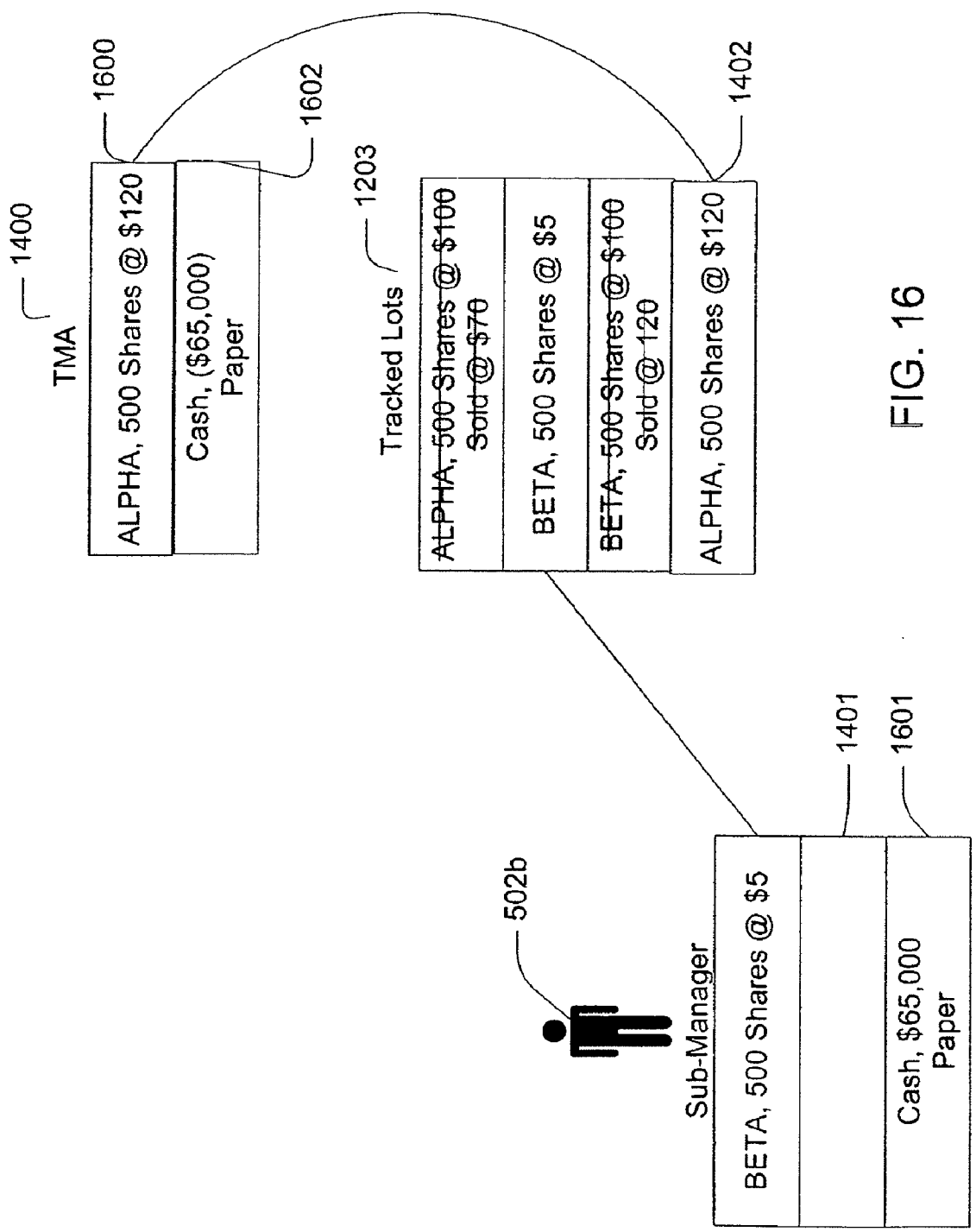
FIG. 16 is a block diagram of an example of states for a plurality of sub-accounts during a deferred sell order as used by a virtual mutual fund manager in accordance with an exemplary embodiment of the invention.

FIG. 16 is a block diagram of an example of states for a plurality of sub-accounts during a deferred sell order as used by a virtual mutual fund manager in accordance with an exemplary embodiment of the invention. Manager 6a may request the sale of 500 shares of ALPHA from sub-account 502b. However, it may be more advantageous from a tax view point for the investor to hold on to the shares until the investor can take advantage of a reduced long-term capital gains tax rate. The virtual fund manager can make the sale from sub-account 502b by making a paper trade in a tax-managed sub-account 1400. The virtual fund manager transfers the shares of ALPHA from sub-account 502b to a lot 1600 in the tax-managed sub-account. At the same time, the virtual fund manager credits sub-account 520b with the sale price 1601 and debits the tax-managed sub-account with the sale price 1602. The lot of shares of ALPHA is tracked using the set of tracked lots including a record 1402 maintained in the holding and lot matrices.

Figure 17:
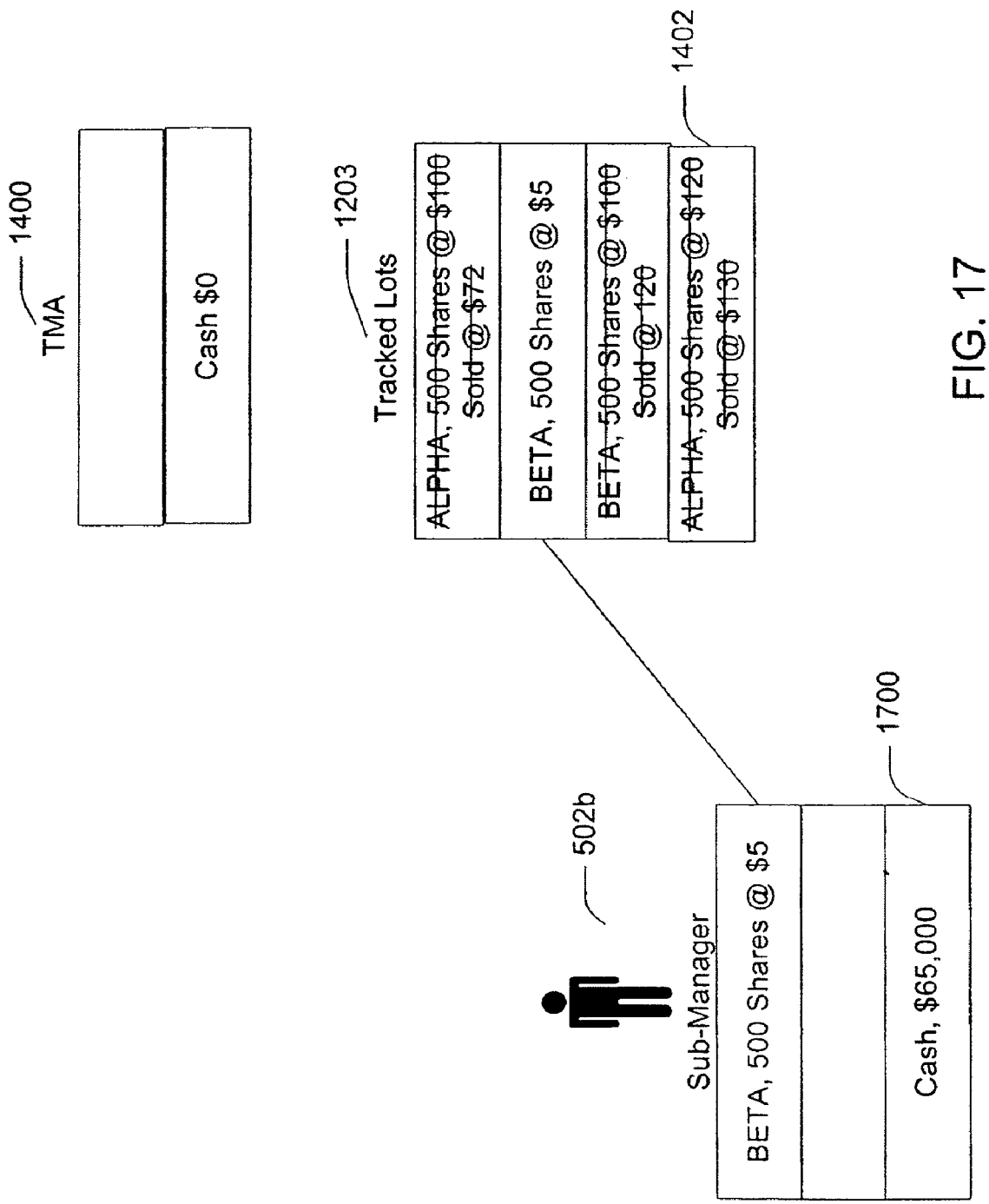
FIG. 17 is a block diagram of an example of a final state for a plurality of sub-accounts after a deferred sell order is executed as used by a virtual mutual fund manager in accordance with an exemplary embodiment of the invention.

FIG. 17 is a block diagram of an example of a final state for a plurality of sub-accounts after a deferred sell order is executed as used by a virtual mutual fund manager in accordance with an exemplary embodiment of the invention. The virtual fund manager waits as previously described until the sale of the shares held in the tax-managed sub-account no longer creates adverse tax consequences for the investor. The virtual fund manager then authorizes the sale of the shares of ALPHA and credits the tax-managed sub-account erasing the sale price debit 1602 and replaces the paper sale price position in sub-account 502*b* with an actual credit 1700. The virtual fund manager updates a record 1402 in a set of tracked lots 1203 maintained in the holding and lot matrices to indicate that the sale has been executed.

Figure 18:
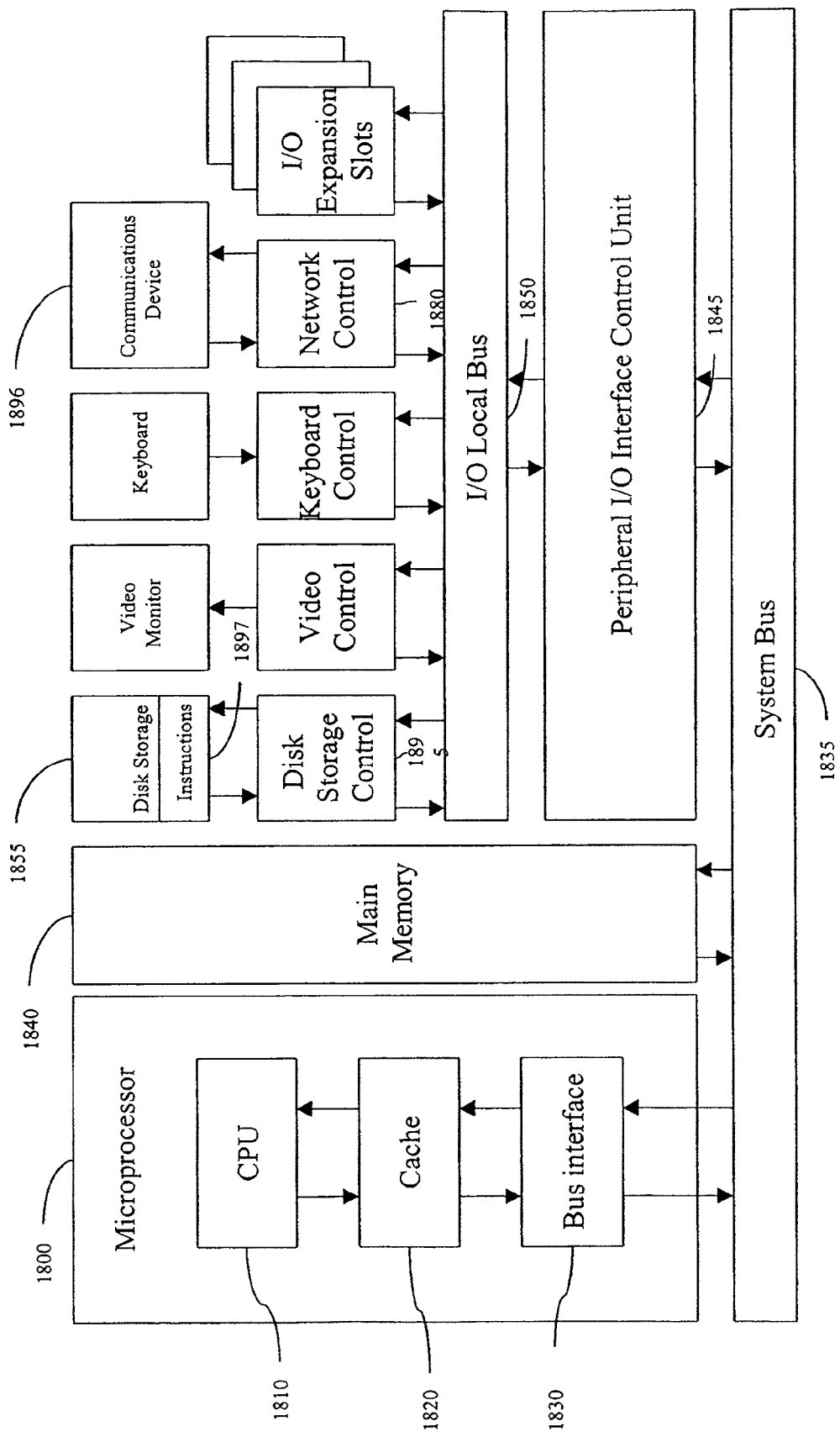
FIG. 18 is an architecture diagram for a host for a virtual mutual fund manager in accordance with an exemplary embodiment of the invention.

FIG. 18 is an architecture diagram for a host for a virtual mutual fund management system in accordance with an exemplary embodiment of the invention. A microprocessor 1800, including a Central Processing Unit (CPU) 1810, a memory cache 1820, and a bus interface 1830, is operatively coupled via a system bus 1835 to a main memory 1840 and a I/O control unit 1845. The I/O interface control unit is operatively coupled via a I/O local bus 1850 to a disk storage controller 1895, and a network controller 1880.

The disk storage controller is operatively coupled to a disk storage device 1855. Computer program instructions 1897 for implementing a virtual fund manager are stored on the disk storage device until the microprocessor retrieves the computer program instructions and stores them in the main memory. The microprocessor then executes the computer program instructions stored in the main memory to implement the features of a virtual fund manager.

Virtual Portfolio of Financial Objects Including Accounting Data Based Indexes

As noted above, a virtual portfolio of financial objects may include a portfolio of financial objects which may include, in an exemplary embodiment, an accounting data based index, which may be created and/or weighted based on accounting data, which may include financial accounting data. Accounting data based indexes and portfolios based on these indexes.

Figure 20:
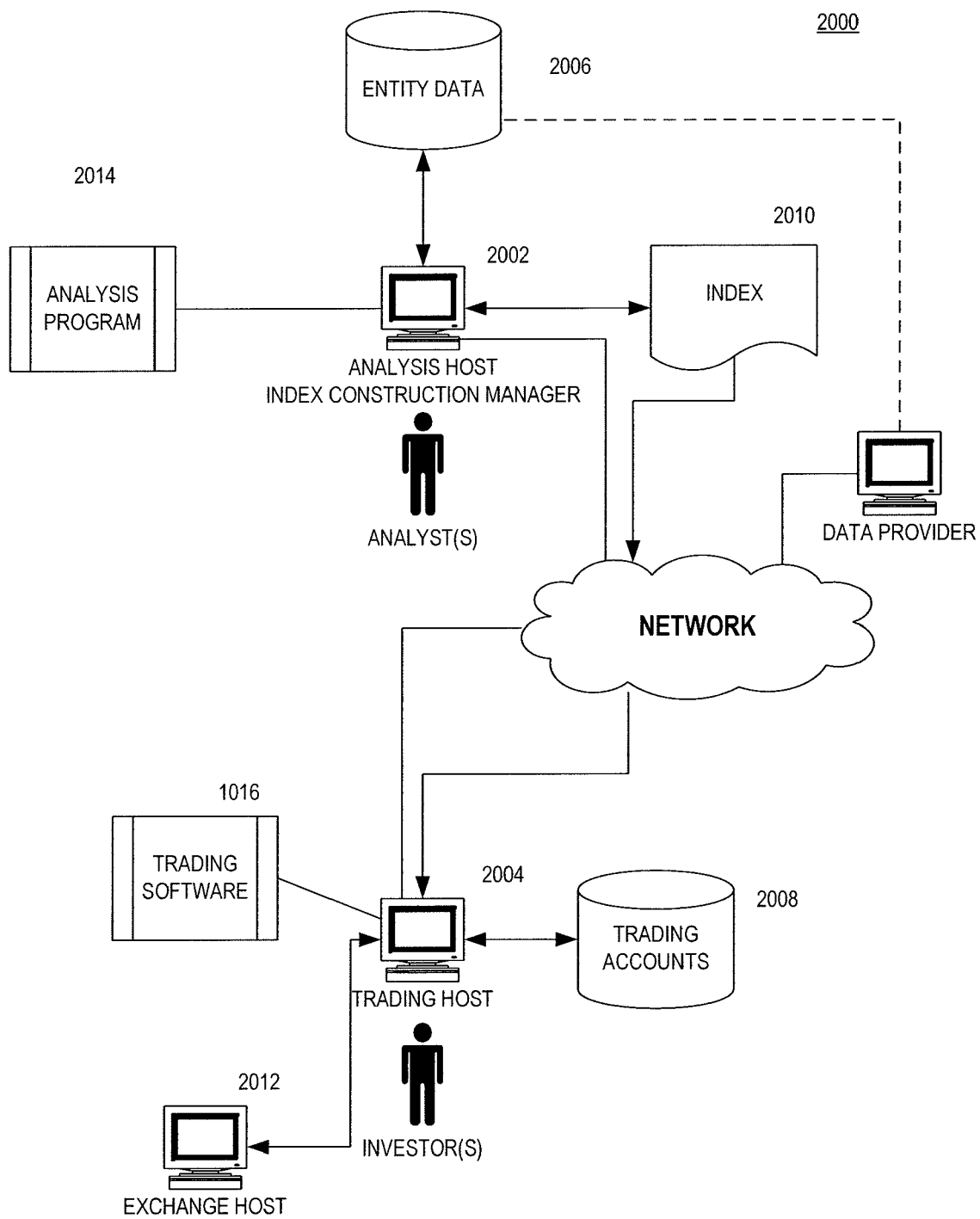
FIG. 20 is a deployment diagram of an index generation and use process in accordance with an exemplary embodiment of the present invention.

FIG. 20 depicts an exemplary deployment diagram 2000 of an index generation and use process in accordance with an exemplary embodiment of the present invention. According to the exemplary embodiment, an analyst may use a computer system 2002 to generate an index 2010. The analyst may do so by using analysis software 2014 to examine data 2006 about entities offering different kinds of financial objects that may be traded by investors. An example of an entity that may be offering financial objects may be a publicly held company whose shares trade on an exchange. However, the present invention also applies to any entity that may have any type of financial object that may be traded where information about the entity and/or its financial objects is available (or capable of being made available) for analysis.

In an exemplary embodiment, once index 2010 has been generated by an analyst using the entity data 2006, index 2010 may be used to build investment portfolios. An investor, advisor, manager or broker may then manage the purchased financial objects such as a mutual fund, an exchange traded fund, a hedge fund or other portfolio or account of assets for one or for a plurality of individual and/or institutional investors. The investor, advisor, manager or broker may use a trading computer 2004 with trading software 2016 to manage one or more trading accounts 2008. Alternatively, the purchased financial objects may be managed for one or more investors. In the latter case, financial objects may be purchased based on the index for inclusion in an individual or an institutional investor's portfolio. One or more trades may be effected or closed in cooperation with and via communication with an exchange host 2012.

Figure 21:
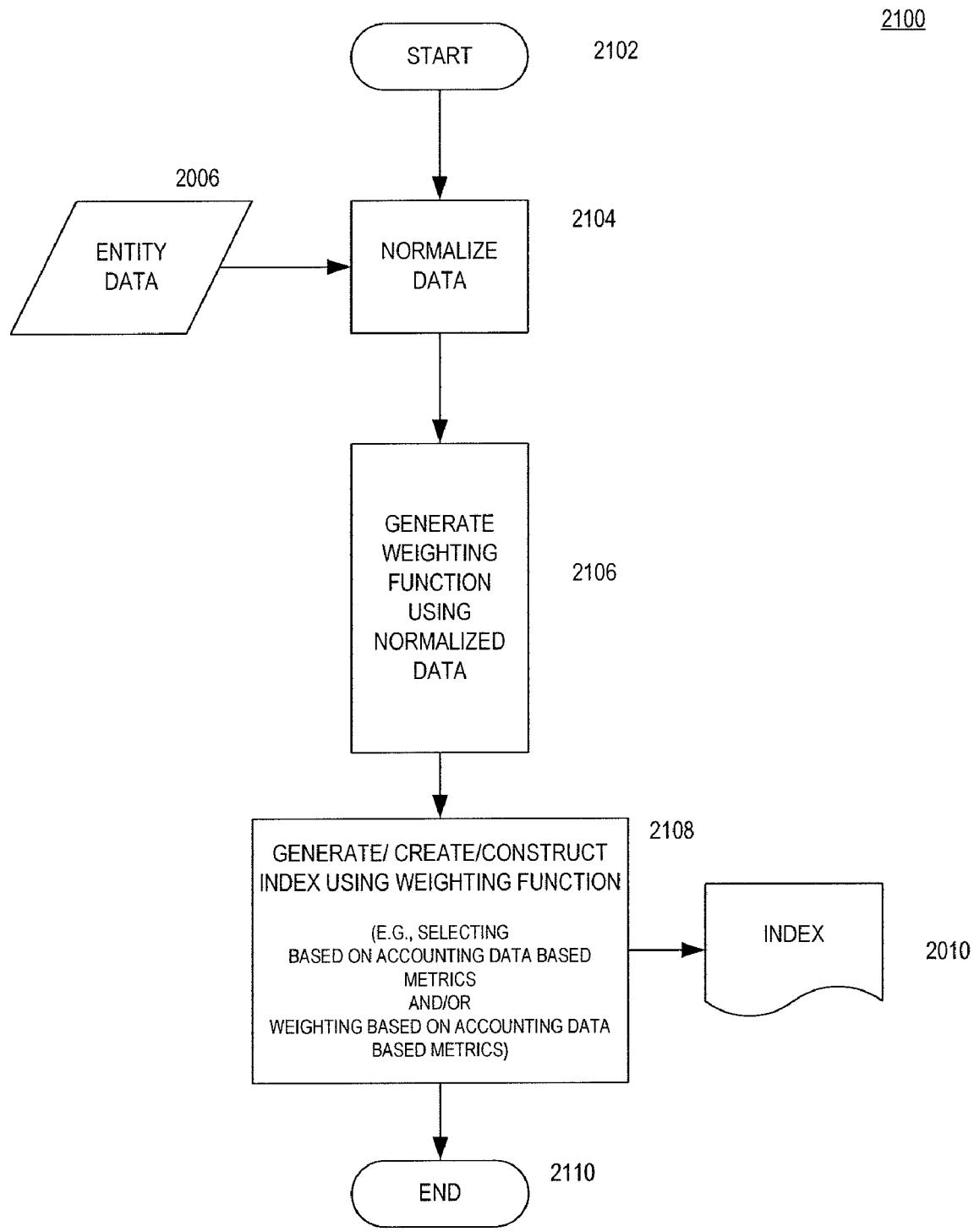
FIG. 21 is a process flow diagram of an index generation process in accordance with an exemplary embodiment of the present invention.

FIG. 21 depicts an exemplary process flow diagram 2100 of an index generation process in accordance with an exemplary embodiment of the present invention. In an exemplary embodiment, starting at block 2102, to generate index 2010, an analyst using analysis software 2014 may access entity data 106 about various entities that have financial objects that are traded. For example, publicly traded companies must disclose information about certain financial aspects of their operations. This information may be aggregated for a plurality of entities. Market sectors and corresponding indices may then be identified and generated using the aggregate data.

In slightly more detail, an index 2010 may be generated by normalizing entity data for a particular non-market capitalization metric in block 2104. The normalized entity data may be used to generate a weighting function, in block 2106, describing the contribution of each entity to a business sector as defined by the metric, in an exemplary embodiment. Index 2010 may be generated using the weighting function in block 2108. The process ends at block 2110. Once index 2010 is generated, according to an exemplary embodiment, index 2010 may be used to track the business sector defined by the metric or to create a portfolio of financial objects offered by the entities whose information was used to generate the index.

For example, in an exemplary embodiment of the invention a method of constructing a non-capitalization weighted portfolio of financial objects may include, e.g., gathering data about various financial objects; selecting a group of financial objects to create the index of financial objects; and weighting each of the group of financial objects selected in the index based on an objective measure of scale of each member of the group of financial objects, where the weighting may include weighting all or a subset of the group of financial objects, and weighting based on other than market capitalization, equal weighting, or share price weighting.

In one exemplary embodiment, the weighting of each member of the group of financial objects, may include weighting financial objects of any of various types. Examples of various types of financial objects may include, e.g., but not limited to, a stock type; a commodity type; a futures contract type; a bond type; a mutual fund type; a hedge fund type; a fund of funds type; an exchange traded fund (ETF) type; a derivative type asset, and any other portfolio or account of financial objects. The weighting may also include, e.g., but not limited to, a negative weighting on any of the various types of financial objects.

According to exemplary embodiments of the present invention, the index 2010 may be weighted based on an objective measure of scale, where the objective measure of scale may include a measure relating to an underlying asset itself. The financial object may include a municipality, a municipality issuing bonds, or a commodity. An objective measure of scale associated with the financial object may include any combination or ratios of: revenue, profitability, sales, total sales, foreign sales, domestic sales, net sales, gross sales, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), budget, capital budget, cash budget, direct labor budget, factory overhead budget, operating budget, sales budget, liquidity, book income, tax income, capitalization of earnings, capitalization of goodwill, capitalization of interest, capitalization of revenue, capital spending, cash, compensation, overhead costs, dividends, dividends per share, liquidation value of company, capitalization of cash, capitalization of earnings, capitalization of revenue, cash flow, and/or future value of expected cash flow.

Ratios too may be used. In an exemplary embodiment, the weighting of financial objects in the index based on objective measures of scale may include a ratio of any combination of the objective measures of scale of the financial object other than ratios based on weighting the financial objects based on market capitalization, equal weighting, or share price weighting. For example, the ratio of any combination of the objective measures of scale may include, e.g., but not limited to, current ratio, debt ratio, overhead expense as a percent of sales, or debt service burden ratio.

In an exemplary embodiment, the portfolio of financial objects may include, e.g., but not limited to, one or more of, a fund; a mutual fund; a fund of funds; an asset account; an exchange traded fund (ETF); a separate account, a pooled trust; a limited partnership or other legal entity, fund or account.

In an exemplary embodiment, a measure of company size may include one of, or a combination of one or more of, gross revenue, sales, income, earnings before interest and tax (EBIT), earnings before interest, taxes, depreciation and amortization (EBITDA), number of employees, book value, assets, liabilities, net worth, cash flow or dividends.

In one exemplary embodiment, the measure of company size may include a demographic measure of the financial object. The demographic measure of the financial object may include, e.g., one of, or any combination of one or more of a non-financial metric, a non-market related metric, a number of employees, floor space, office space, or other demographics of the financial object.

In an exemplary embodiment, weighting may be based on the objective measure of scale, where the measure may include a geographic metric. The geographic metric in an exemplary embodiment may include a geographic metric other than gross domestic product (GDP) weighting.

Figure 22:
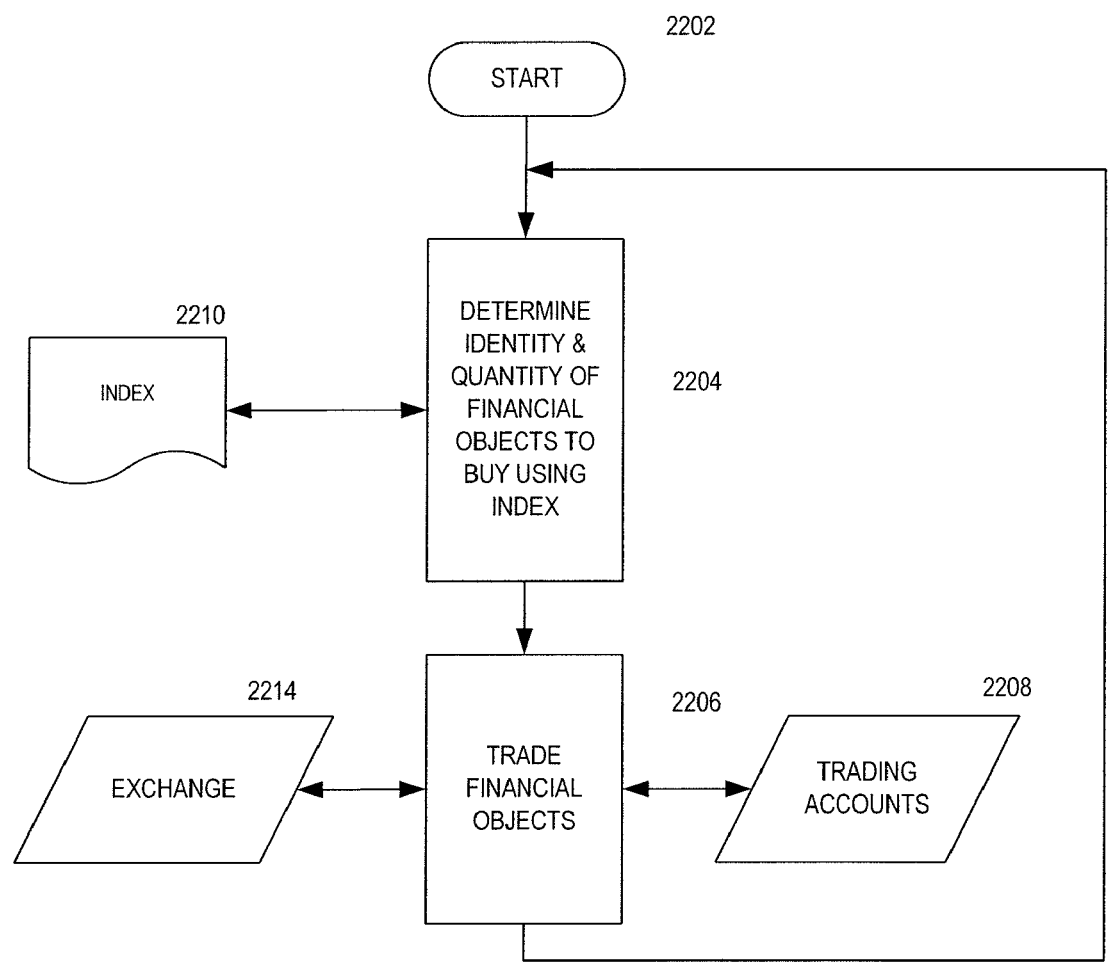
FIG. 22 is a process flow diagram of an index use process in accordance with an exemplary embodiment of the present invention.

FIG. 22 depicts an exemplary process flow diagram 2200 of an index use process in accordance with an exemplary embodiment of the present invention. The process starts at block 2202. An index 2210 may be received from an index generation process and may be used to determine the identity and quantity of securities to purchase for a portfolio in block 2204, according to an exemplary embodiment. The securities may be purchased, in block 2206, from an exchange 2214 or other market and may be held on account for an investor or group of investors in trading accounts 2208. The index 2210 may be updated on, e.g., but not limited to, a periodic basis and may be used as a basis to rebalance the portfolio, according to an exemplary embodiment. According to another exemplary embodiment, the portfolio can be rebalanced when, e.g., a pre-determined threshold is reached. In this way, a portfolio may be created and maintained based on a non-market capitalization index.

Rebalancing can be based on financial objects reaching a threshold condition or value. For example, but not limited to, rebalancing may occur upon reaching a threshold such as, e.g., 'when the portfolio of financial objects increases in market value by 20%,' or 'when the financial objects on a sub-category within the portfolio exceed 32% of the size of the portfolio,' or 'when a U.S. President is elected from a different party than the incumbent,' etc. Rebalancing may take place periodically, e.g., quarterly, or annually.

The present invention, in an exemplary embodiment, may be used for investment management, or investment portfolio benchmarking.

Another exemplary embodiment of the present invention may include an Accounting Data Based Index (ADBI) such as, e.g., but not limited to, a FUNDAMENTAL INDEX™ and Index Fund or Funds.

This exemplary embodiment may utilize a new series of accounting data based stock market indices in which the index weightings may be determined by company accounting data such as, e.g., but not limited to, the relative size of a company's profits, or its pre-exceptional profits, or sales, or return on investment or any accounting data based accounting item, or ratio, may help to address some of the issues raised above. An index that is weighted based on company accounting data, rather than the share price, or market capitalization or equal weighting, may have a stabilizing element within it that can help to remove excess volatility generated by indices constructed on the basis of price or market capitalization alone. Over the medium to longer term, such accounting data based indices have the potential to outperform price or market capitalization-based indices, and may do so with less volatility.

The exemplary inventive method may create a new class of stock market indices and index funds that may be implemented on, e.g., but not limited to, a computing device or a processor, or as a computer software or hardware, or as an algorithm. This new class of stock market indices may base its weightings on the accounting data of the companies that make up that index. One possible version of an accounting data based stock market index may be an index that is based on the relative size of a sample of the companies' pre-exceptional profits. If the chosen sample of companies was determined to be one hundred and the accounting data based criteria that the index manager decided to use was to be 'largest pre-exceptional profits,' then the index may contain, e.g., the one hundred largest companies as defined by the size of their pre-exceptional profits. As an example, if the total pre-exceptional profits of the largest one hundred companies, as measured by their pre-exceptional profits, was 100 dollars, pound, or other currency, in a defined time period (such as a quarter or year) and in the same time period the pre-exceptional profits of theoretical company 'A' were $2, then theoretical company A would be allocated a 2% weighting in the accounting data based index, in an exemplary embodiment. If theoretical company B had pre-exceptional profits of $1.5 in over the same time period then it would have a weighting of 1.5% in the accounting data based index according to an exemplary embodiment.

The index weightings may be managed based on how the fundamentals of the companies within, or outside, the chosen index sample may change. As an example, the index manager could choose to rebalance the weightings from time to time such as, e.g., but not limited to, periodically, aperiodically, quarterly, as company pre-exceptional profits change, and/or on an annual basis, etc., and enter their choice into, e.g., a computing device. If, for instance, by the time of the next rebalancing period the total pre-exceptional profits of the largest one hundred companies, as measured by their pre-exceptional profits, had grown to $120, and theoretical company A now had pre-exceptional profits of $1.2, the computing device may calculate the weighting of company in the accounting data based index such as, e.g., the accounting data based index down to 1% from 2% in the previous period. Creating such accounting data based indices may give an investor the opportunity to follow, or invest, passively in an index which may be anchored to the economic realities of the companies within it. This new accounting data based index construction technique by a computing device may produce an index and related index fund products with increased stability and with increased economically rational behavior as compared with known methods of investing.

Accounting Data Based Indexation

In one exemplary embodiment, a computing device may create an accounting data based stock market index (ADBI) such as, e.g., an accounting data based stock market index by using any of the accounting data based data points regarding a company or a group of companies that can be found in a company's annual report and accounts. In one exemplary embodiment, the computing device may create an index of companies based on the relative size of the companies' sales, assets, profits, cash flow or the shareholders equity. In addition, the computing device can also create the ADBI by using a ratio of any of the data concerning a company or group of companies that may be contained in a company report and accounts. In one exemplary embodiment, this could include the relative size of the return on financial objects of a selection of companies, their return on investment, or their return on capital compared to their cost of capital.

Once the index manager has decided and entered which accounting data based criteria to use and how many constituents the manager may decide that he or she wants to include in the index, the computing device may create the index in the following way. If, for example, the index manager decides to construct an accounting data based stock market index of one hundred constituent members and decides to use pre-exceptional profit as the chosen accounting data based criteria, the computing device may create the index as follows. First, the computing device may perform a search to find which are the largest one hundred listed companies as defined by the size of their pre-exceptional profits. Once the computing device has identified this information, the computing device may be ready to construct the index. Companies may be accorded index weightings based on the relative size of their pre-exceptional profits. If the combined pre-exceptional profits of the one hundred companies is $100 and theoretical company A has pre-exceptional profits of $2, then it may have an index weighting of 2%. Once the one hundred companies may have been accorded their weightings, the computing device may begin to calculate future index performance as the share prices of the different companies in the index changes from day to day. This may be achieved by assuming a starting value for the index, or index portfolio, and then calculating how each of the index constituents may perform going forward.

The computing device may then rebalance the index weightings as the accounting data based data points change over time as desired by the investor. For instance, if at the end of the next company reporting season the combined pre-exceptional profits of the one hundred largest companies had grown from $100 to $120 and the pre-exceptional profits of theoretical company A had declined from $2 to $1.2, the computing device may determine its weighting in the index would decline from 2% in the prior period to 1% in the current period. Also, some of the original companies in the first one hundred may be eliminated from the index if their pre-exceptional profits fall below a certain level while new companies that were not in the original sample may be included. The computing device, under the direction of an investor, may choose to rebalance the weightings in the index, e.g., but not limited to, as individual companies report their pre-exceptional profits on a quarterly basis, and/or waiting until the majority of companies have reported their pre-exceptional profits and then adjusting them all at once. Also, the computing device, under the direction of an investor, could choose to determine the weightings based on, e.g., but not limited to, either the total nominal amount of pre-exceptional profit each quarter or on a cumulative rolling basis.

Constructing a stock market index according to an exemplary embodiment using accounting data based company accounts data or a ratio, or manipulation of that data may provide a series of genuine alternatives for investors who want to invest in a passive style while focusing on fundamentals that they believe are important. For instance, according to an exemplary embodiment an investor may always want to own an index of U.S. or foreign equities that are, e.g., the largest five hundred companies as measured by sales, or by profits, or by growth in sales, or by return on investment, or any accounting data based company accounts data or ratio of that data.

Long-Short Equity Strategies

An exemplary embodiment of the present invention may take long and short positions based on an extent to which accounting data based indexation suggests that equities are under or over valued.

Figure 23:
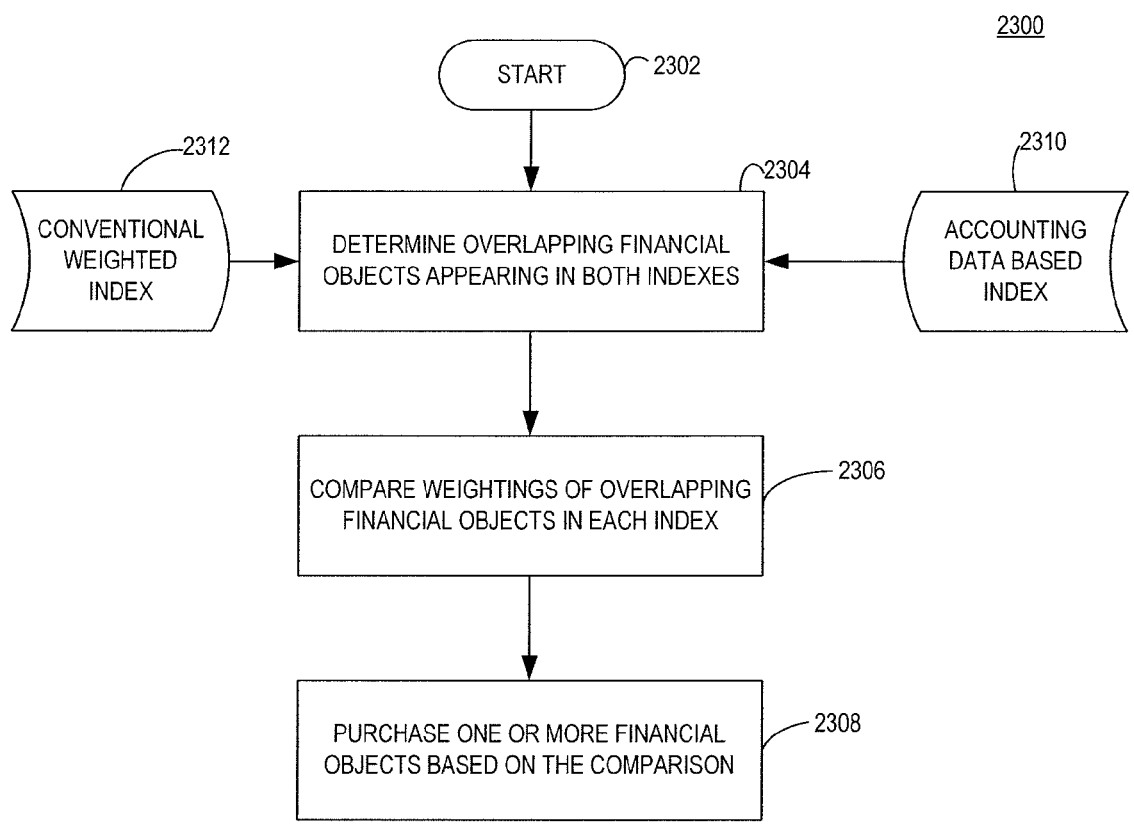
FIG. 23 is a process flow diagram of a method of creating a portfolio of financial objects.

FIG. 23 illustrates an exemplary process flow diagram 2300 of a method of creating a portfolio of financial objects according to an embodiment of the present invention. In block 2302 the process starts. In block 2304, a determination is made of overlapping financial objects that appear in both an accounting data based index (ADBI) 2310 and a conventional weighted index 2312. In block 2306, the weightings of the overlapping financial objects in the ADBI are compared with the weightings of the overlapping financial objects in the conventionally weighted index. Then, in block 2308, one or more of the overlapping financial object may be purchased based on the result of the comparison.

In the alternative, exemplary embodiments of the present invention may determine non-overlapping financial objects appearing in only one of either an accounting data based index (ADBI) or a conventional weighted index by comparing financial objects in an ADBI with financial objects in a conventionally weighted index. Non-overlapping financial objects appearing only in the ADBI may be weighted by accounting data based weighting. Non-overlapping financial objects appearing only in the conventionally weighted index may be weighted by the conventional weighting. Financial objects may then be purchased based on the resulting weightings.

In an exemplary embodiment, an index of the largest 1,000 U.S. equities, weighted by accounting data, may overlap an index of the largest 1,000 U.S. capitalization-weighted companies by approximately 80%. The 20% of non-overlapping companies may drive the 2.0% increase in return of an accounting data based index such as, e.g., but not limited to, RESEARCH AFFILIATES FUNDAMENTAL INDEX™ (RAFI™) available from Research Affiliates, LLC of Pasadena, Calif., versus a cap-weighted index. A long-short strategy according to an exemplary embodiment is designed to leverage this 20% of companies that do not overlap, and may capture the expected alpha from the accounting data based indexation. An exemplary long-short U.S. equity strategy may be approximately beta and dollar neutral and can replace or complement market neutral or long-short strategies, or as part of a portfolio's alternative strategies bucket.

Accounting data based indexation may use economic measures of company size in constructing indexes. Using accounting data based economic measures of firm size may create an index that is indifferent to price. Accounting data based indexes may avoid flaws inherent in capitalization (price)-weighted indexes. Capitalization-weighted indexes naturally overweight overvalued stocks and underweight undervalued stocks. Accounting data based indexes may more accurately estimate a true fair value of a company, allowing the weight of a company's stock in the index to rise or fall only to the extent that the underlying economic value of the issuing company may rise or fall.

ADBI Portfolio Construction

Figure 24:
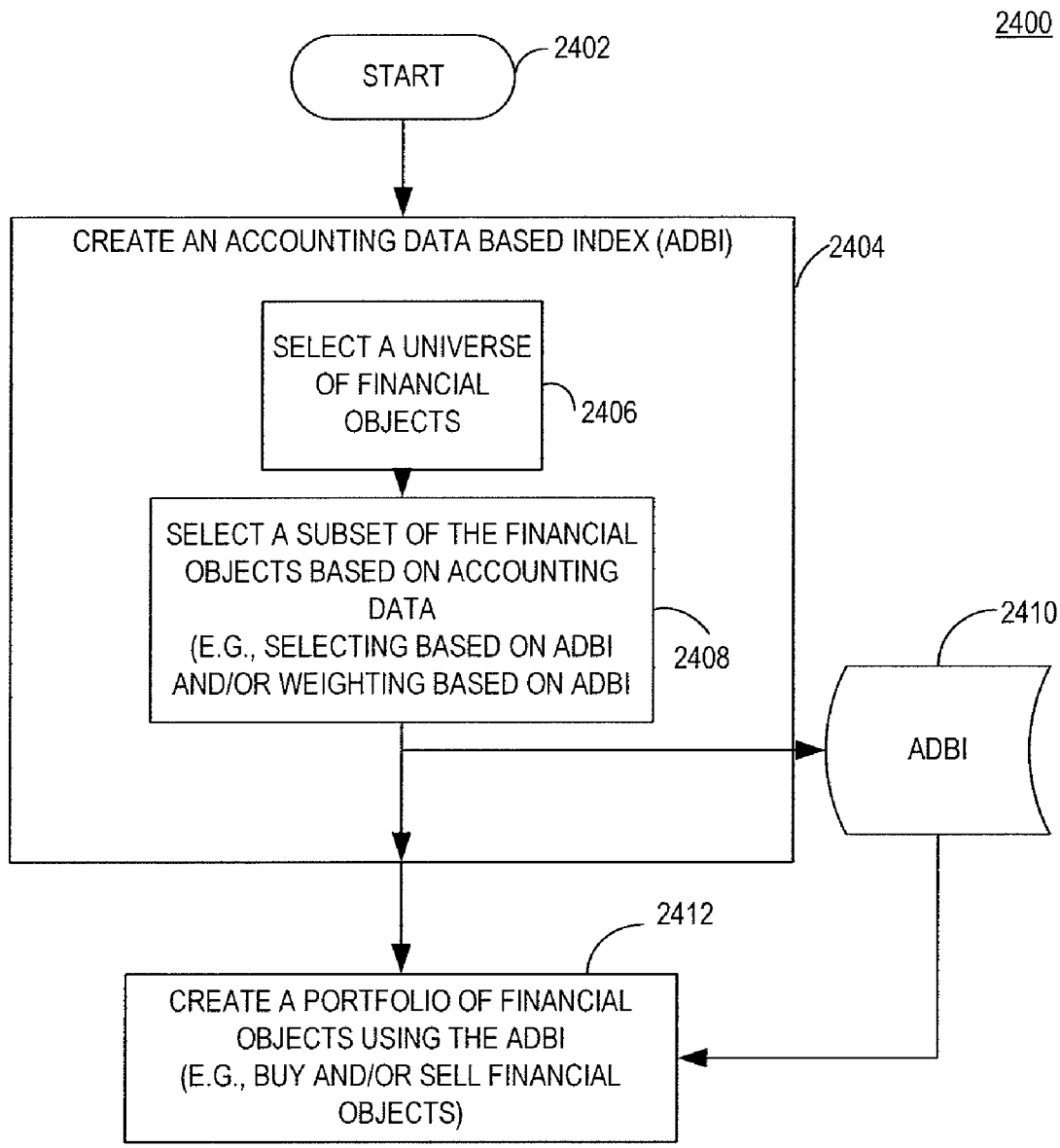
FIG. 24 is a process flow diagram of a method of constructing an ADBI and a portfolio of financial objects using the ADBI.

FIG. 24 illustrates an exemplary flow process diagram 2400 of a method of constructing an ADBI and a portfolio of financial objects using the ADBI, starting at block 2402. In block 2404, the ADBI 510 is created. Creating the ADBI may include, in block 2406, selecting a universe of financial objects, and, in block 2408, selecting a subset of the universe based on the accounting data to obtain the ADBI 2410. Then, in block 2412, a portfolio of financial objects is created using the ADBI 2410, including weighting the financial objects in the portfolio according to a measure of value of a company associated with each financial object in the portfolio.

To construct an exemplary accounting data based index (ADBI), such as, e.g., but not limited to, the RESEARCH AFFILIATES FUNDAMENTAL INDEX™ (RAFI™), some number of financial objects, e.g., 1000 US equities, may be selected and/or weighted based on the following four accounting data based measures of firm size: book equity value, free cash flow, sales, and gross dividends.

An exemplary embodiment of an accounting data based index such as, e.g., but not limited to, the RAFI™ index may first weight all US equities by each of the four accounting data based measures of firm size detailed above. According to an exemplary embodiment, an optimal relative weighting between the four factors may differ by geography of the stock market from which the equities are selected such as, e.g., an equal weighting may be optimal in one country or industry sector, while a different relative weighting between the factors may make sense in another country or industry sector. The index may then compute an overall weight for each holding by equally-weighting each of the four accounting data based measure of firm size according to an exemplary embodiment. For example, assume that a company has the following weights: 2.8% of total US book values, 2% of total US cash flow, 3% of total US sales, and 2.2% of total US dividends.

Equally-weighting these four accounting data based measures of firm size (i.e., book value, cashflow, sales and dividends) may produce a weight of 2.5%. According to an exemplary embodiment, for companies that have never paid dividends, one may exclude dividends from the calculation of the company's accounting data based weight. Finally, in an exemplary embodiment, the 1000 equities with the highest accounting data based weights may be selected and may be assigned a weight in the RAFI™ portfolio equal to its accounting data based weight.

According to another exemplary embodiment, an accounting data based index such as, e.g., but not limited to, RAFI™ maybe constructed using aggregate (not per-share) measures of firm size. For example, RAFI™ may use total firm cash flow instead of cash flow per share and total book value instead of book value per share in its construction.

In an exemplary embodiment, the accounting data may include the following four factors, book value, sales/revenue, cash flow and dividends. In another exemplary embodiment, only one or more of these factors may be used. In another exemplary embodiment, additional factors may be used, such as, e.g., any other accounting data. In one exemplary embodiment, the weightings of each of these factors may be equal relative to one another, i.e., 25% of each of book value, sales/revenue, cash flow and dividends. In one exemplary embodiment, if there are no dividends, then the other three factors may be weighted in equal parts, i.e., 33% each to book value, sales/revenue, and cash flow. In another exemplary embodiment, dividends may be weighted in a greater part such as, e.g., but not limited to, weighting dividends at 50% and book value, sales/revenue, and cash flow at ⅙th each, etc. In one exemplary embodiment, weightings may be the same, depending on the country or sovereign of origin or the industry sector of the stock or other financial object. In another exemplary embodiment, weightings may vary depending on the country or sovereign of origin or the industry sector of the stock or other financial object. In another exemplary embodiment, weightings may vary based on other factors, such as, e.g., but not limited to, types of assets, industry sectors, geographic sectors, sizes of companies, profitability of companies, amount of revenue generated by the company, etc.

An accounting data based index may be available in several varieties to meet the unique needs of different classes of retail and institutional investors, including, e.g., but not limited to, as enhanced portfolios, Exchange Traded Funds (ETFs), open-end mutual funds, tax managed portfolios, a collection of financial objects managed collectively but tracked separately, and closed-end mutual funds. Various US and international investment managers may offer, e.g., but not limited to, a suite of products.

A limited partnership or other fund or account investing in assets based on an Accounting Data Based Index, such as, e.g., Research Affiliates Fundamental Index, L.P. (RAFI LP) may increase the alpha generated by accounting data based indexation in the US through improvements or enhancements, including, e.g., but not limited to, monthly cash rebalancing and quality of earnings and corporate governance screens. The additional enhancements available through the LP may be expected to add an additional 40-70 bps of annual outperformance above the 200 basis points (bps) of annual out performance that may be achieved through the use of accounting data based indexing in portfolio construction.

A limited partnership or other fund or account investing in assets based on an ADBI international LP such as, RAFI International LP (RAFI™-I) may apply accounting data based indexation to the international equity space in an exemplary embodiment to create an enhanced portfolio of, e.g., but not limited to 1000 international (ex-US) equities. RAFI-I may be expected to outperform capitalization weighted indexes by approximately 250 bps per year. Like the other RA Fundamental Index LP's, RAFI-I is an enhanced portfolio that may use monthly cash rebalancing and quality of earnings and corporate governance screens to improve upon the performance of the RAFI International index.

Open-end mutual funds may manage financial objects employing a fixed income strategy and portable alpha using the Accounting Data Based Index (ADBI) according to an exemplary embodiment.

An Exchange Traded Fund (ETF) of the ADBI such as, e.g., but not limited to, POWERSHARES FTSE RAFI US 1000 Portfolio ETF (ticker symbol: PRF) may meet needs of retail and institutional investors interested in a low-cost means of accessing the power of accounting data based indexing in another exemplary embodiment.

Another exemplary embodiment includes a closed-end fund implementing accounting data based indexing such as, e.g., Canadian Fundamental Income 100, a closed-end mutual fund of the largest 100 accounting data based equities in Canada which attracted investments from retail and institutional investors in 2005, one of the most difficult closed end markets in recent history, demonstrating the strength of the accounting data based indexation strategy.

Accounting Data Based Indexation Long-Short (ADBI-LS)

Accounting data based indexation long-short (ADBI-LS) such as, e.g., but not limited to, RAFI-LS, is a long-short U.S.

equity strategy that leverages ADBI such as RAFI™ innovation. The RAFI U.S. 1000 portfolio is designed to outperform the Russell 1000 (and the S&P 500) by about 200 bps per annum. By going long in stocks that have greater weight in the RAFI U.S. 1000 portfolio relative to the Russell 1000 and short in the stocks that are underweight in the RAFI U.S. 1000 relative to the Russell 1000, the RAFI-LS strategy captures the RAFI alpha process and enhances that alpha source.

ADBI-LS such as, e.g., RAFI-LS according to an exemplary embodiment, is designed to be roughly dollar and beta neutral, but not sector neutral. The sector bet can be significant if the ADBI strategy determines that a sector is substantially overvalued.

In general the overlap between ADBI RAFI U.S. 1000 and capitalization based index Russell 1000 may be about 75%. This may give 25% weights for the long portfolio and 25% weights for the short portfolio. The portfolio may be applied to 300% long and 300% short, which may magnify the RAFI alpha and the portfolio volatility. Leverage may be applied tactically, and can range from about 200% long/short to about 400% long/short according to exemplary embodiments.

ADBI-LS such as, e.g., RAFI-LS according to an exemplary embodiment may be designed to achieve an annual volatility of 15-25%. Volatility of the exemplary RAFI-LS, since inception, has been about 15%.

According to an exemplary embodiment, ADBI-LS, such as, e.g., RAFI-LS may use leverage in both its short and long positions. On average, $100 invested in RAFI-LS may result in a $300 notional long position and a $300 notional short position.

Implementation of an ADBI-LS's Long and Short Positions

According to an exemplary embodiment, one does not necessarily directly need to hold long or short positions in the underlying stocks, nor does it need to access a direct line of credit for the portfolio leverage. Instead, according to an exemplary embodiment, derivatives, such as a total return swaps may be used to implement the long and short positions. It may be possible to achieve minimal counterparty default risk exposure by entering into swaps with large Wall Street firms in an exemplary embodiment. Investors in an ADBI-LS may not be physically shorting any U.S. equities; rather, investors may merely hold OTC derivative contracts. This may provide both tax benefits and efficiency in investment logistics.

ADBI-LP such as, e.g., RAFI-LP™, may be a full-market ADBI. ADBI-LS such as, e.g., RAFI-LS™, may be a fund that uses the differences between company weights in ADBI such as, e.g., RAFI™ and in a capitalization-weighted index to establish long and short positions according to an exemplary embodiment.

ADBI-LS may be designed to be dollar neutral and equity beta neutral in an exemplary embodiment. Therefore, one may expect ADBI-LS returns to be largely uncorrelated with the equity market return in an exemplary embodiment. However, ADBI may not be market neutral in the traditional sense as it is not industry sector neutral in an exemplary embodiment.

ADBI-LS does not pair positions, and thus is different from traditional equity long-short strategies whereby e.g., but not limited to, a short General Motors (GM) position is paired with a long Ford position. Instead, ADBI-LS may acquire both long and short positions based on the relative difference between the ADB Index such as, e.g., FUNDAMENTAL INDEX™ weights and those of a cap-weighted index, such as, e.g., but not limited to the Russell 1000.

An exemplary embodiment of ADBI-LS may rebalance periodically and/or aperiodically. For example, on average, the ADBI-LS, such as, e.g., RAFI-LS portfolio may hold its long-short bets for about one year. The cash flow from new capital contributed to the strategy may be used to rebalance the portfolio to create new or alter existing long-short bets according to an exemplary embodiment.

In an exemplary embodiment, the present invention may be a method of constructing a portfolio of financial objects, may include: purchasing a portfolio of a plurality of mimicking financial objects to obtain and/or create a mimicking portfolio, wherein performance of the portfolio of mimicking financial objects substantially mirrors the performance of the accounting data based index based portfolio without substantially replicating the accounting data based index based portfolio. The method may further obtain and/or use a risk model for the portfolio where the risk model mirrors a risk model of the accounting data based index. The risk model may be substantially similar to the Fama-French factors, wherein the Fama-French factors may comprise at least one of size effect (e.g., where small cap beats large cap), value effect (e.g., where high B/P beats low B/P), and/or momentum effect (e.g. where strong momentum beats weak momentum in very long run, e.g. 10 or more years). The performance of the portfolio of mimicking financial objects may substantially mirror the performance of the accounting data based index based portfolio without substantially replicating financial objects and/or weightings in the accounting data based index based portfolio.

In another exemplary embodiment, the present invention may include purchasing a plurality of financial objects according to weightings substantially similar to the weightings of an accounting data based index (ADBI), where performance of the financial objects substantially mirrors the performance of the ADBI without using substantially the same financial objects in the ADBI.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method of providing a computer-implemented trading platform for intercepting trades, coordinating trading or preventing offsetting trades of one or more financial object, the method being executed on a data processing system, the method comprising:

providing, receiving or accessing, by at least one computer processor, rules;

determining, by the at least one computer processor, if a trade using a selected lot should be deferred using at least one computer database and said rules;

generating by the at least one computer processor, a deferred trade in a managed sub-account if it is determined that said requested trade should be deferred; selecting by the at least one computer processor said deferred trade in said managed sub-account for execution if it is determined that said deferred trade should no longer be deferred using said at least one computer database and said rules;

managing a virtual portfolio of the one or more financial object, by the at least one computer processor, wherein said virtual portfolio comprises a collection of the one or more financial object managed collectively but tracked separately with separately owned lots on behalf of a plurality of investors, wherein the one or more financial object comprises at least one of: equity, debt, a bond, a stock, a financial instrument, a contract, a security, a derivative contract, a mutual fund, an exchange traded fund (ETF), a fund of funds, an index fund, a passive index fund, an enhanced index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets, a portfolio of assets tracking an index, a portfolio of assets tracking at least one of S&P indexes, FTSE indexes, Russell indexes, Dow Jones indexes, Morgan Stanley indexes, Lehman indexes, Wilshire indexes, composite indexes, international indexes, or Morgan Stanley Capital International indexes, a portfolio of assets tracking an ADBI weighted index, a commodity, an option, a derivative trade, a long hedge, a short hedge, a swap, a futures contract, or a hedge fund;

providing, receiving or accessing the at least one computer database associating a plurality of lots owned by each of said plurality of investors and associating, by the at least one computer processor, said plurality of lots as tradable regardless of an initiator of the purchase of said plurality of lots;

providing, receiving or accessing lot selection rules comprising investment management rules comprising at least one of: coordinating trades, enforcing compliance with policy, or preventing offsetting trades comprising avoiding both purchasing and selling the same lot;

receiving by the at least one computer processor, a requested trade; and selecting by the at least one computer processor, a lot for trading from said plurality of lots using said at least one computer database, said lot selection rules, and said requested trade;

managing a plurality of virtual portfolios of the one or more financial object, by the at least one computer processor, which separate lots owned by one or more individual investors and tracked separately;

receiving, by the at least one computer processor, investments by the one ore more individual investors;

purchasing the plurality of virtual portfolios of the one or more financial object, by the at least one computer processor, using said investments, wherein the plurality of virtual portfolios of the one or more financial object are purchased according to an index of the one or more financial object which is constructed without influence of prices of the one or more financial object, said index constructed by a construction method comprising:

i) determining, by the at least one computer processor, at least one selection rule, and at least one weighting rule;

ii) receiving data, by the at least one computer processor, comprising; receiving data by the at least one computer processor, regarding publicly traded of the one or more financial object, receiving data by the at least one computer processor, regarding a plurality of entities, each associated with the publicly traded of the one or more financial object, and receiving data by the at least one computer processor, regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends;

iii) selecting, by the at least one computer processor, constituent selected of the one or more financial object of said index based upon said at least one selection rule comprising said at least one accounting data about each of the entities associated with the publicly traded of the one or more financial object,
wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends;
wherein said selecting is exclusive of or substantially independent of a market price of the one or more financial object and a market capitalization of the entity associated with the one or more financial object; and iv) weighting, by the at least one computer processor, said constituent selected of the one or more financial object of said index to obtain constituent weightings based upon said at least one weighting rule comprising weighting said constituent selected of the one or more financial object as a function of at least one accounting data regarding the entities associated with said constituent selected of the one or more financial object,
wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends,
wherein said weighting is exclusive of or substantially independent of a market price of the one or more financial object and is not based on any of equal weighting, weighting in proportion to price of the one or more financial object, or weighting in proportion to market capitalization of the entity associated with the one or more financial object; and providing, receiving or accessing a computer-implemented lot matrix associating a plurality of lots with said plurality of virtual portfolios, each lot of said plurality of lots tradable regardless of an initiator of purchase of said lot and associating said plurality of lots as separately owned by said one or more investors, wherein the one or more financial object comprises at least one of: equity, debt, a bond, a stock, a financial instrument, a contract, a security, a derivative contract, a mutual fund, an exchanged traded fund (ETF), a fund of funds, an index fund, a passive index fund, an enhanced index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets, a portfolio of assets tracking at least one of S&P indexes, FTSE indexes, Russell indexes, Dow Jones indexes, Morgan Stanley indexes, Lehman indexes, Wilshire indexes, composite indexes, international indexes, or Morgan Stanley Capital International indexes, a portfolio of assets tracking an ADBI weighted index, a commodity, an option, a derivative trade, a long hedge, a short hedge, a swap, a futures contract, or a hedge fund;

providing, receiving or accessing lot selection rules comprising investment management rules comprising at least one of: coordinating trades, enforcing compliance with policy, or preventing offsetting trades comprising avoiding both purchasing and selling the same lot;

receiving, by the at least one computer processor, a requested trade;

for each of said plurality of virtual portfolios, performing the following: for said requested trade, selecting, by the at least one computer processor, a lot from said plurality of lots for execution of said requested trade using said lot selection rules, and said lot matrix; and altering the plurality of virtual portfolios, by the at least one computer processor, comprising at least one of buying or selling the one or more financial object, according to changes in said index over time.

2. The method of claim 1, wherein said rules comprise taxation rules.

3. A data processing system for managing one or more financial object comprising: at least one computer processor; instructions for managing a virtual portfolio of the one or more financial object by the at least one computer processor wherein said virtual portfolio comprises a collection of the one or more financial object managed collectively but tracked separately with separately owned lots on behalf of a plurality of investors, wherein the one or more financial object comprises at least one of: equity, debt, a bond, a stock, a financial instrument, a contract, a security, a derivative contract, a mutual fund, an exchange traded fund (ETF), a fund of funds, an index fund, a passive index fund, an enhanced index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets, a portfolio of assets tracking an index, a portfolio of assets tracking at least one of S&P indexes, FTSE indexes, Russell indexes, Dow Jones indexes, Morgan Stanley indexes, Lehman indexes, Wilshire indexes, composite indexes, international indexes, or Morgan Stanley Capital International indexes, a portfolio of assets tracking an ADBI weighted index, a commodity, an option, a derivative trade, a long hedge, a short hedge, a swap, a futures contract, or a hedge fund; at least one computer database accessible by the at least one computer processor associating a plurality of lots of said plurality of investors and associating said plurality of lots as tradable regardless of an initiator of the purchase of one of said plurality of lots; and at least one computer memory coupled to the at least one computer processor and having program instructions stored therein, the at least one computer processor programmed to execute said program instructions, said program instructions comprising: lot selection rules comprising investment management rules comprising at least one of: coordinating trades, enforcing compliance with policy, or preventing offsetting trades comprising avoiding both purchasing and selling the same lot; and instructions for receiving a requested trade; and selecting a lot for trading from said plurality of lots using said at least one computer database, said lot selection rules, and said requested trade; rules; instructions for determining if a trade using a selected lot should be deferred using said computer database and said rules, and generating a deferred trade in a managed sub-account if it is determined that said requested trade should be deferred; and instructions for selecting a deferred trade in said managed sub-account for execution if it is determined that said deferred trade should no longer be deferred using said at least one computer database and said rules; instructions for receiving investments by the plurality of investors; instructions for purchasing the virtual portfolio of the one or more financial object by the at least one computer processor using said investments, wherein the virtual portfolio of the one or more financial object is purchased according to an index which is constructed without influence of prices of the one or more financial object, said index constructed by a construction method comprising: i) determining by the at least one computer processor at least one selection rule, and at least one weighting rule; ii) receiving data by the at least one computer processor comprising: receiving by the at least one computer processor, data regarding publicly traded of the one or more financial object, receiving by the at least one computer processor, data regarding a plurality of entities, each associated with the publicly traded of the one or more financial object, and receiving by the at least one computer processor, data regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends; iii) selecting by the at least one computer processor, constituent selected of the one or more financial object, of said index based upon said at least one selection rule comprising said at least one accounting data about each of the entities associated with the publicly traded of one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said selecting is exclusive of or substantially independent of both a market price of the one or more financial object and a market capitalization of the entity associated with the one or more financial object; and iv) weighting by the at least one computer processor, said constituent selected of the one or more financial object of said index to obtain constituent weightings based upon said at least one weighting rule comprising weighting said constituent selected of the one or more financial object as a function of at least one accounting data regarding the entities associated with said constituent selected of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said weighting is exclusive of or substantially independent of a market price of the one or more financial object and is not based on any of equal weighting, weighting in proportion to price of the one or more financial object, or weighting in proportion to market capitalization of the entity associated with the one or more financial object; and instructions for altering the virtual portfolio by the at least one computer processor, comprising at least one of buying or selling the one or more financial object, according to changes in said index over time.

4. The system of claim 3, further comprising: a plurality of virtual portfolios of the one or more financial object with separate lots owned by one or more individual investors, wherein the one or more financial object comprises at least one of: equity, debt, a bond, a stock, a financial instrument, a contract, a security, a derivative contract, a mutual fund, an exchange traded fund (ETF), a fund of funds, an index fund, a passive index fund, an enhanced index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets, a portfolio of assets tracking an index, a portfolio of assets tracking at least one of S&P indexes, FTSE indexes, Russell indexes, Dow Jones indexes, Morgan Stanley indexes, Lehman indexes, Wilshire indexes, composite indexes, international indexes, or Morgan Stanley Capital International indexes, a portfolio of assets tracking an ADBI weighted index, a commodity, an option, a derivative trade, a long hedge, a short hedge, a swap, a futures contract, or a hedge fund; a computer-implemented lot matrix database accessible by the at least one computer processor associating a plurality of lots with said plurality of virtual portfolios each lot of said plurality of lots tradable regardless of an initiator of purchase of said lot; and a memory coupled to the at least one computer processor and having program instructions stored therein, the at least one computer processor programmed to execute said program instructions, said program instructions comprising: lot selection rules comprising investment management rules comprising at least one of: coordinating trades, enforcing compliance with policy, or preventing offsetting trades comprising avoiding both purchasing and selling the same lot; and instructions for receiving one or more requested trades; and for each of said plurality of virtual portfolios, for performing the following: for said requested trade: said system operative to select a lot from said plurality of lots for execution of said requested trade using said lot selection rules, and said lot matrix database; instructions for purchasing the plurality of virtual portfolios of the one or more financial object by the at least one computer processor using said investments, wherein the plurality of virtual portfolios purchased according to an index which is constructed without influence of a price of the one or more financial object, said index constructed by a construction method comprising: instructions for receiving investments by the one or more investors; instructions being for purchasing the plurality of virtual portfolios of the one or more financial object by the at least one computer processor using said investments, wherein the plurality of virtual portfolios of the one or more financial object is purchased according to an index which is constructed without influence of prices of the one or more financial object, said index constructed by a construction method comprising: i) determining by the at least one computer processor, at least one selection rule, and at least one weighting rule; ii) receiving, by the at least one computer processor, data, by the at least one computer comprising: receiving by the at least one computer processor, data regarding publicly traded of the one or more financial object, receiving by the at least one computer processor, data regarding a plurality of entities, each associated with the publicly traded, of the one or more financial object, and receiving by the at least one computer processor, data regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends; iii) selecting by the at least one computer processor, constituent selected of the one or more financial object of said index based upon said at least one selection rule comprising said at least one accounting data about each of the entities associated with the publicly traded of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said selecting is exclusive of or substantially independent of both a market price of the one or more financial object and a market capitalization of the entity associated with the one or more financial object; and iv) weighting by the at least one computer processor, said constituent selected of the one or more financial object of said index to obtain constituent weightings based upon said at least one weighting rule comprising weighting said constituent selected of the one or more financial object as a function of at least one accounting data regarding the entities associated with said constituent selected of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said weighting is exclusive of or substantially independent of a market price of the one or more financial object and is not based on any of equal weighting, weighting in proportion to price of the one or more financial object, or weighting in proportion to market capitalization of the entity associated with the one or more financial object; and instructions for altering the plurality of virtual portfolios by the at least one computer processor, comprising at least one of buying or selling the one or more financial object, according to changes in said index over time.

5. A computer-implemented method of managing a portfolio of one or more financial object the method being executed by at least one computer processor, the method comprising:
   a) managing the portfolio of the one or more financial object, by the at least one computer processor, the one or more financial object owned by one or more investors;
   b) receiving, by the at least one computer processor, investments by the one or more investors; wherein said managing comprises: managing a virtual portfolio of the one or more financial object by the at least one computer processor wherein said virtual portfolio comprises a collection of the one or more financial object managed collectively but tracked separately with separately owned lots on behalf of the one or more investors; providing, receiving or accessing at least one computer database associating by the at least one computer processor a plurality of lots owned by each of said one or more investors and associating by the at least one computer processor said plurality of lots as tradable regardless of an initiator of the purchase of said plurality of lots; providing, receiving or accessing by the at least one computer processor, lot selection rules; receiving by the at least one computer processor a requested trade; selecting by the at least one computer processor a lot for trading from said plurality of lots using said at least one computer database, said lot selection rules, and said requested trade; providing, receiving or accessing by the at least one computer processor, rules; determining by the at least one computer processor if a trade using a selected lot should be deferred using the at least one computer database and said rules; generating by the at least one computer processor a deferred trade in a managed sub-account if it is determined that said requested trade should be deferred; and selecting by the at least one computer processor said deferred trade in said managed sub-account for execution if it is determined that said deferred trade should no longer be deferred using said at least one computer database and said rules; c) purchasing the portfolio of the one or more financial object by the at least one computer processor using said investments, wherein the portfolio of the one or more financial object is purchased according to an index of the one or more financial object which is constructed without influence of prices of the one or more financial object, said index constructed by a construction method comprising: i) determining by the at least one computer processor at least one selection rule, and at least one weighting rule; ii) receiving data by the at least one computer processor comprising: receiving by the at least one computer processor, data regarding publicly traded of the one or more financial object, receiving by the at least one computer processor data, regarding a plurality of entities, each associated with the publicly traded of the one or more financial object, and receiving by the at least one computer processor data, regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends; iii) selecting by the at least one computer processor, constituent selected of the one or more financial object of said index based upon said at least one selection rule comprising said at least one accounting data about each of the entities associated with the publicly traded of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said selecting is exclusive of or substantially independent of both a market price of the one or more financial object and a market capitalization of the entity associated with the one or more financial object; and iv) weighting by the at least one computer processor, said constituent selected of the one or more financial object of said index to obtain constituent weightings based upon said at least one weighting rule comprising weighting said constituent selected of the one or more financial object as a function of at least one accounting data regarding the entities associated with said constituent selected of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said weighting is exclusive of or substantially independent of a market price of the one or more financial object and is not based on any of equal weighting, weighting in proportion to price of the financial object, or weighting in proportion to market capitalization of the entity associated with the one or more financial object; and d) altering the portfolio by the at least one computer processor, comprising at least one of buying new one or more financial object for the portfolio or selling current one or more financial object in the portfolio, according to changes in said index over time, wherein said changes in said index over time are determined according to an altering method yielding an altered index, the altering method comprising: i) receiving new data by the at least one computer processor comprising: receiving by the at least one computer processor, new data regarding the publicly traded of the one or more financial object, receiving by the at least one computer processor, new data regarding the plurality of entities, each associated with the publicly trade of the one or more financial object, and receiving by the at least one computer processor, new data regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends; iii) re-selecting by the at least one computer processor, constituent selected of the one or more financial object of said altered index based upon said at least one selection rule comprising said at least one accounting data about each of the entities associated with the publicly traded of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said re-selecting is exclusive of or substantially independent of both a market price of the one or more financial object and a market capitalization of the entity associated with the one or more financial object; and iv) re-weighting by the at least one computer processor, said constituent selected of the one or more financial object of said altered index to obtain constituent re-weightings based upon said at least one weighting rule comprising weighting said constituent selected of the one or more financial object of said altered index as a function of at least one accounting data regarding the entities associated with said constituent selected financial object of said altered index, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said re-weighting is exclusive of or substantially independent of a market price of the one or more financial object and is not based on any of equal weighting, weighting in proportion to price of the one or more financial object, or weighting in proportion to market capitalization of the entity associated with the one or more financial object; and v) determining by the at least one computer processor, said new one or more financial object of the portfolio to purchase based on said altered index; and vi) determining by the at least one computer processor, said current one or more financial object of the portfolio to sell based on said altered index.

6. The computer-implemented method of claim 5, wherein the one or more financial object comprises at least one of: equity, debt, a bond, a stock, a financial instrument, a contract, a security, a derivative contract, a mutual fund, an exchange traded fund (ETF), a fund of funds, an index fund, a passive index fund, an enhanced index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets, a portfolio of assets tracking at least one of S&P indexes, FTSE indexes, Russell indexes, Dow Jones indexes, Morgan Stanley indexes, Lehman indexes, Wilshire indexes, composite indexes, international indexes, or Morgan Stanley Capital International indexes, a portfolio of assets tracking an ADBI weighted index, a commodity, an option, a derivative trade, a long hedge, a short hedge, a swap, a futures contract, or a hedge fund.

7. A system for managing a portfolio of one or more financial object the system comprising: means for managing the portfolio of the one or more financial object comprising at least one computer processor, the one or more financial object owned by one or more investors; means for receiving by the at least one computer processor, investments by the one or more investors; wherein said means for managing comprises: means for managing a virtual portfolio of the one or more financial object by the at least one computer processor wherein said virtual portfolio comprises a collection of the one or more financial object managed collectively but tracked separately with separately owned lots on behalf of the one or more investors; at least one computer database comprising means for associating by the at least one computer processor a plurality of lots owned by each of said one or more investors and associating by the at least one computer processor said plurality of lots as tradable regardless of an initiator of the purchase of said plurality of lots; means for providing, receiving or accessing by the at least one computer processor, lot selection rules; means for receiving by the at least one computer processor a requested trade; means for selecting by the at least one computer processor a lot for trading from said plurality of lots using said at least one computer database, said lot selection rules, and said requested trade; means for providing, receiving or accessing by the at least one computer processor, rules; means for determining by the at least one computer processor if a trade using a selected lot should be deferred using the at least one computer database and said rules; means for generating by the at least one computer processor a deferred trade in a managed sub-account if it is determined that said requested trade should be deferred; and means for selecting by the at least one computer processor said deferred trade in said managed sub-account for execution if it is determined that said deferred trade should no longer be deferred using said at least one computer database and said rules; means for purchasing the portfolio of the one or more financial object by the at least one computer processor using said investments, wherein the portfolio of the one or more financial object is purchased according to an index of the on or more financial object which is constructed without influence of prices of the one or more financial object, said index constructed by a construction method comprising: means for determining by the at least one computer processor at least one selection rule, and at least one weighting rule; means for receiving data by the at least one computer processor comprising: means for receiving by the at least one computer processor, data regarding publicly traded of the one or more financial object, means for receiving by the at least one computer processor data, regarding a plurality of entities, each associated with the publicly traded of the one or more financial object, and means for receiving by the at least one computer processor data, regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends; means for selecting by the at least one computer processor, constituent selected one the or more financial object of said index based upon said at least one selection rule comprising said at least one accounting data about each of the entities associated with the publicly traded of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said selecting is exclusive of or substantially independent of both a market price of the one or more financial object and a market capitalization of the entity associated with the one or more financial object; and means for weighting by the at least one computer processor, said constituent selected one or more financial object of said index to obtain constituent weightings based upon said at least one weighting rule comprising weighting said constituent selected of the one or more financial object as a function of at least one accounting data regarding the entities associated with said constituent selected of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said weighting is exclusive of or substantially independent of a market price of the one or more financial object and is not based on any of equal weighting, weighting in proportion to price of the one or more financial object, or weighting in proportion to market capitalization of the entity associated with the one or more financial object; and means for altering the portfolio by the at least one computer processor, comprising at least one of buying new one or more financial object for the portfolio or selling current one or more financial object in the portfolio, according to changes in said index over time, wherein said changes in said index over time are determined according to an altering method yielding an altered index, the altering method comprising: means for receiving new data by the at least one computer processor comprising: means for receiving by the at least one computer processor, new data regarding the publicly traded of the one or more financial object, means for receiving by the at least one computer processor, new data regarding the plurality of entities, each associated with the publicly traded of the one or more financial object, and means for receiving by the at least one computer processor, new data regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends; means for re-selecting by the at least one computer processor, constituent selected of the one or more financial object of said altered index based upon said at least one selection rule comprising said at least one accounting data about each of the entities associated with the publicly traded of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said re-selecting is exclusive of or substantially independent of both a market price of the one or more financial object and a market capitalization of the entity associated with the one or more financial object; and means for re-weighting by the at least one computer processor, said constituent selected of the one or more financial object of said altered index to obtain constituent re-weightings based upon said at least one weighting rule comprising weighting said constituent selected of the one or more financial object of said altered index as a function of at least one accounting data regarding the entities associated with said constituent selected of the one or more financial object of said altered index, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said re-weighting is exclusive of or substantially independent of a market price of the one or more financial object and is not based on any of equal weighting, weighting in proportion to price of the one or more financial object, or weighting in proportion to market capitalization of the entity associated with the one or more financial object; and means for determining by the at least one computer processor, said new of the one or more financial object of the portfolio to purchase based on said altered index; and means for determining by the at least one computer processor, said current of the one or more financial object of the portfolio to sell based on said altered index.

8. The system of claim 7, wherein the one or more financial object comprises at least one of: equity, debt, a bond, a stock, a financial instrument, a contract, a security, a derivative contract, a mutual fund, an exchange traded fund (ETF), a fund of funds, an index fund, a passive index fund, an enhanced index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets, a portfolio of assets tracking at least one of S&P indexes, FTSE indexes, Russell indexes, Dow Jones indexes, Morgan Stanley indexes, Lehman indexes, Wilshire indexes, composite indexes, international indexes, or Morgan Stanley Capital International indexes, a portfolio of assets tracking an ADBI weighted index, a commodity, an option, a derivative trade, a long hedge, a short hedge, a swap, a futures contract, or a hedge fund.

9. A nontransitory computer program product embodied on a computer accessible medium, the computer program product when executed on at least one processor executes a method of managing a portfolio of one or more financial object the method being executed by at least one computer processor, the method comprising: a) managing the portfolio of the one or more financial object by at least one computer processor, the one or more financial object owned by one or more investors; b) receiving by the at least one computer processor, investments by the one or more investors; wherein said managing comprises: managing a virtual portfolio of the one or more financial object by the at least one computer processor wherein said virtual portfolio comprises a collection of the one or more financial object, managed collectively but tracked separately with separately owned lots on behalf of the one or more investors; providing, receiving or accessing at least one computer database associating by the at least one computer processor a plurality of lots owned by each of said one or more investors and associating by the at least one computer processor said plurality of lots as tradable regardless of an initiator of the purchase of said plurality of lots; providing, receiving or accessing by the at least one computer processor lot selection rules; receiving by the at least one computer processor a requested trade; selecting by the at least one computer processor a lot for trading from said plurality of lots using said at least one computer database, said lot selection rules, and said requested trade; providing, receiving or accessing by the at least one computer processor, rules; determining by the at least one computer processor if a trade using a selected lot should be deferred using the at least one computer database and said rules; generating by the at least one computer processor a deferred trade in a managed sub-account if it is determined that said requested trade should be deferred; and selecting by the at least one computer processor said deferred trade in said managed sub-account for execution if it is determined that said deferred trade should no longer be deferred using said at least one computer database and said rules; c) purchasing the portfolio of the one or more financial object by the at least one computer processor using said investments, wherein the portfolio of the one or more financial object is purchased according to an index of one or more financial object which is constructed without influence of prices of the one or more financial object, said index constructed by a construction method comprising: i) determining by the at least one computer processor at least one selection rule, and at least one weighting rule; ii) receiving data by the at least one computer processor comprising: receiving by the at least one computer processor, data regarding publicly traded of the one or more financial object, receiving by the at least one computer processor data, regarding a plurality of entities, each associated with the publicly traded of the one or more financial object, and receiving by the at least one computer processor data, regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends; iii) selecting by the at least one computer processor constituent selected of the one or more financial object of said index based upon said at least one selection rule comprising said at least one accounting data about each of the entities associated with the publicly traded of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said selecting is exclusive of or substantially independent of both a market price of the one or more financial object and a market capitalization of the entity associated with the one or more financial object; and iv) weighting by the at least one computer processor, said constituent selected of the one or more financial object of said index to obtain constituent weightings based upon said at least one weighting rule comprising weighting said constituent selected of the one or more financial object as a function of at least one accounting data regarding the entities associated with said constituent selected of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said weighting is exclusive of or substantially independent of a market price of the one or more financial object and is not based on any of equal weighting, weighting in proportion to price of the one or more financial object, or weighting in proportion to market capitalization of the entity associated with the one or more financial object; and d) altering the portfolio by the at least one computer processor, comprising at least one of buying new of the one or more financial object for the portfolio or selling current of the one or more financial object in the portfolio, according to changes in said index over time, wherein said changes in said index over time are determined according to an altering method yielding an altered index, the altering method comprising: i) receiving new data by the at least one computer processor comprising: receiving by the at least one computer processor, new data regarding the publicly traded of the one or more financial object, receiving by the at least one computer processor, new data regarding the plurality of entities, each associated with the publicly traded of the one or more financial object, and receiving by the at least one computer processor, new data regarding at least one accounting data about the plurality of entities, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends; iii) re-selecting by the at least one computer processor, constituent selected of the one or more financial object of said altered index based upon said at least one selection rule comprising said at least one accounting data about each of the entities associated with the publicly traded, of the one or more financial object, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said re-selecting is exclusive of or substantially independent of both a market price of the one or more financial object and a market capitalization of the entity associated with the one or more financial object; and iv) re-weighting by the at least one computer processor, said constituent selected of the one or more financial object of said altered index to obtain constituent re-weightings based upon said at least one weighting rule comprising weighting said constituent selected of the one or more financial object of said altered index as a function of at least one accounting data regarding the entities associated with said constituent selected of the one or more financial object of said altered index, wherein said at least one accounting data comprises at least one of: data found within an annual report, data found within a generally accepted accounting principles (GAAP) annual report, data found within a standard U.S. GAAP company annual report and accounts (GAAP reports), relative size of profit of an entity, pre-exceptional profits, sales, assets, cash flow, shareholders' equity, a return on investment of the entity, revenue, book value, cash flow, or any dividends, wherein said re-weighting is exclusive of or substantially independent of a market price of the one or more financial object and is not based on any of equal weighting, weighting in proportion to price of the one or more financial object, or weighting in proportion to market capitalization of the entity associated with the one or more financial object; and v) determining by the at least one computer processor, said new of the one or more financial object of the portfolio to purchase based on said altered index; and vi) determining by the at least one computer processor, said current of the one or more financial object of the portfolio to sell based on said altered index.

10. The computer program product of claim 9, wherein the one or more financial object comprises at least one of: equity, debt, a bond, a stock, a financial instrument, a contract, a security, a derivative contract, a mutual fund, an exchange traded fund (ETF), a fund of funds, an index fund, a passive index fund, an enhanced index fund, an actively managed fund, a non-capitalization weighted index fund, a capitalization weighted index fund, an equal weighted indexed fund, an international fund, a sector fund, an asset, a liability, an accounting data based index (ADBI) fund, a portfolio of assets tracking an index, a portfolio of assets, a portfolio of assets tracking at least one of S&P indexes, FTSE indexes, Russell indexes, Dow Jones indexes, Morgan Stanley indexes, Lehman indexes, Wilshire indexes, composite indexes, international indexes, or Morgan Stanley Capital International indexes, a portfolio of assets tracking an ADBI weighted index, a commodity, an option, a derivative trade, a long hedge, a short hedge, a swap, a futures contract, or a hedge fund.

* * * * *